(12) United States Patent
Matsumoto et al.

(10) Patent No.: US 7,616,249 B2
(45) Date of Patent: Nov. 10, 2009

(54) IMAGE SENSING DEVICE, IMAGE SENSING APPARATUS, AND IMAGE SENSING POSITION SWITCHING METHOD

(75) Inventors: Yoshihiro Matsumoto, Tama (JP); Fuminori Ueno, Hachioji (JP); Yasuo Nakajoh, Niiza (JP)

(73) Assignee: Olympus Corporation, Tokyo (JP)

( * ) Notice: Subject to any disclaimer, the term of this patent is extended or adjusted under 35 U.S.C. 154(b) by 1003 days.

(21) Appl. No.: 10/978,143

(22) Filed: Oct. 29, 2004

(65) Prior Publication Data
US 2005/0110888 A1 May 26, 2005

(30) Foreign Application Priority Data

| Oct. 31, 2003 | (JP) | ............................. 2003-373595 |
| Oct. 31, 2003 | (JP) | ............................. 2003-373596 |
| Oct. 31, 2003 | (JP) | ............................. 2003-373597 |
| Oct. 31, 2003 | (JP) | ............................. 2003-373598 |
| Oct. 31, 2003 | (JP) | ............................. 2003-373599 |
| Oct. 31, 2003 | (JP) | ............................. 2003-373600 |

(51) Int. Cl.
*G02B 13/16* (2006.01)
(52) U.S. Cl. ................................... 348/335
(58) Field of Classification Search ......... 348/335–344; 396/373–386
See application file for complete search history.

(56) References Cited

U.S. PATENT DOCUMENTS

| 5,486,892 A | * | 1/1996 | Suzuki et al. ................. 396/51 |
| 6,084,715 A | | 7/2000 | Aoki et al. |
| 6,268,963 B1 | | 7/2001 | Akiyama |
| 6,362,921 B1 | | 3/2002 | Iida et al. |
| 6,411,783 B2 | * | 6/2002 | Takase et al. ................ 396/382 |
| 6,445,887 B1 | * | 9/2002 | Suzuka ........................ 396/373 |
| 6,671,099 B2 | | 12/2003 | Nagata |
| 2003/0076436 A1 | * | 4/2003 | Otake et al. .................. 348/335 |
| 2005/0094020 A1 | * | 5/2005 | Matsumoto et al. .......... 348/337 |

FOREIGN PATENT DOCUMENTS

| JP | 07-333505 | 12/1995 |
| JP | 2001-272587 | 10/2001 |
| JP | 2002-267928 | 9/2002 |
| JP | 2002-320122 | 10/2002 |
| JP | 2003-084200 | 3/2003 |

* cited by examiner

*Primary Examiner*—Jason Chan
*Assistant Examiner*—Tuan H Le
(74) *Attorney, Agent, or Firm*—Straub & Pokotylo; John C. Pokotylo

(57) ABSTRACT

An image sensing device includes a prism unit, image sensing element, fixing member, case member, support member, and a switching mechanism. The prism unit has at least two reflecting surfaces each having a free-form surface shape. The support member movably supports the prism unit within a predetermined movable range along the direction crossing light-receiving surface of the image sensing element. The switching mechanism selectively moves the prism unit to the first position at which the prism unit abuts against the fixing member or the second position at which the prism unit abuts against the case member in synchronism with the support member.

14 Claims, 51 Drawing Sheets

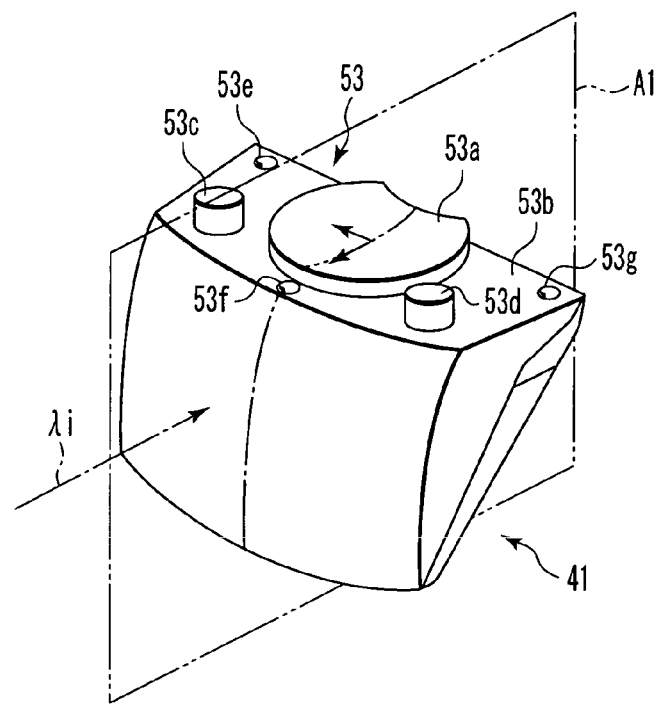
F I G. 5
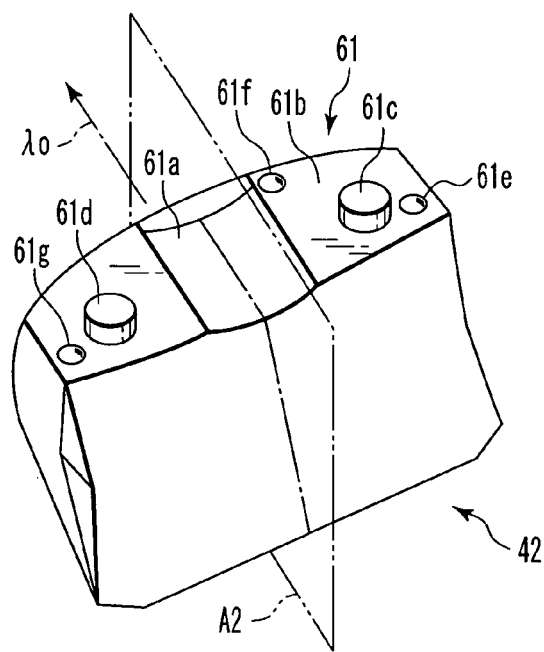
F I G. 6

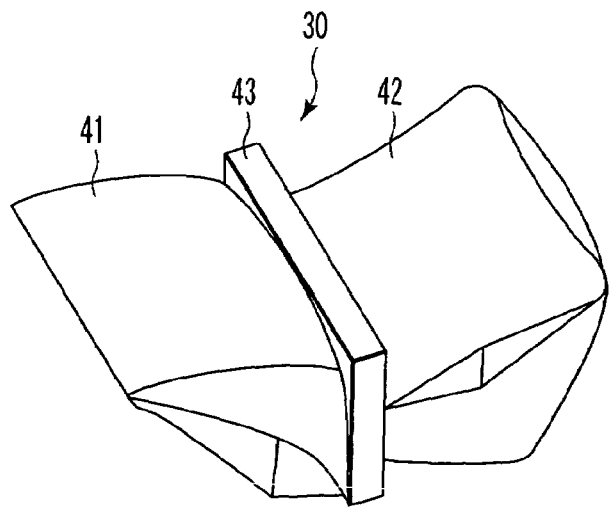
F I G. 10
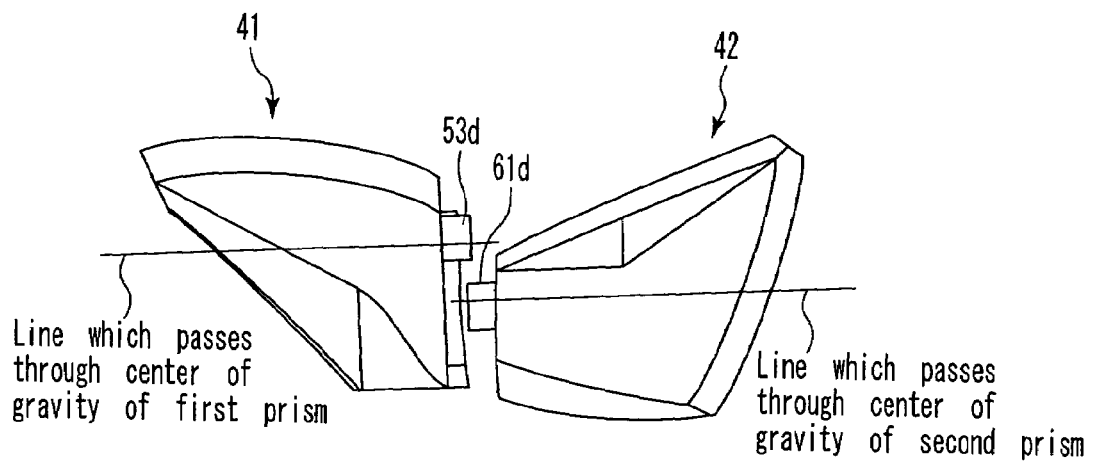
F I G. 11

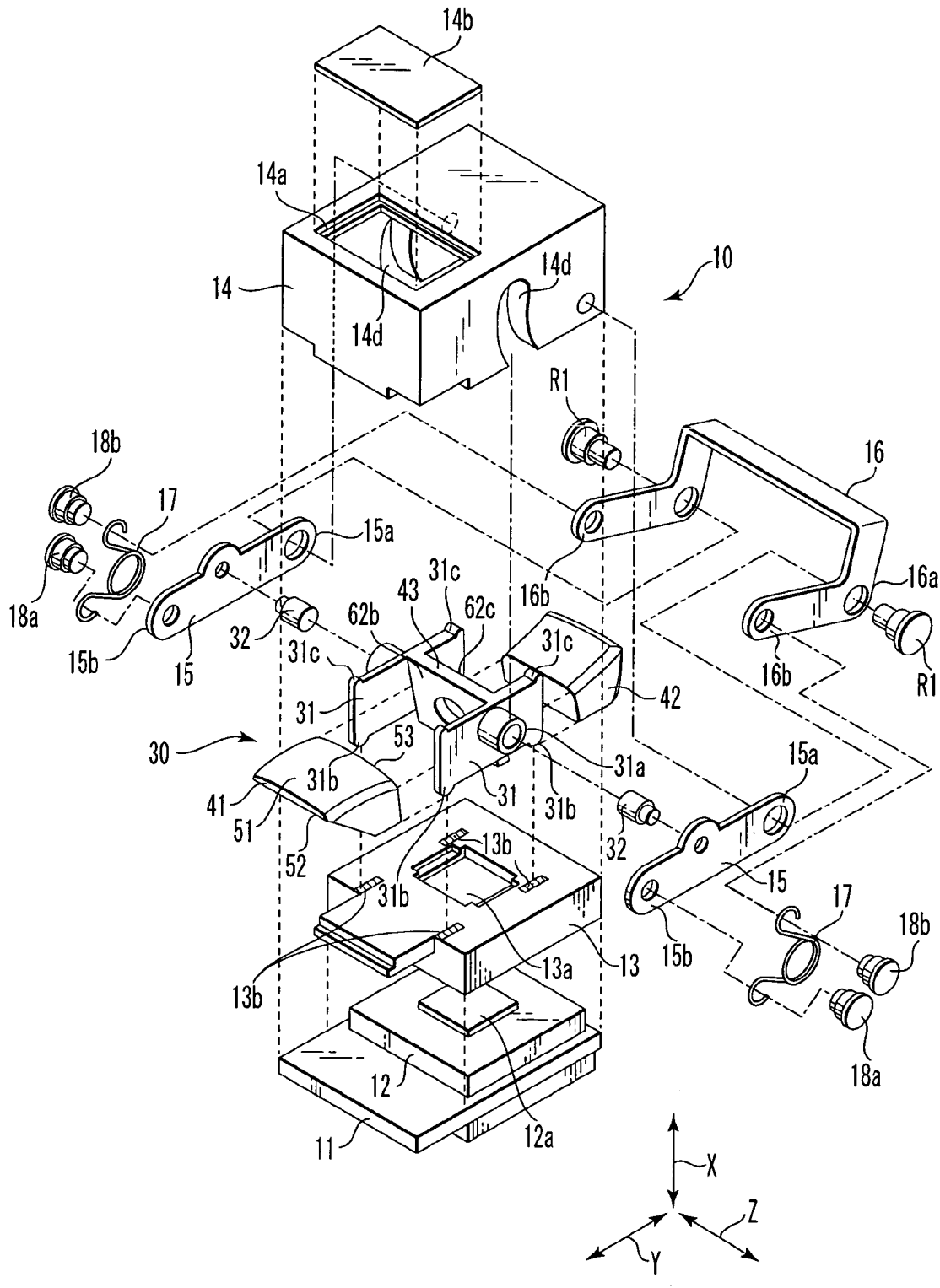
F I G. 12

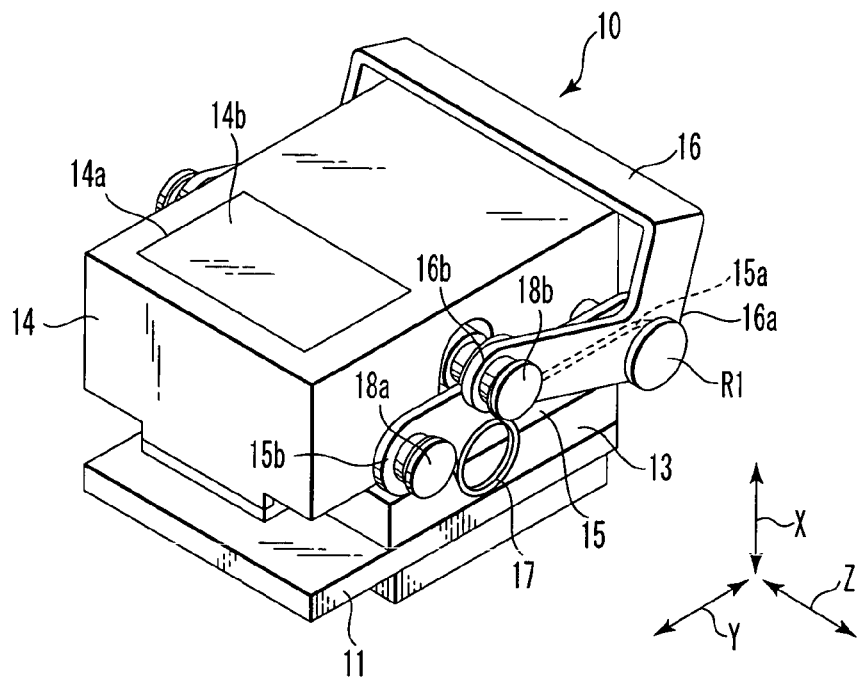
F I G. 13
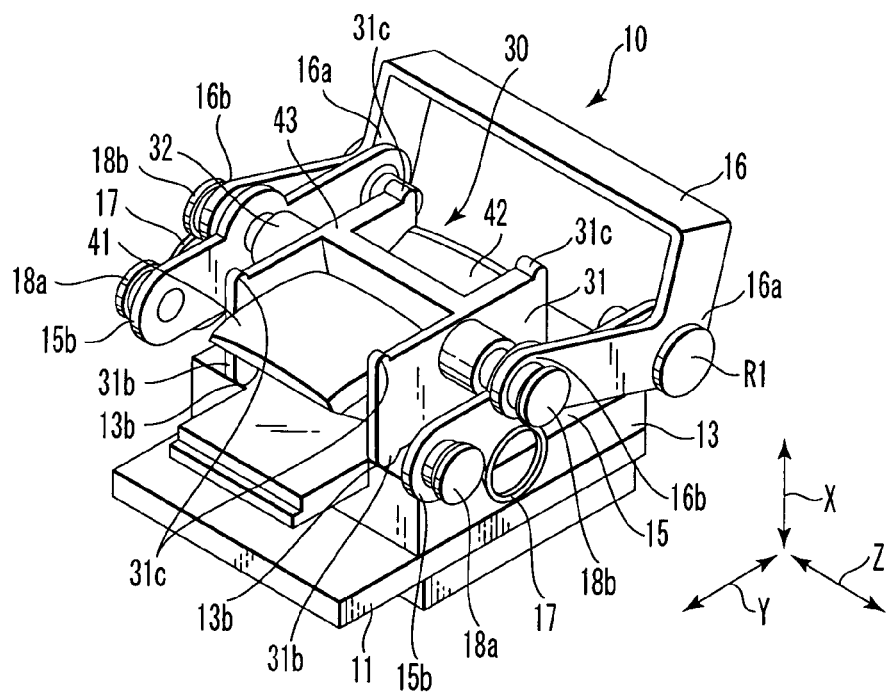
F I G. 14

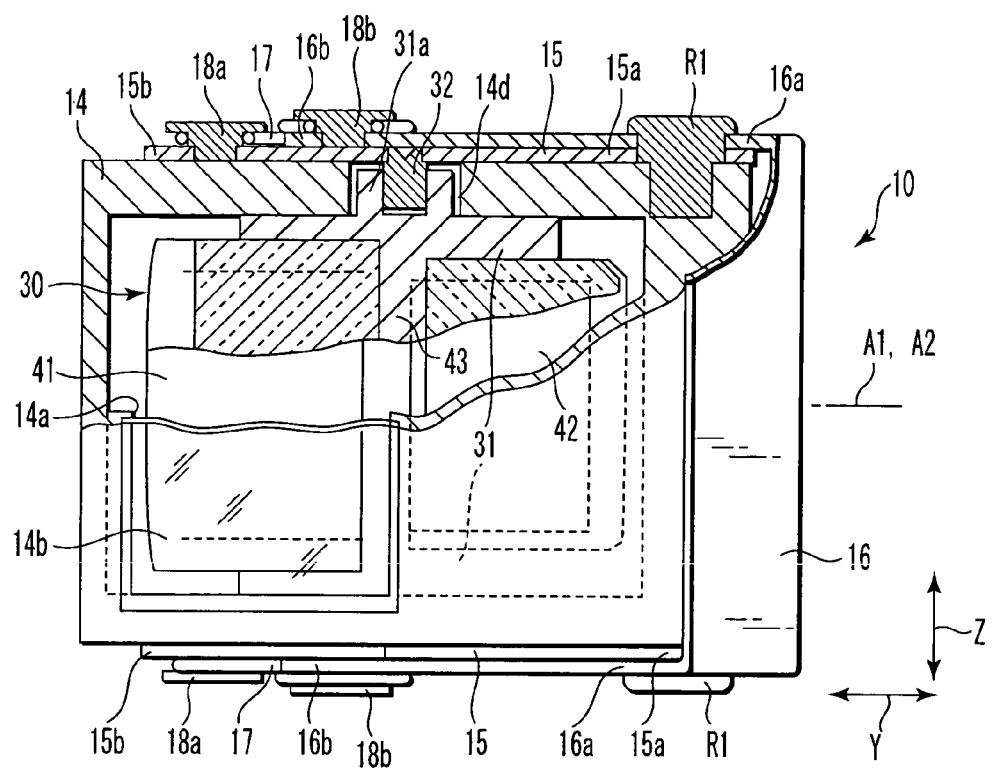
F I G. 15
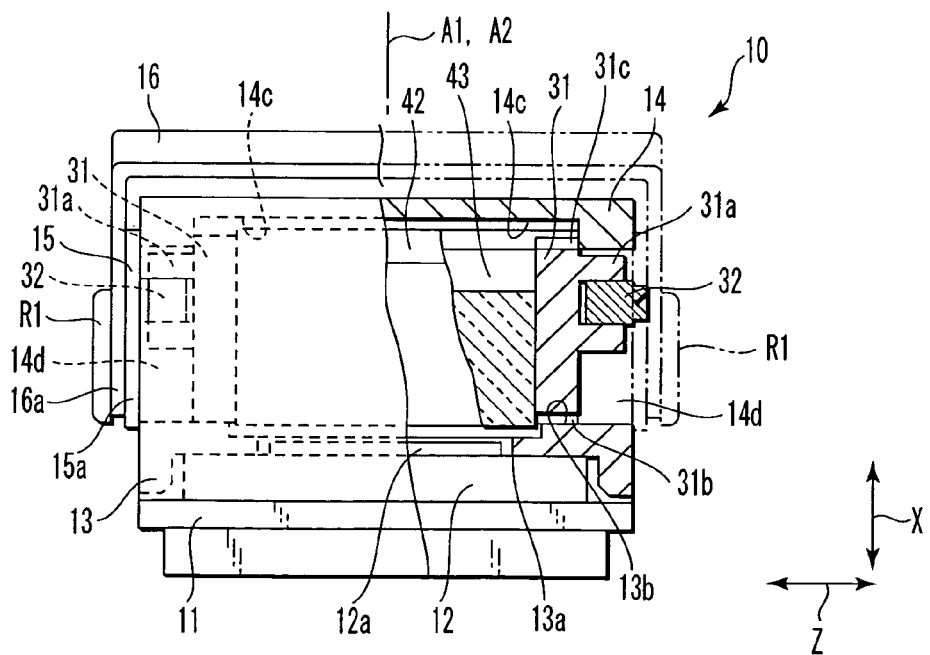
F I G. 16

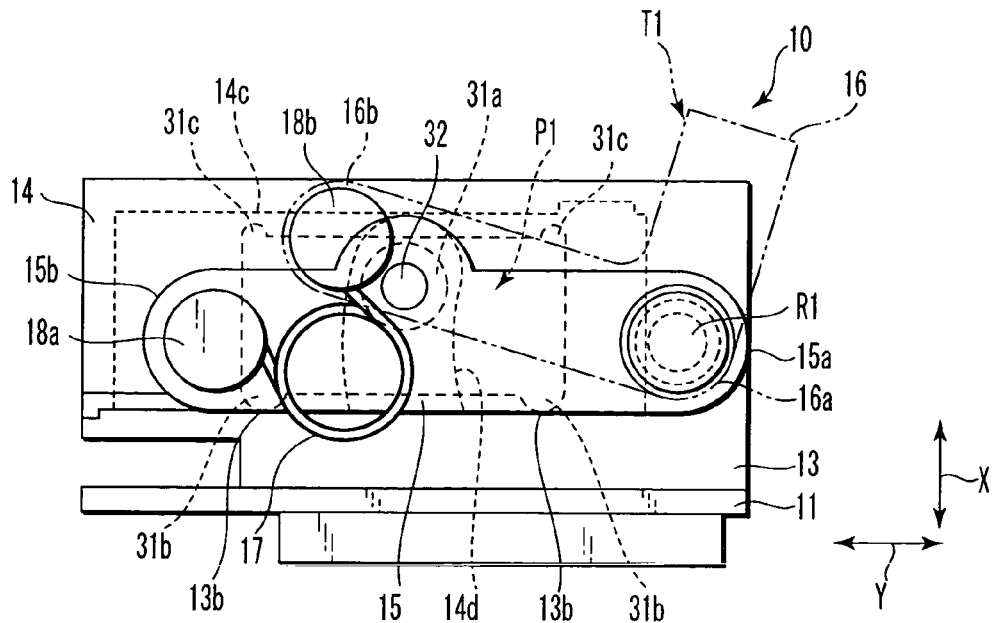
F I G. 17
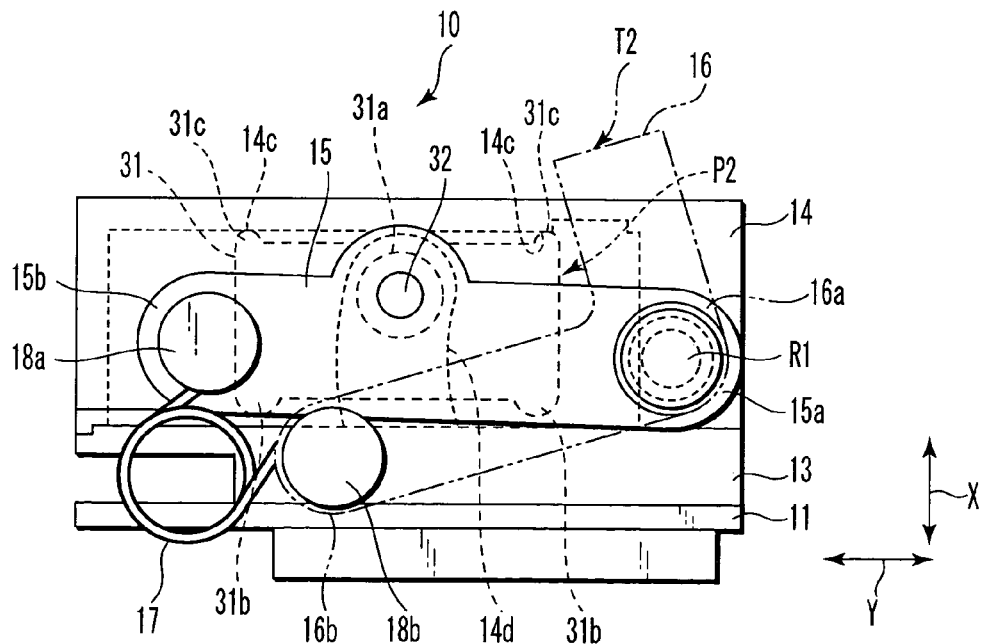
F I G. 18

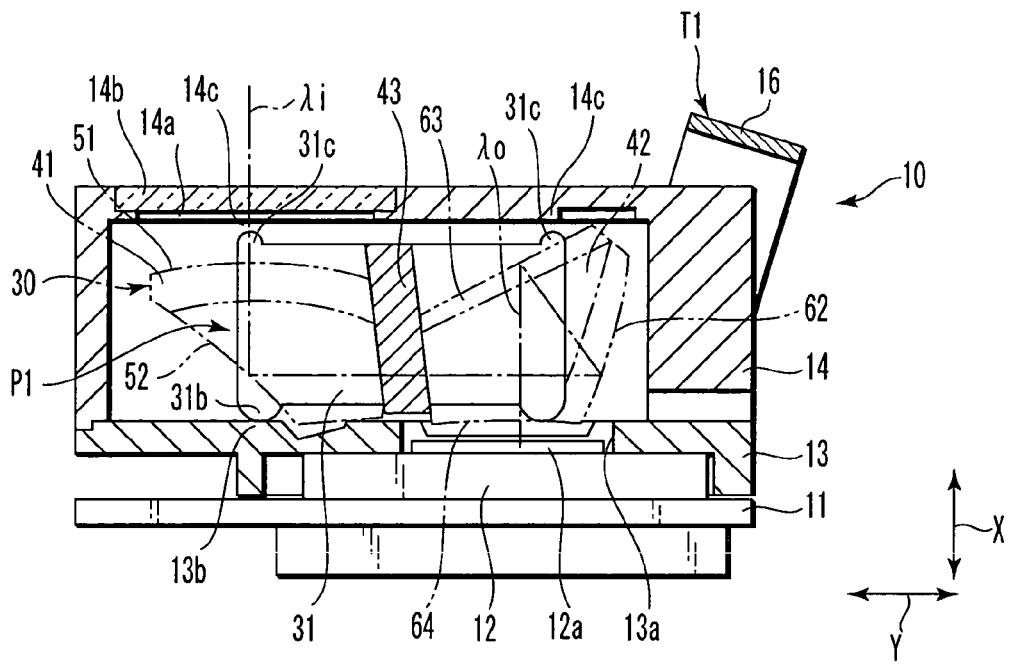
F I G. 19
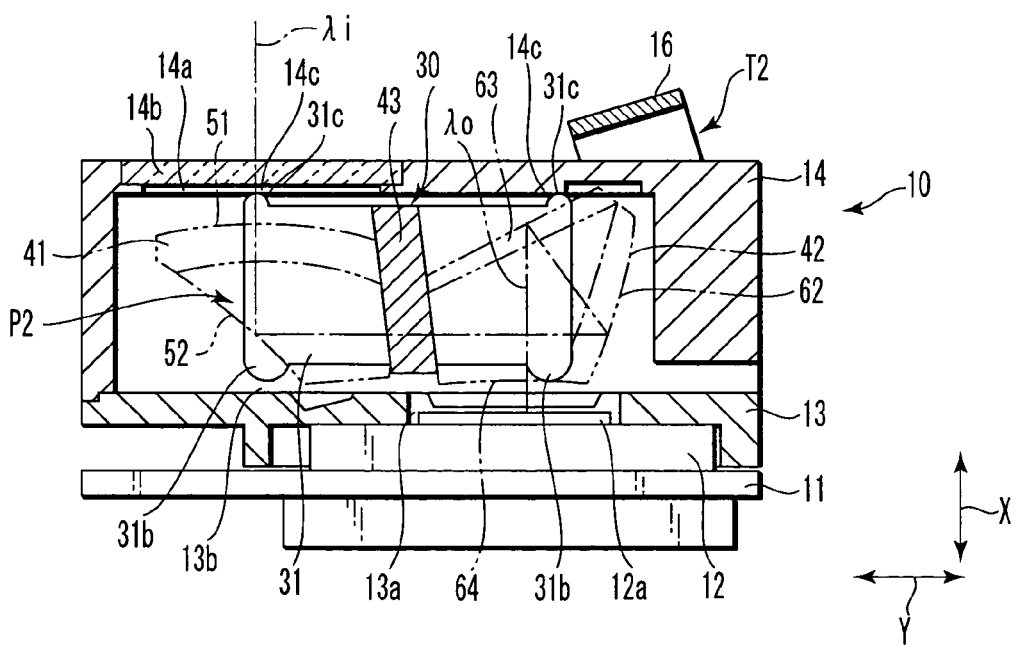
F I G. 20

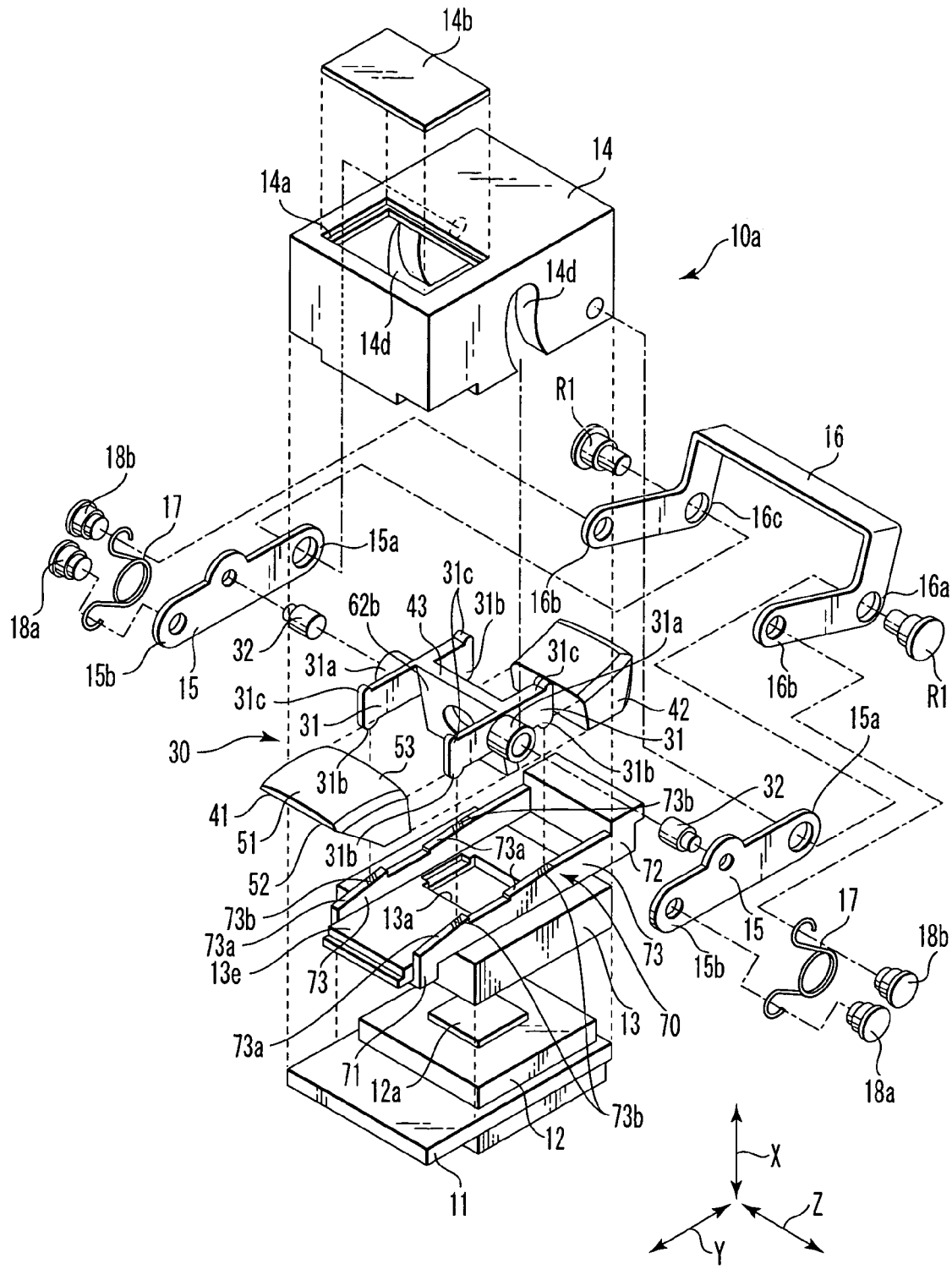
F I G. 21

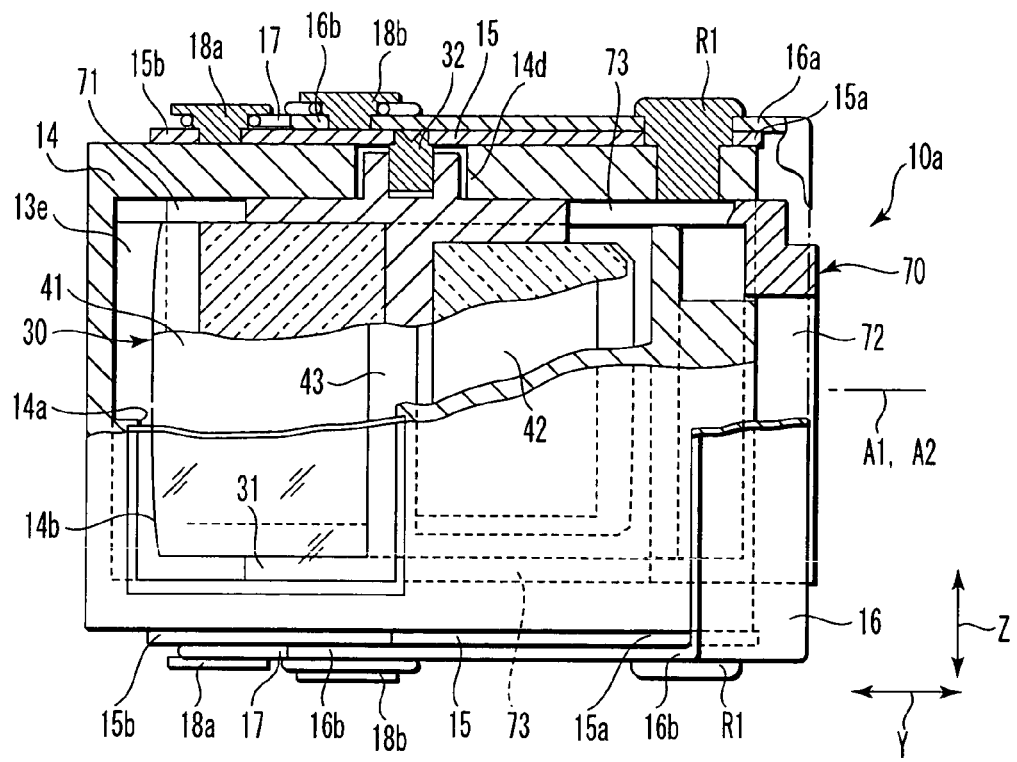
F I G. 22
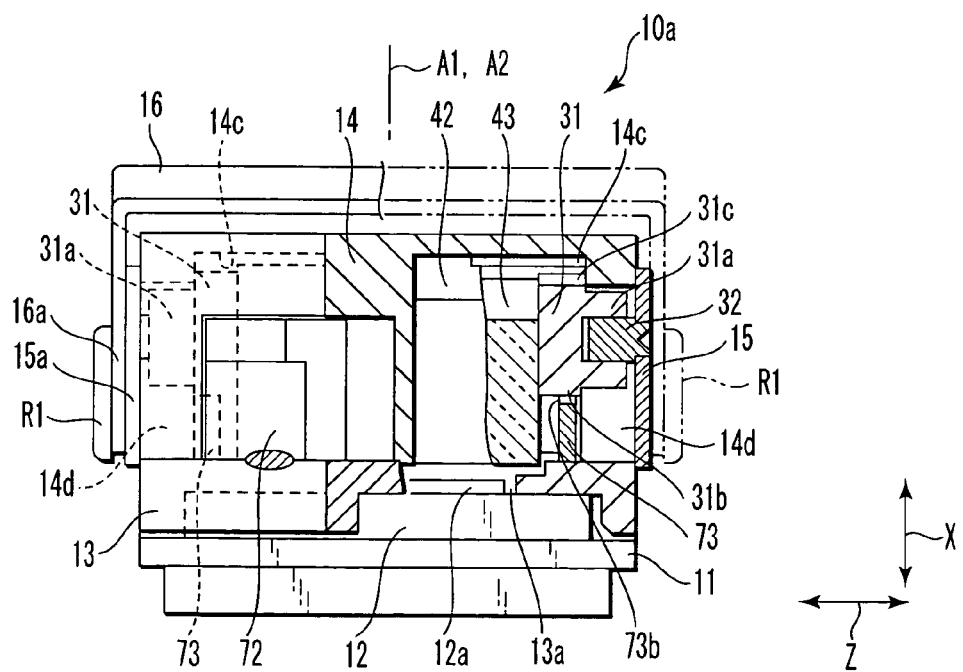
F I G. 23

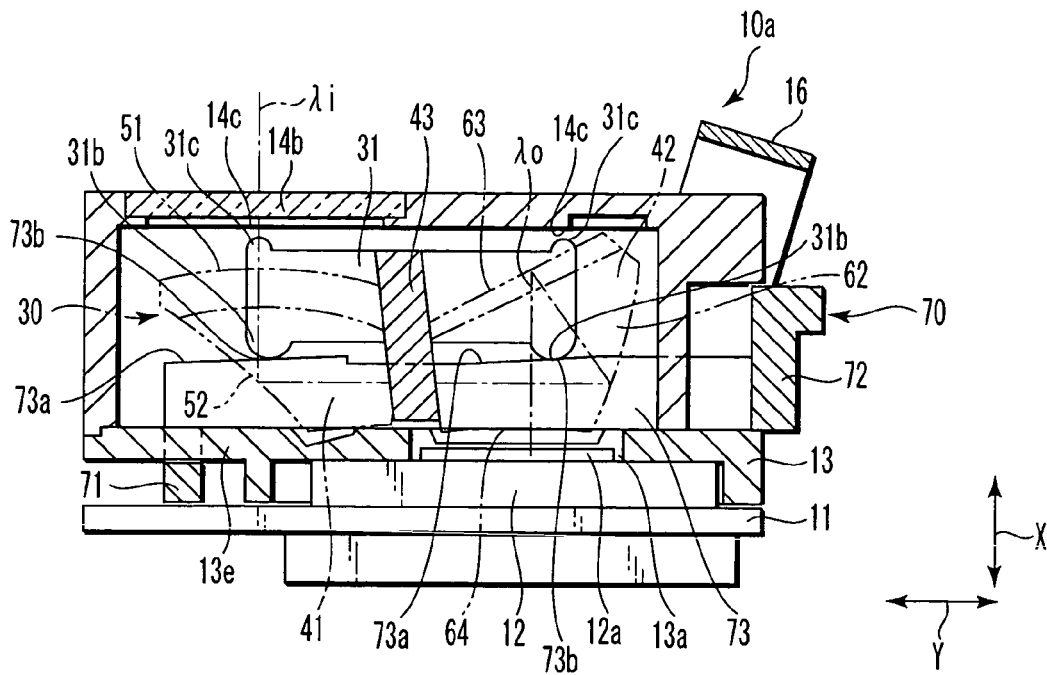
F I G. 24
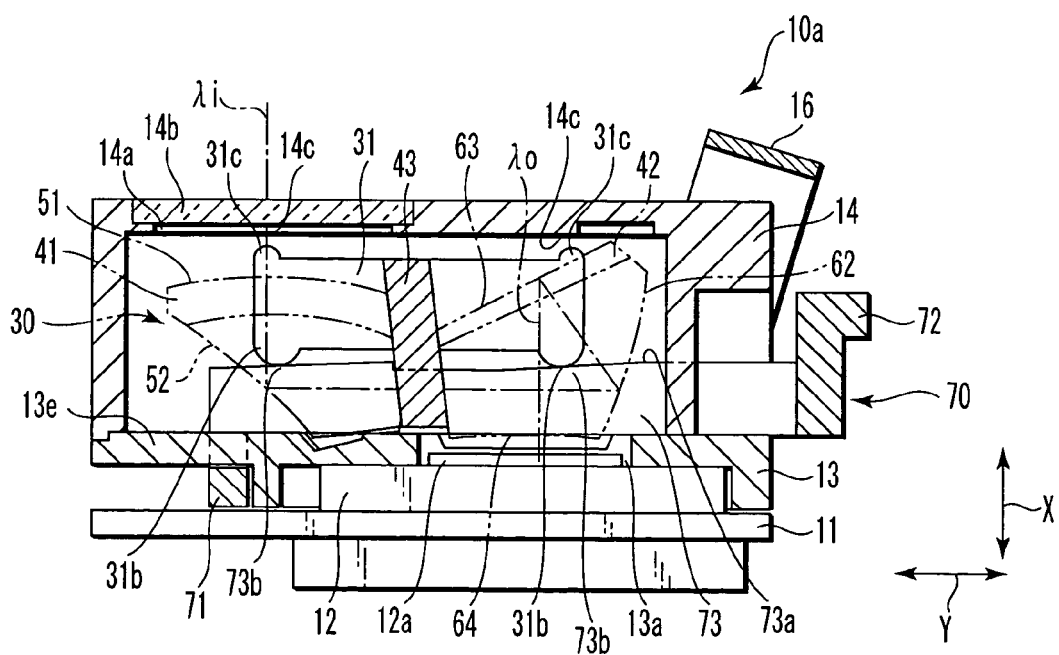
F I G. 25

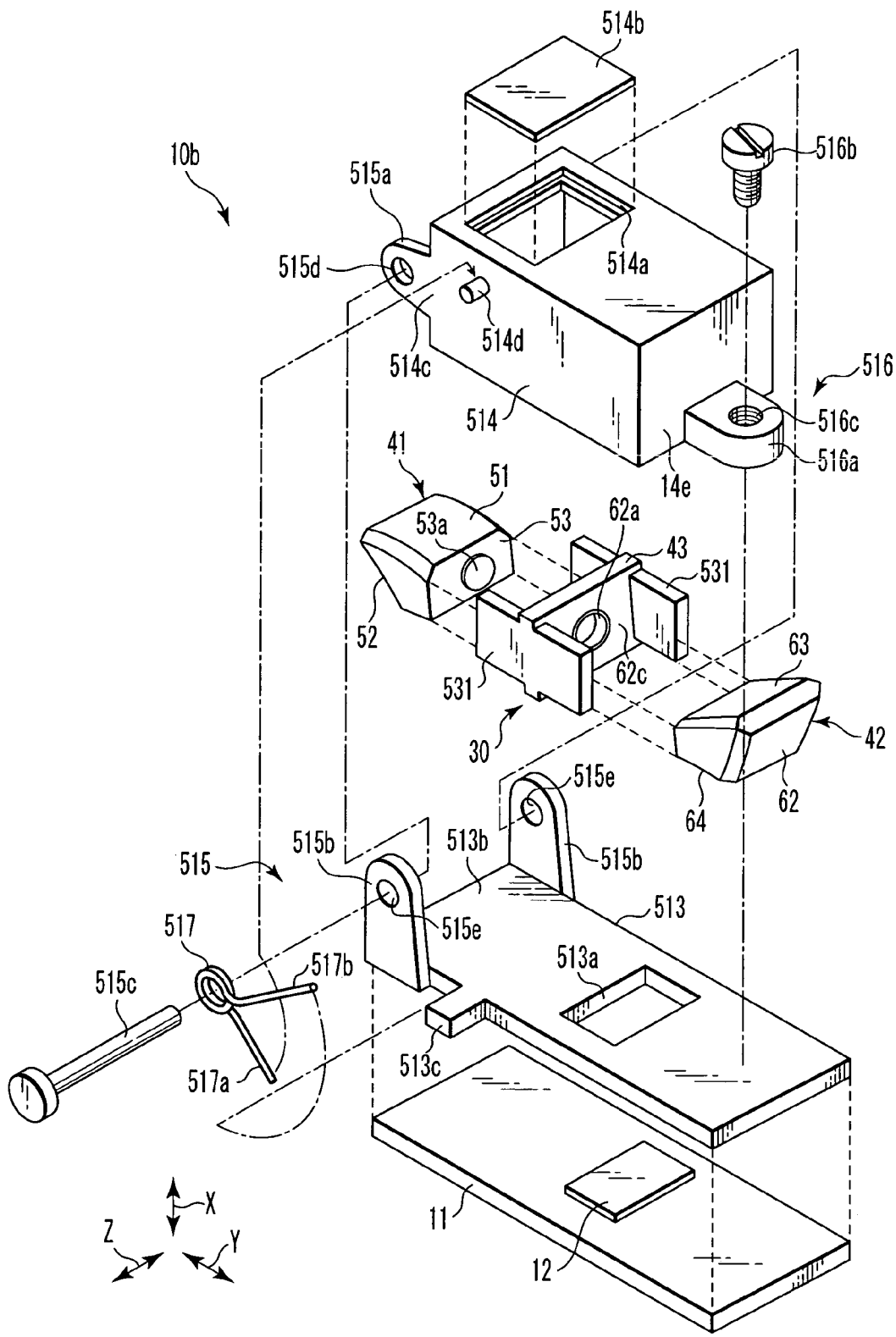
F I G. 27

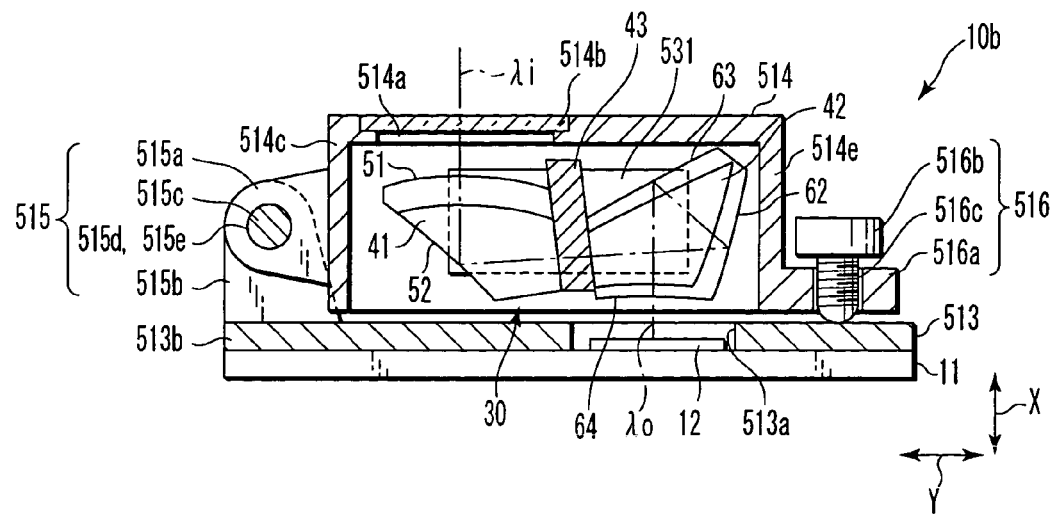
F I G. 30
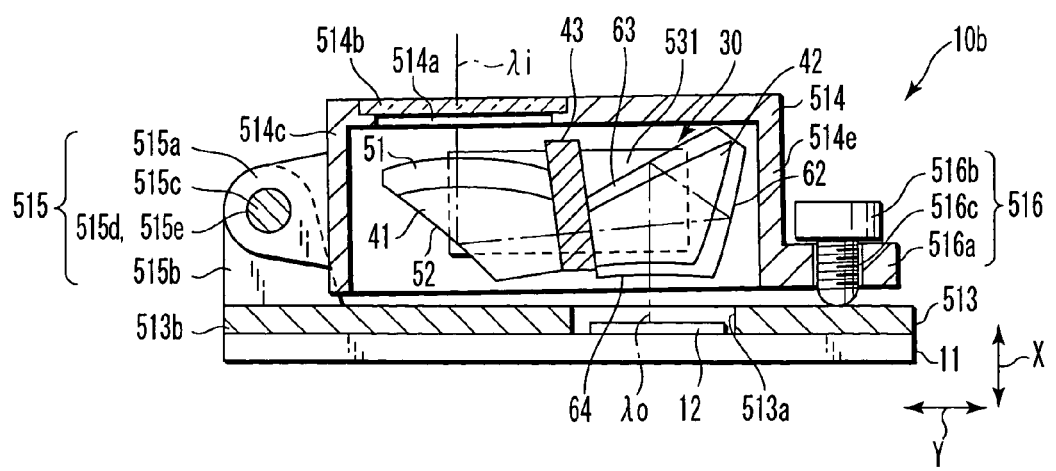
F I G. 31

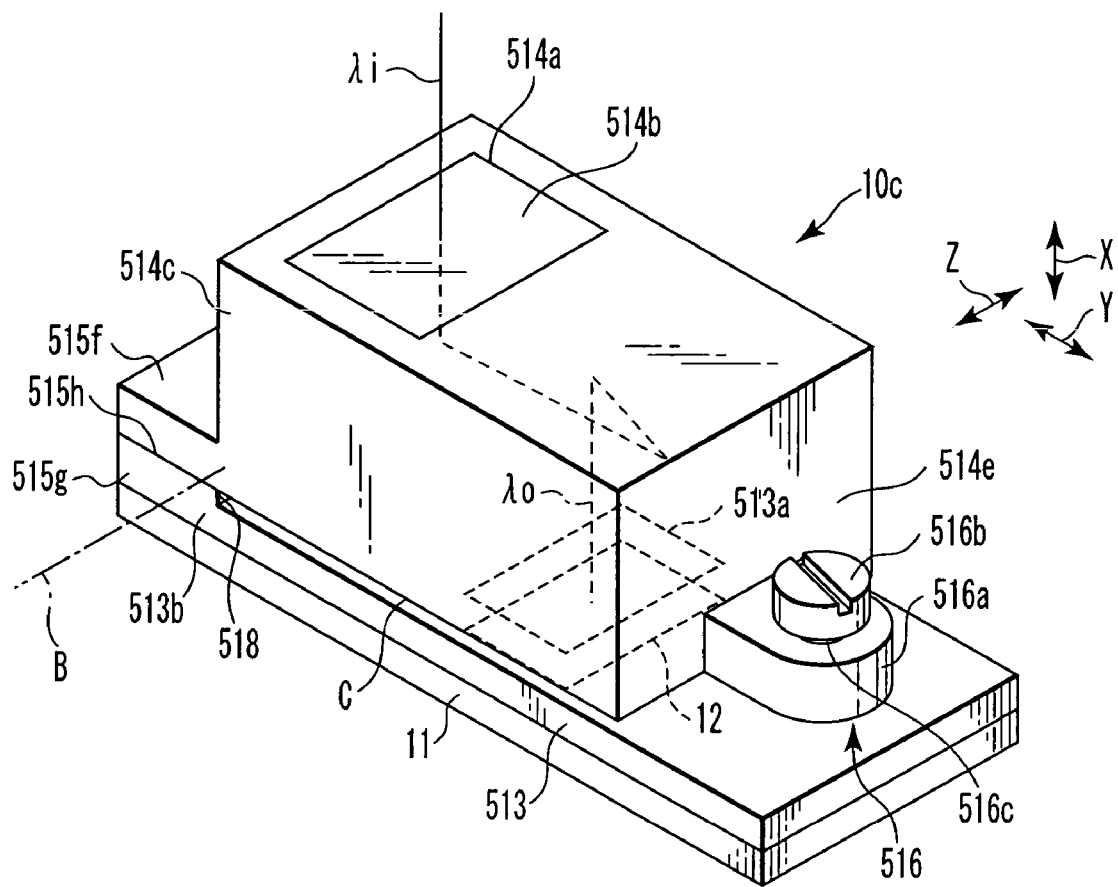
F I G. 32

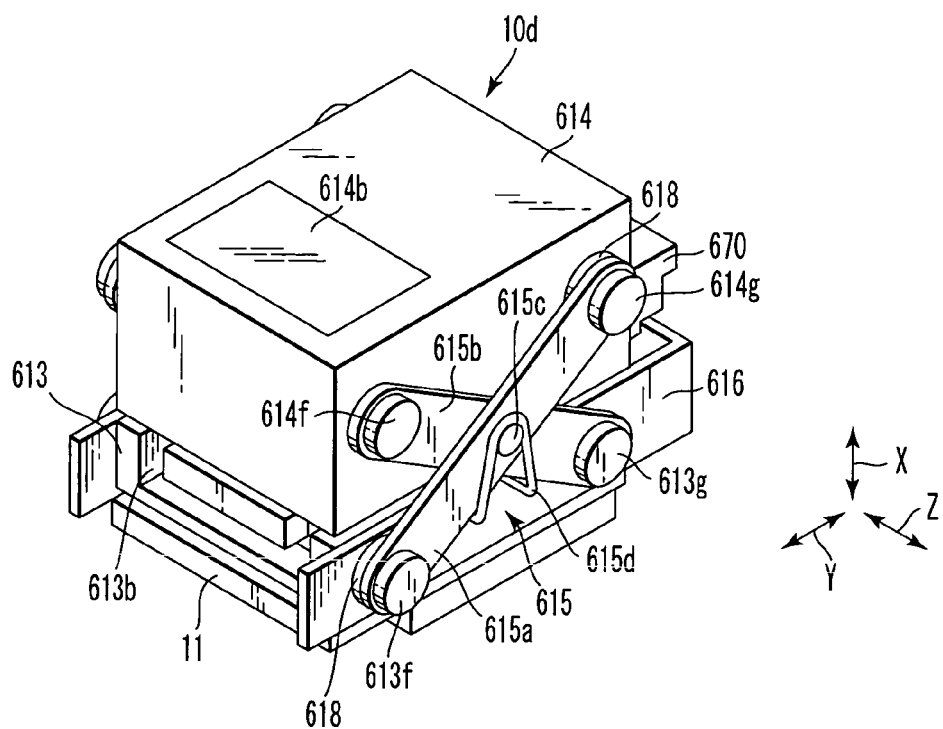
F I G. 34
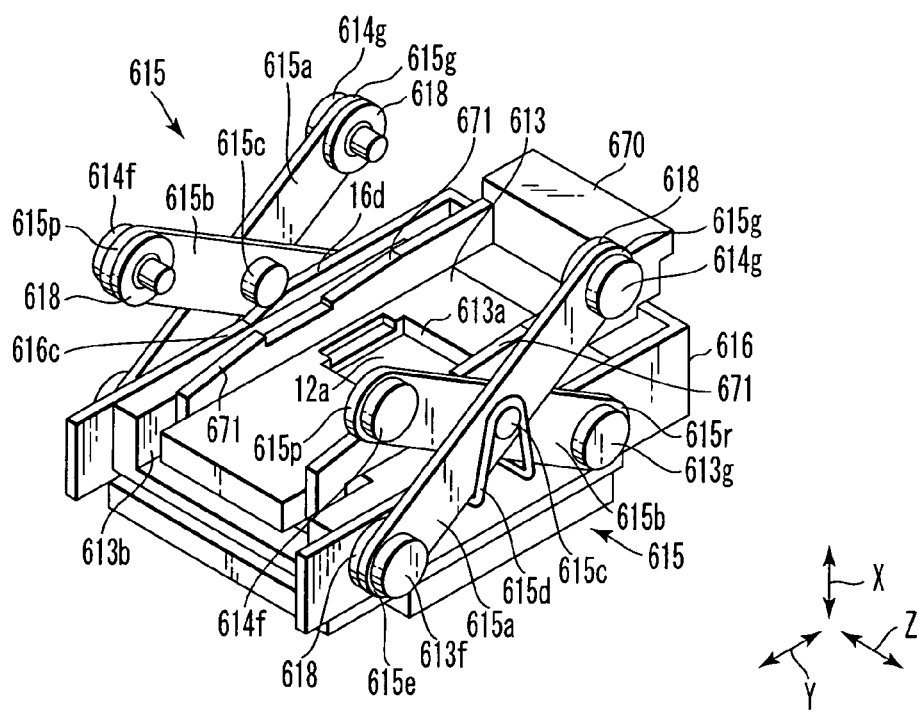
F I G. 35

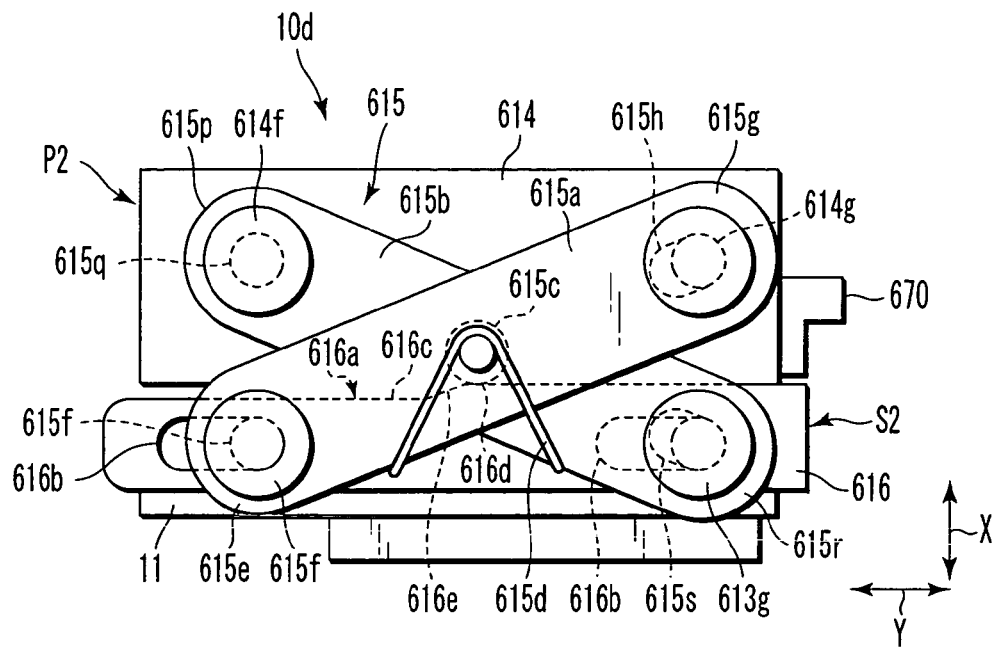
F I G. 40
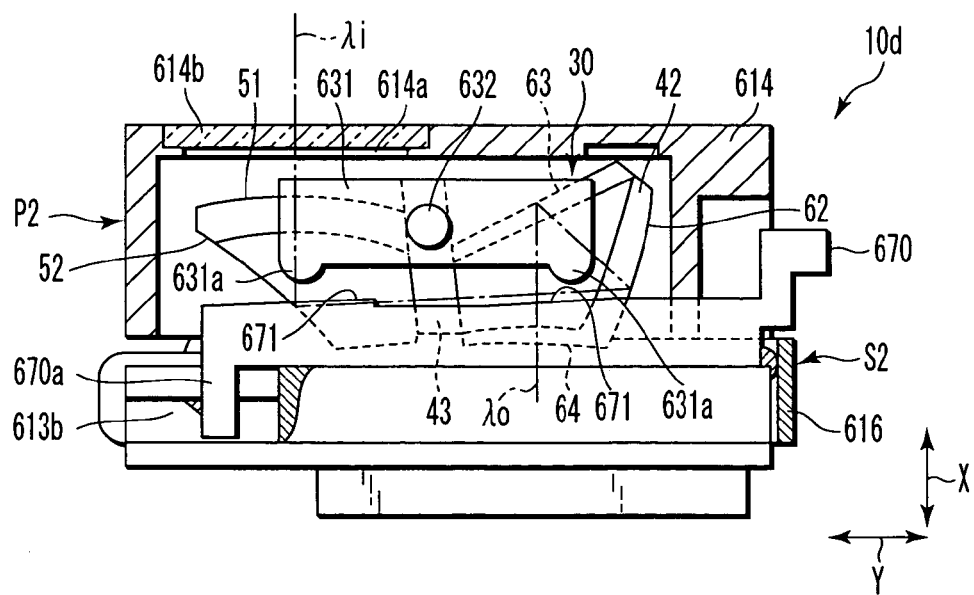
F I G. 41

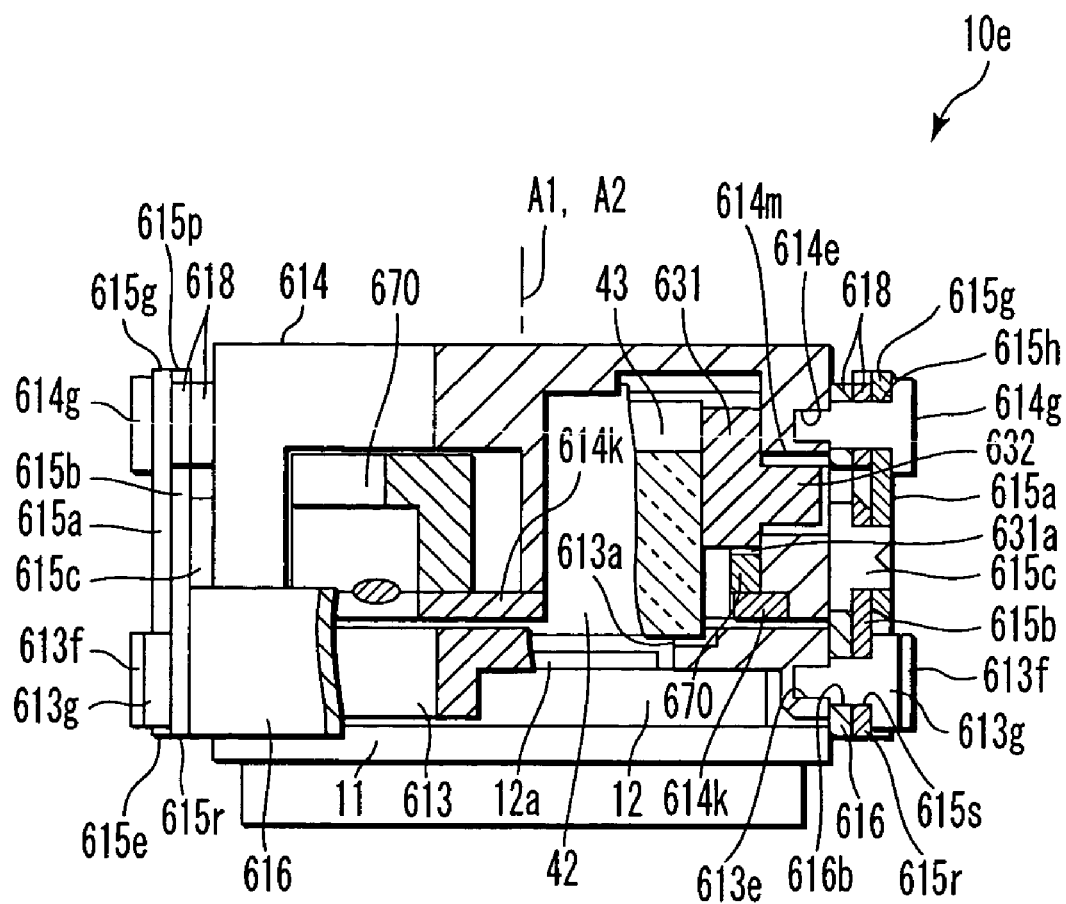
F I G. 43

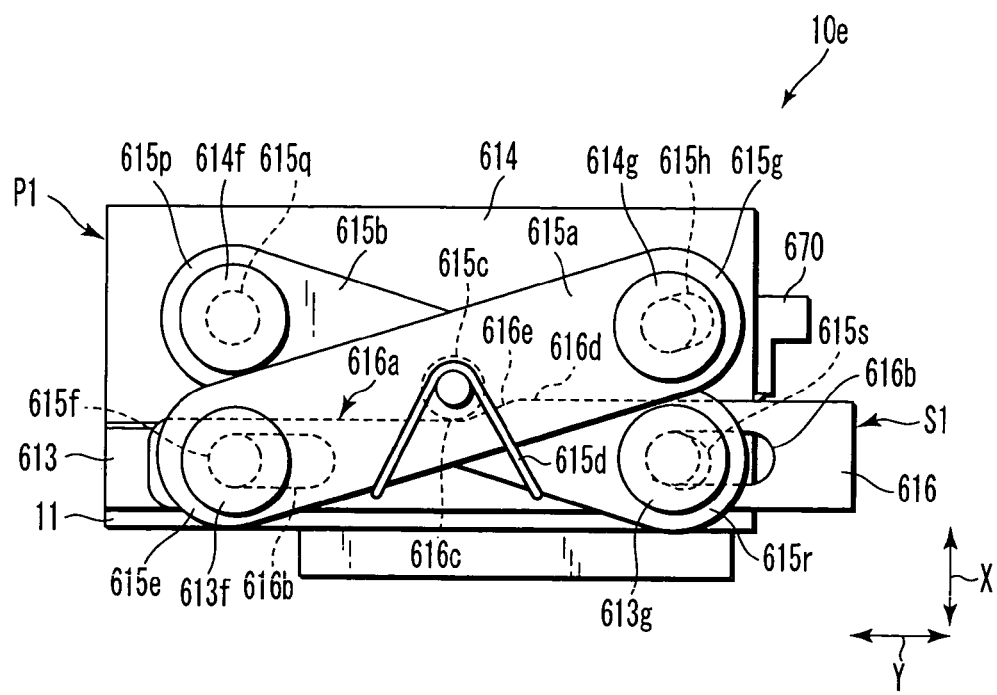
F I G. 44
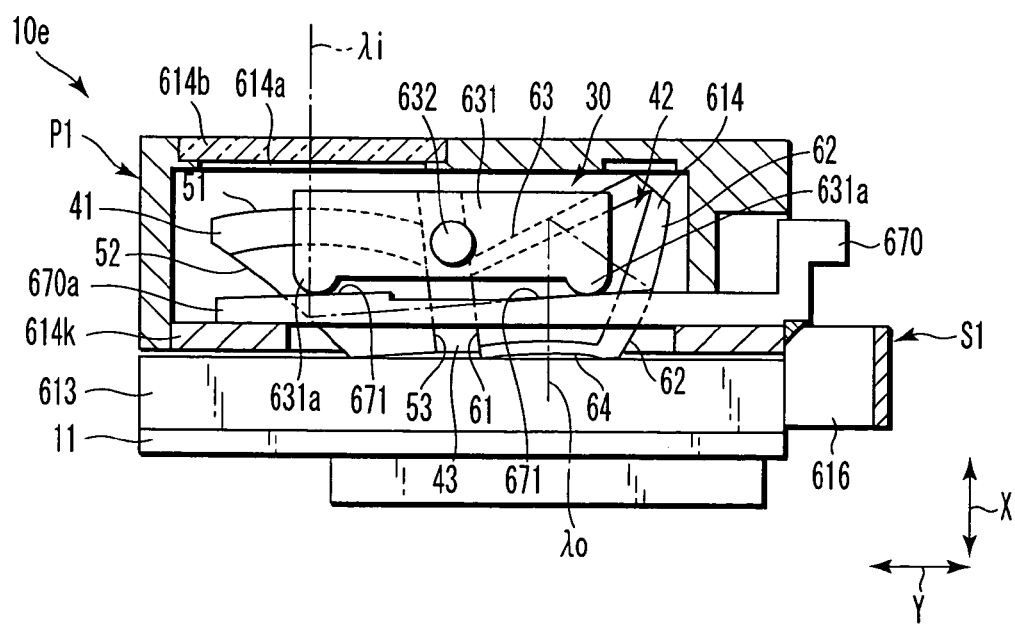
F I G. 45

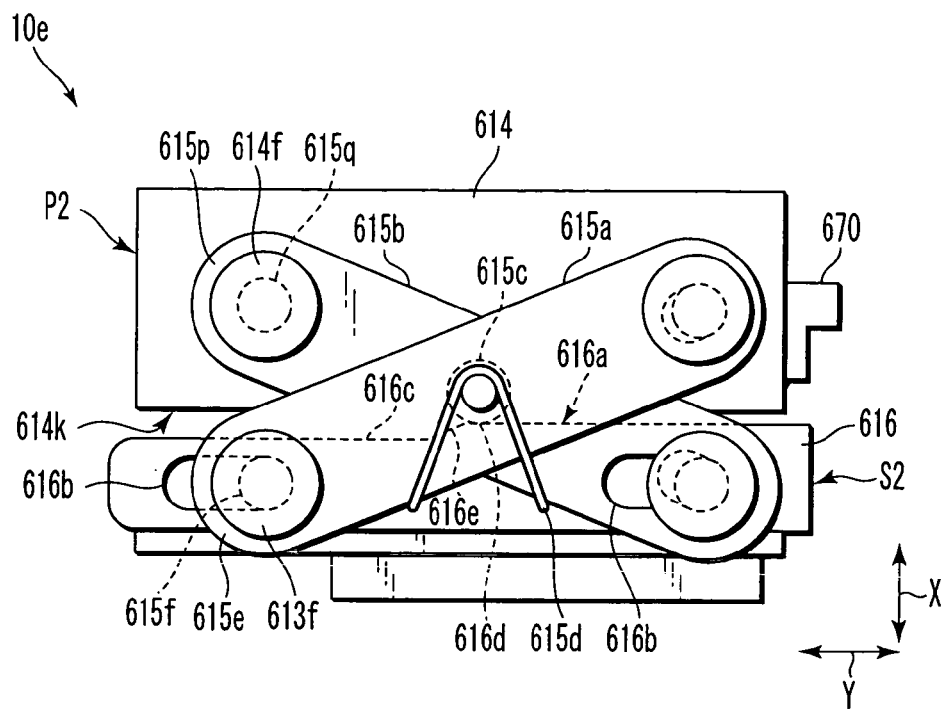
F I G. 46
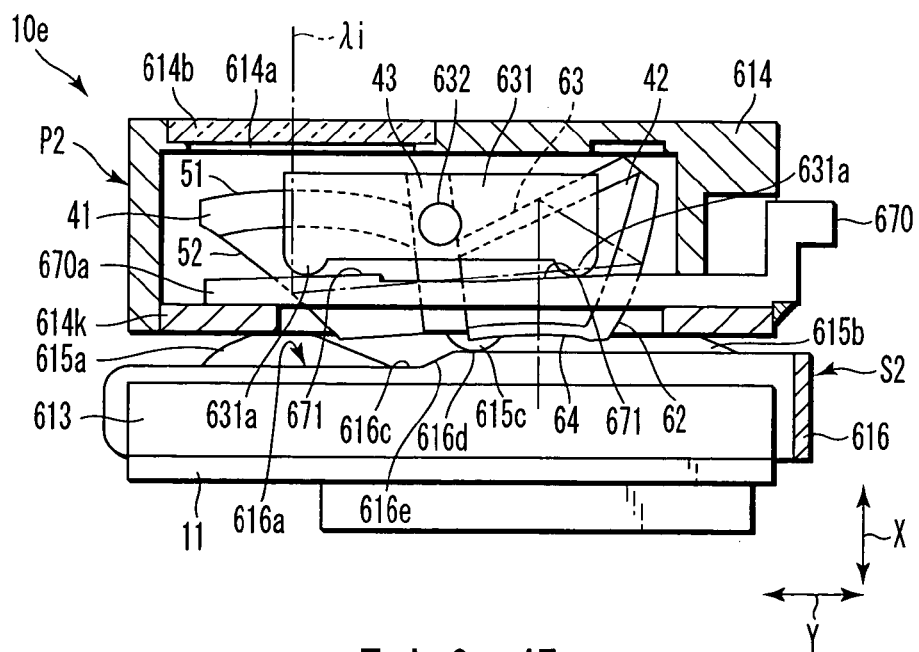
F I G. 47

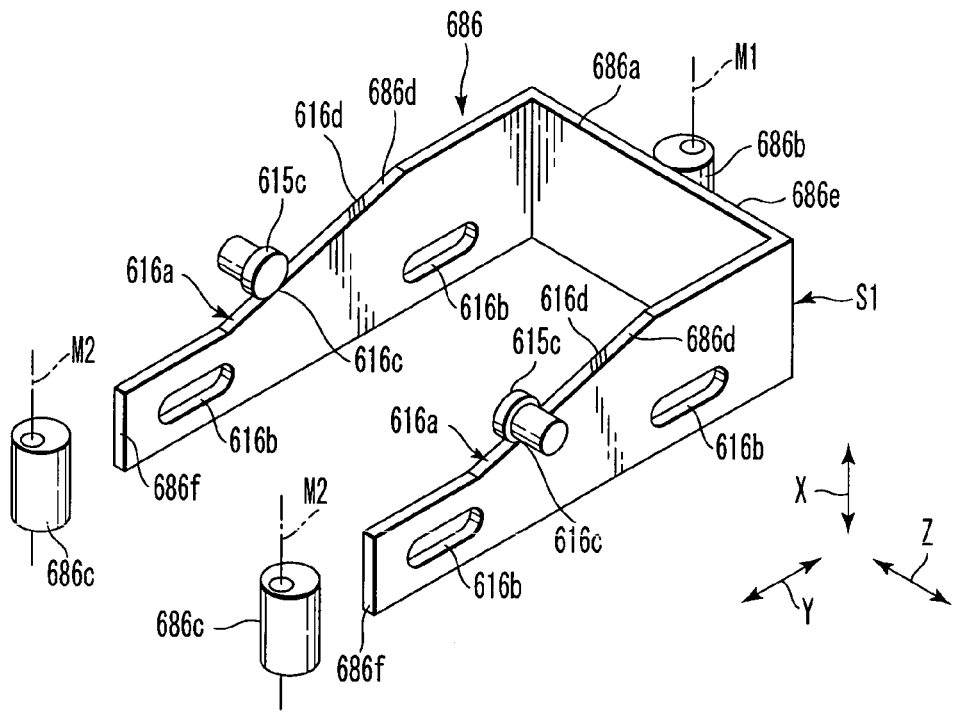
F I G. 48
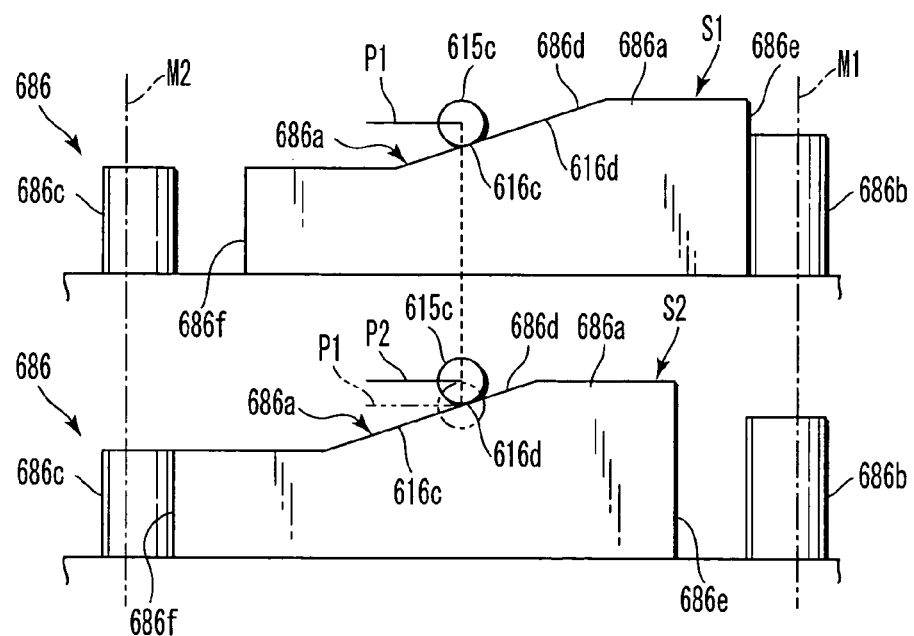
F I G. 49

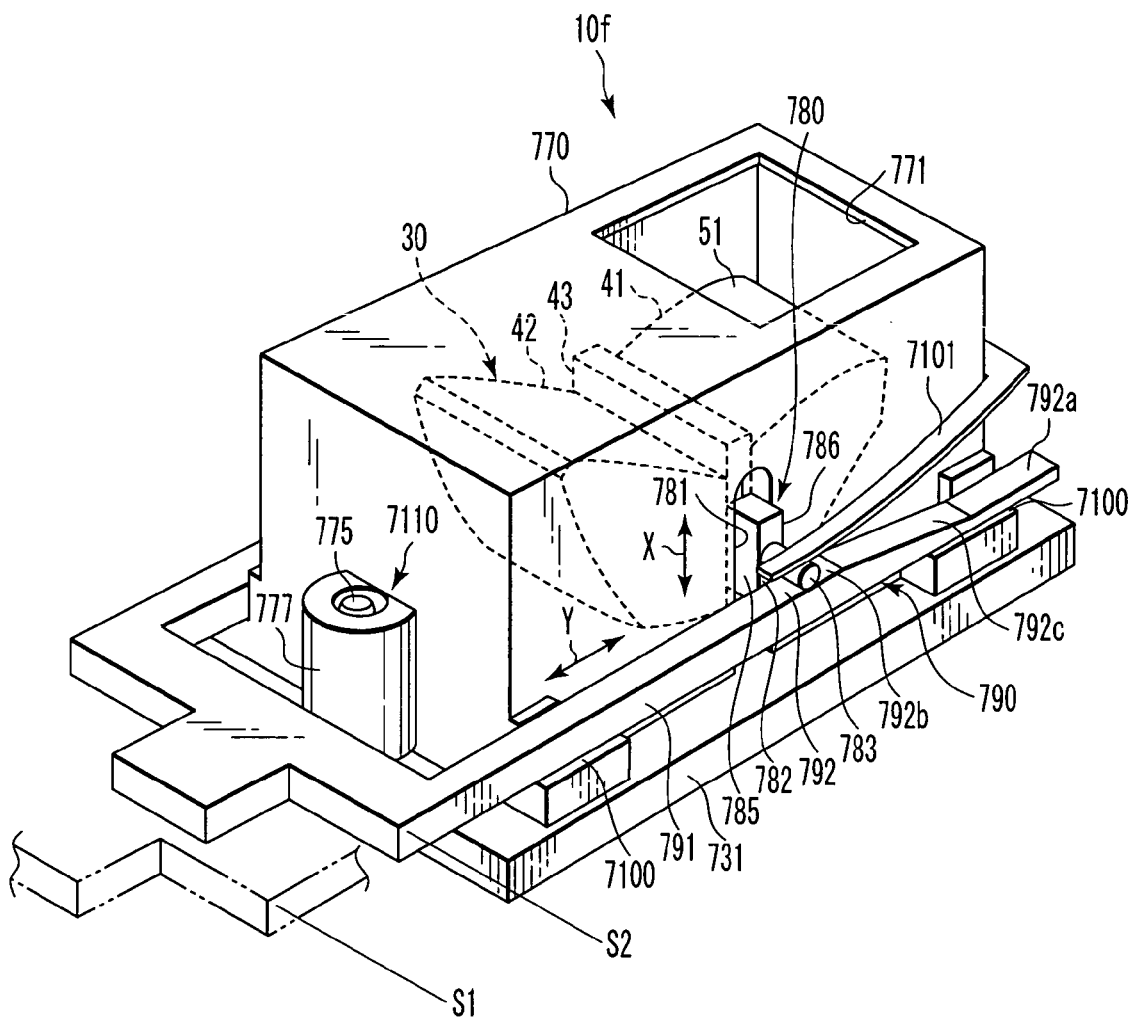
F I G. 50

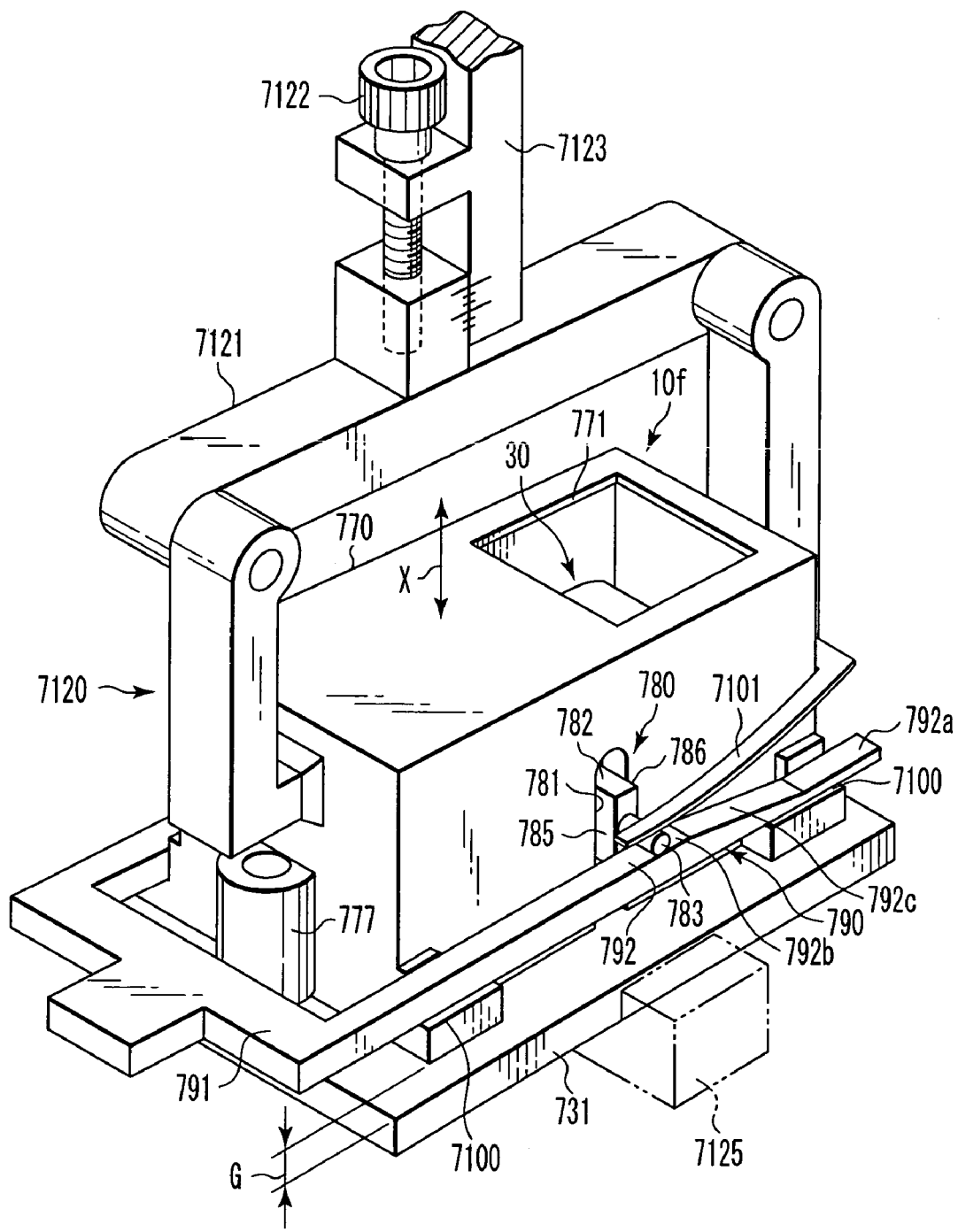
F I G. 52

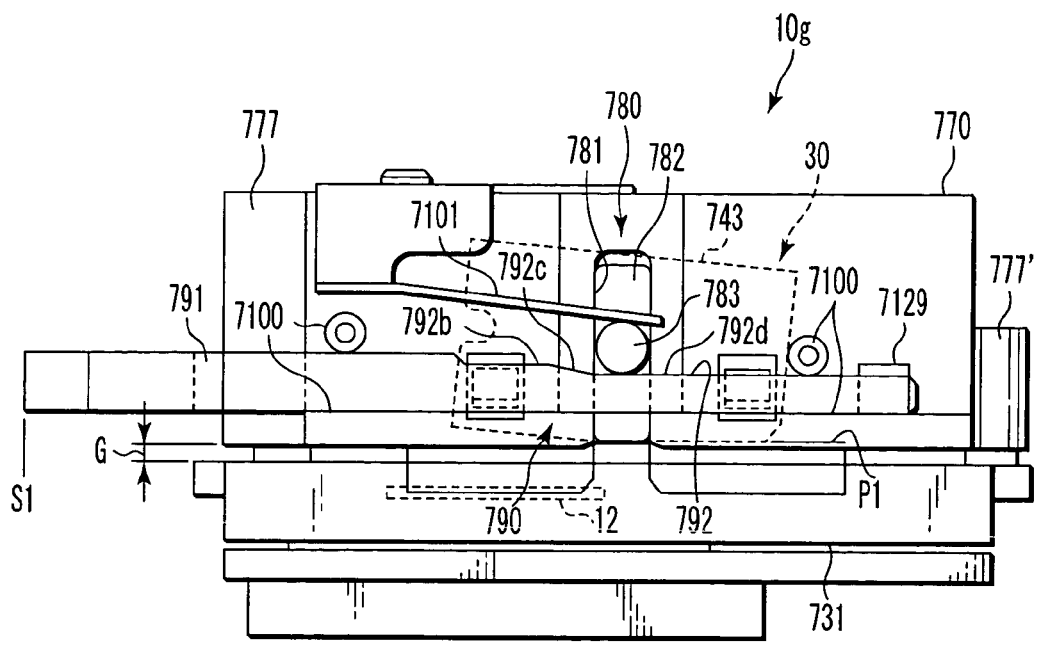
F I G. 54
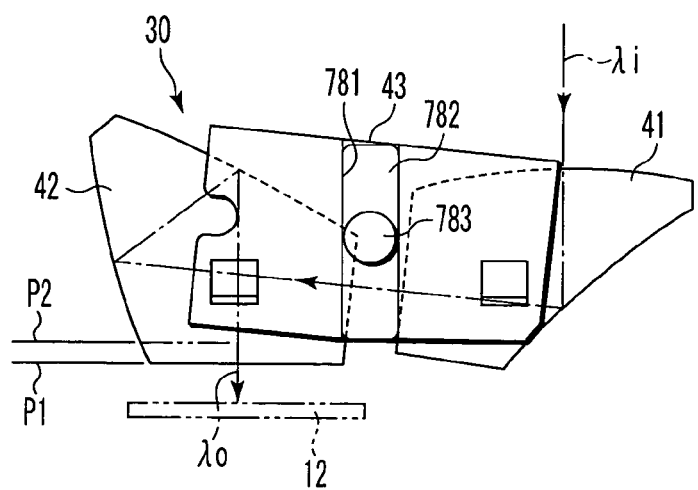
F I G. 55

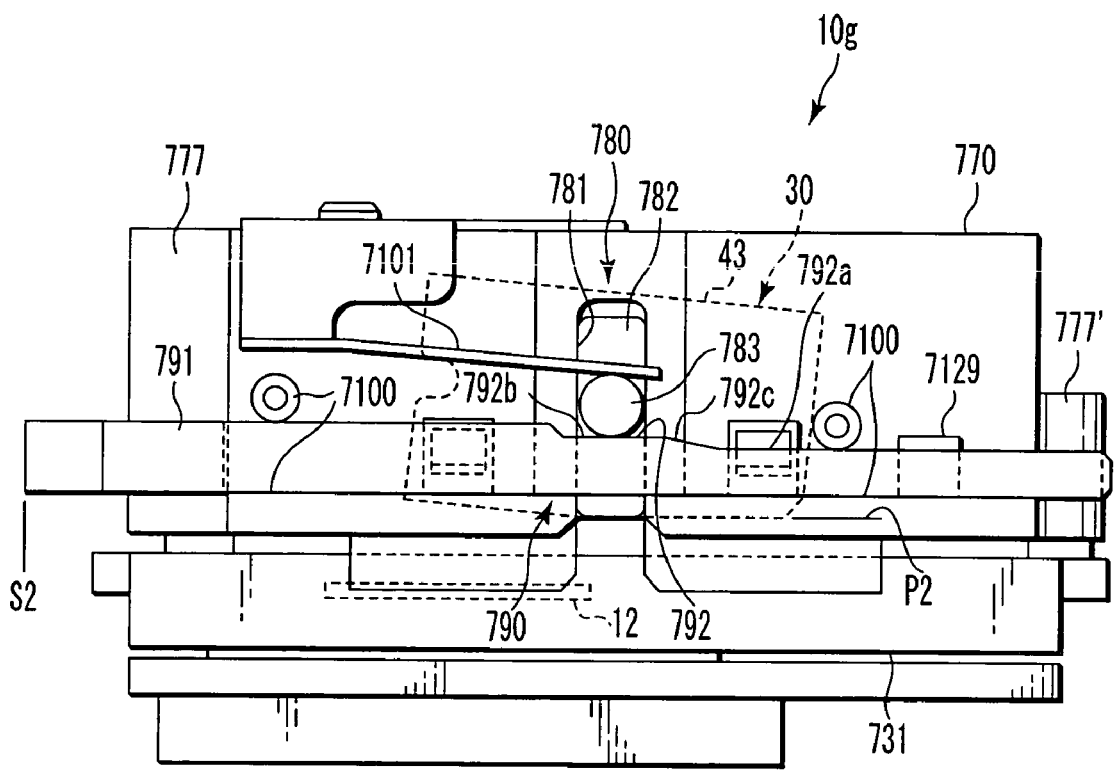
F I G. 56

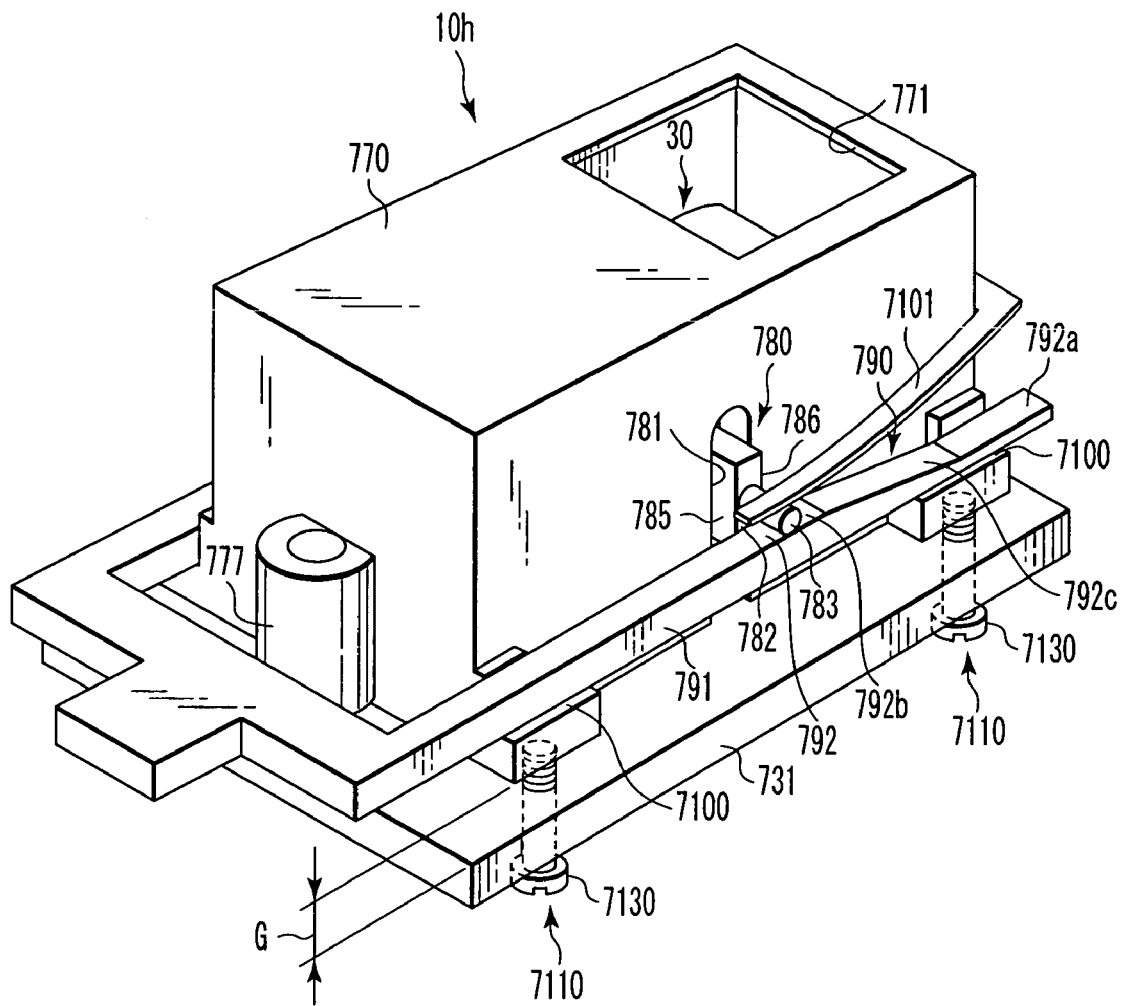
F I G. 57

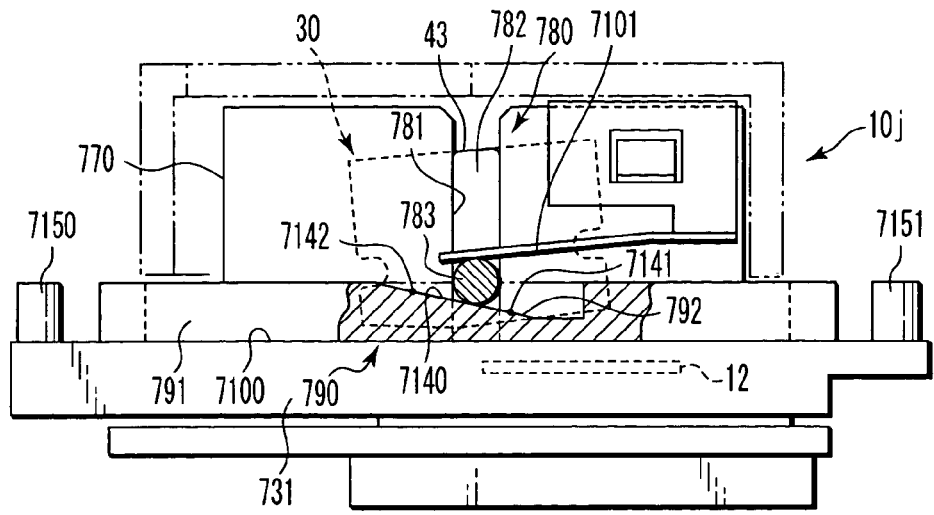
F I G. 59
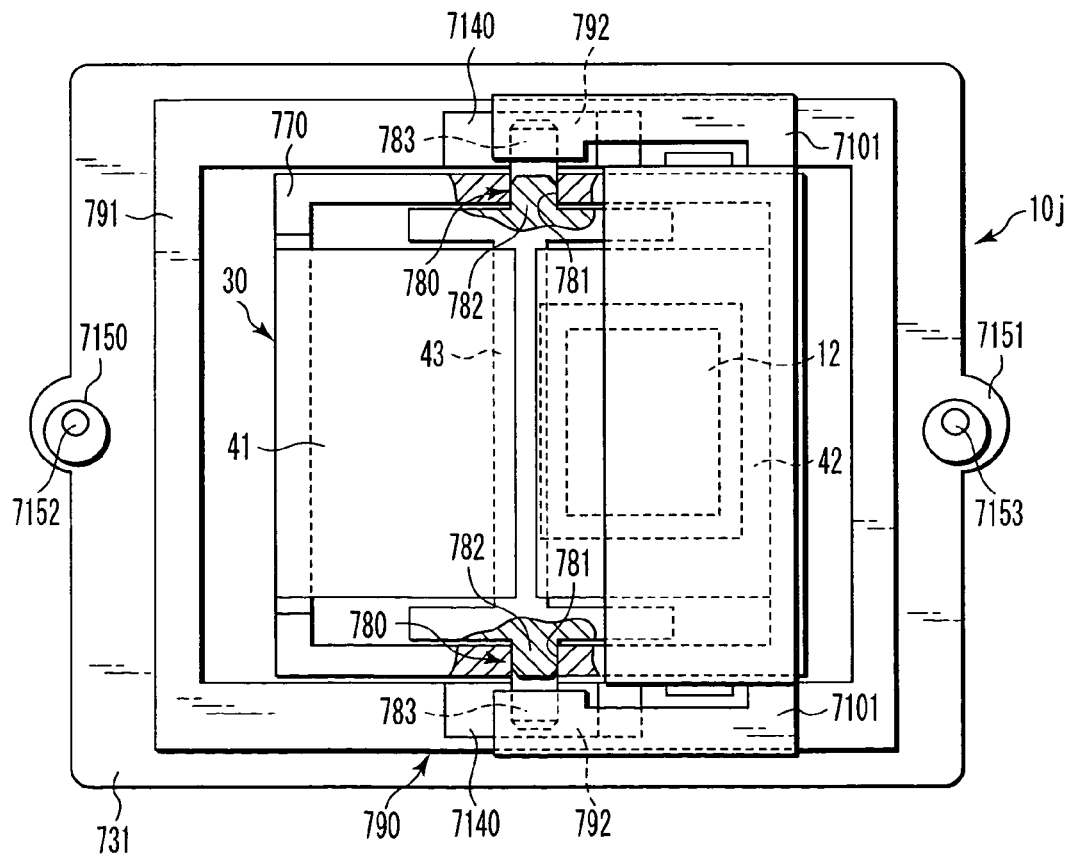
F I G. 60

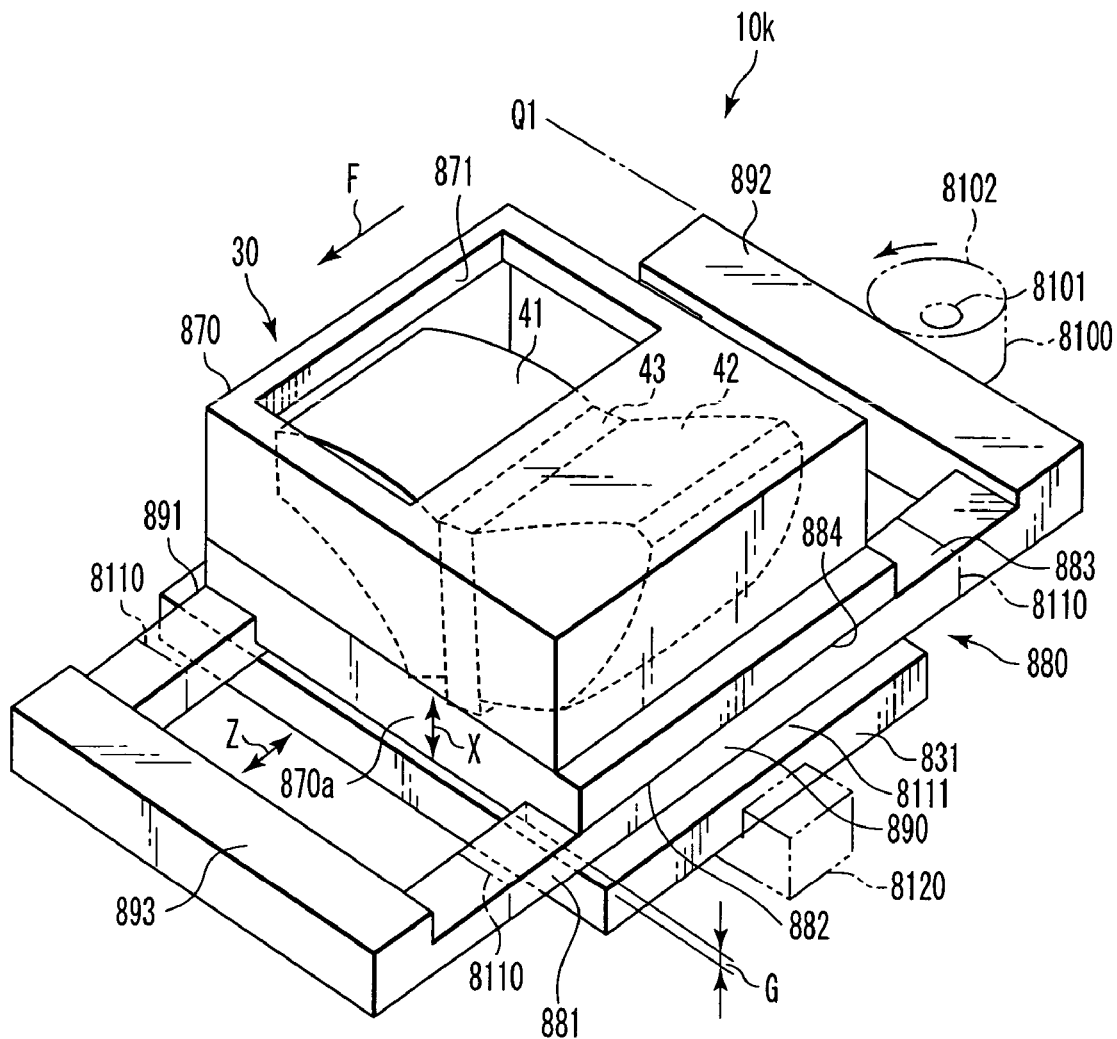
F I G. 61

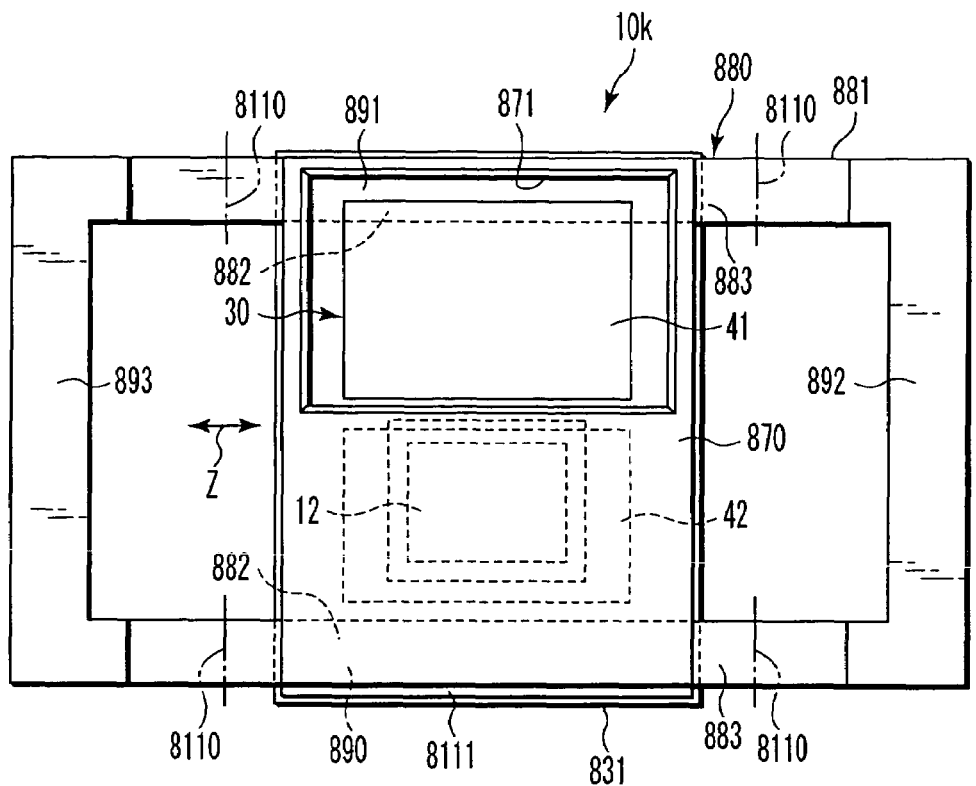
F I G. 62
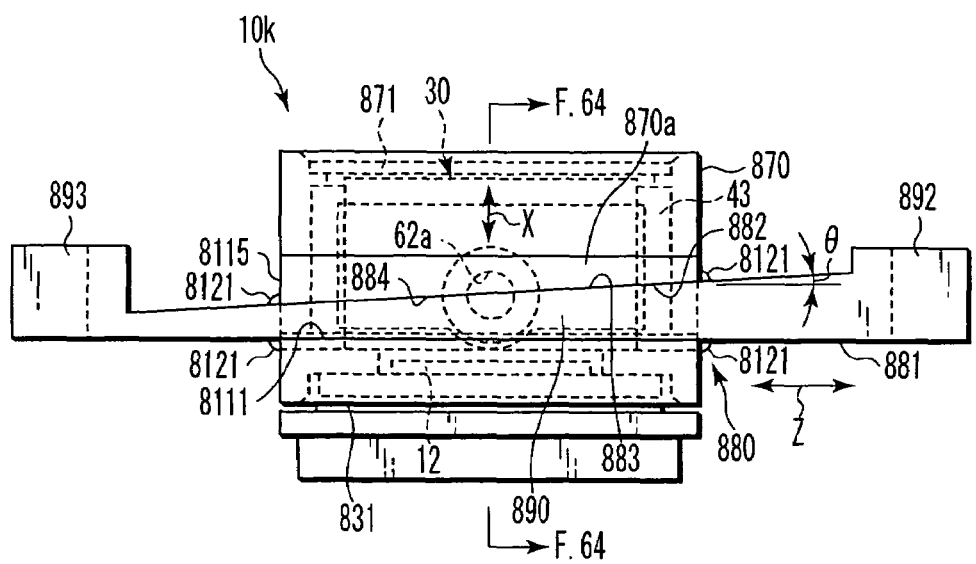
F I G. 63

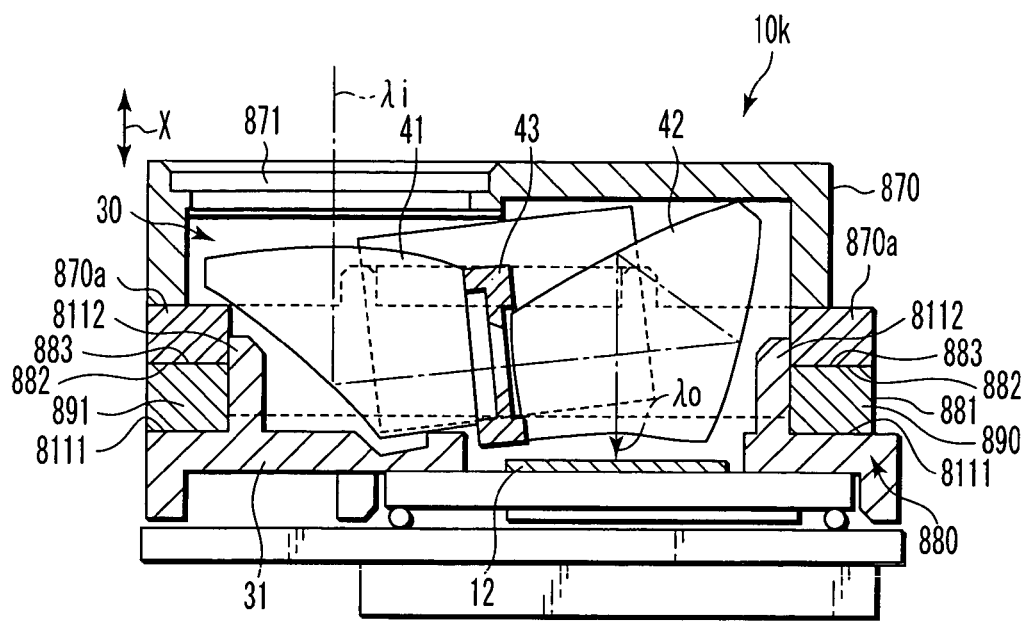
F I G. 64
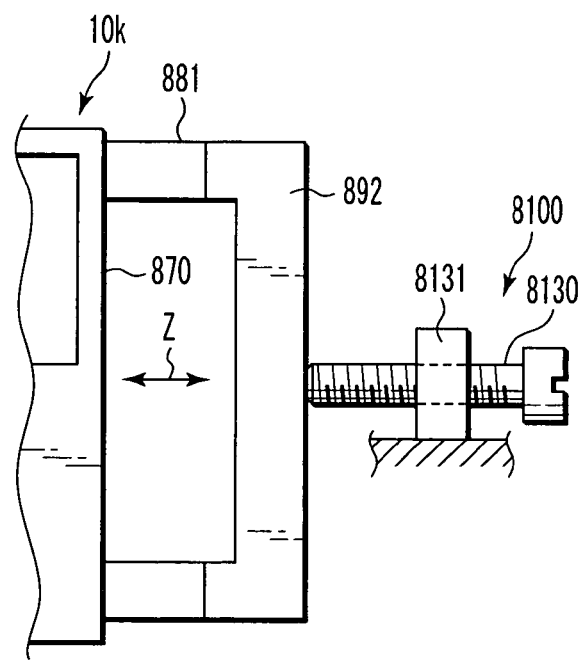
F I G. 65

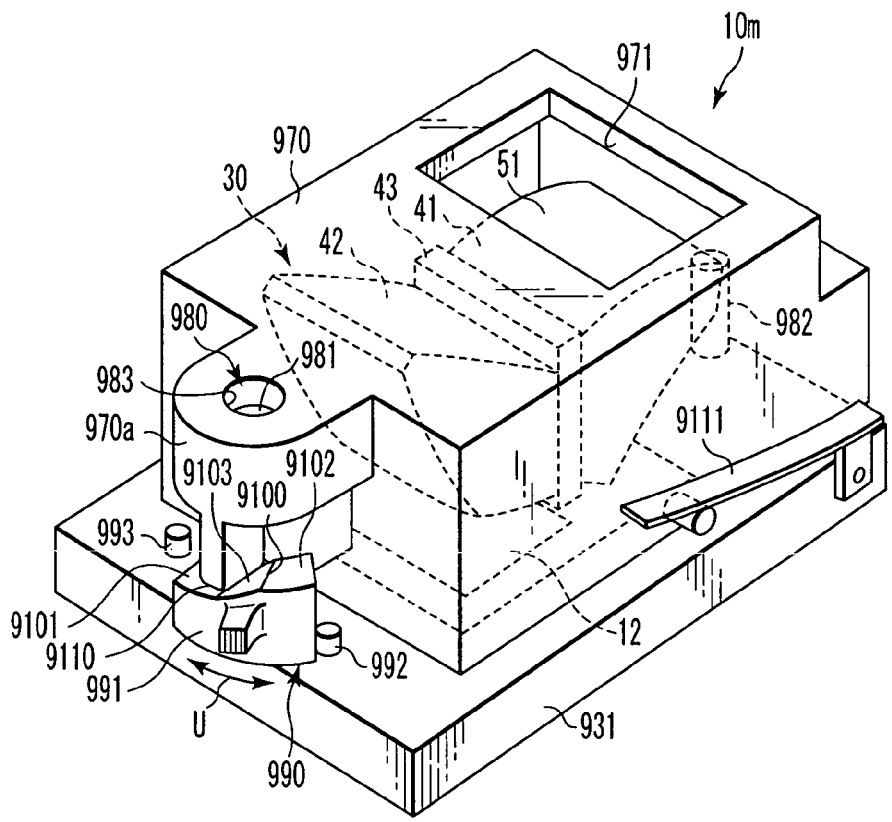
F I G. 66
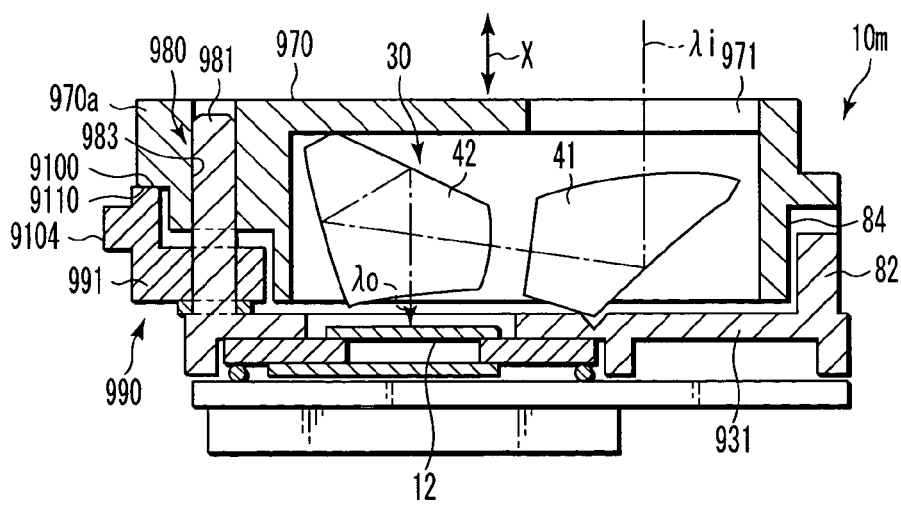
F I G. 67

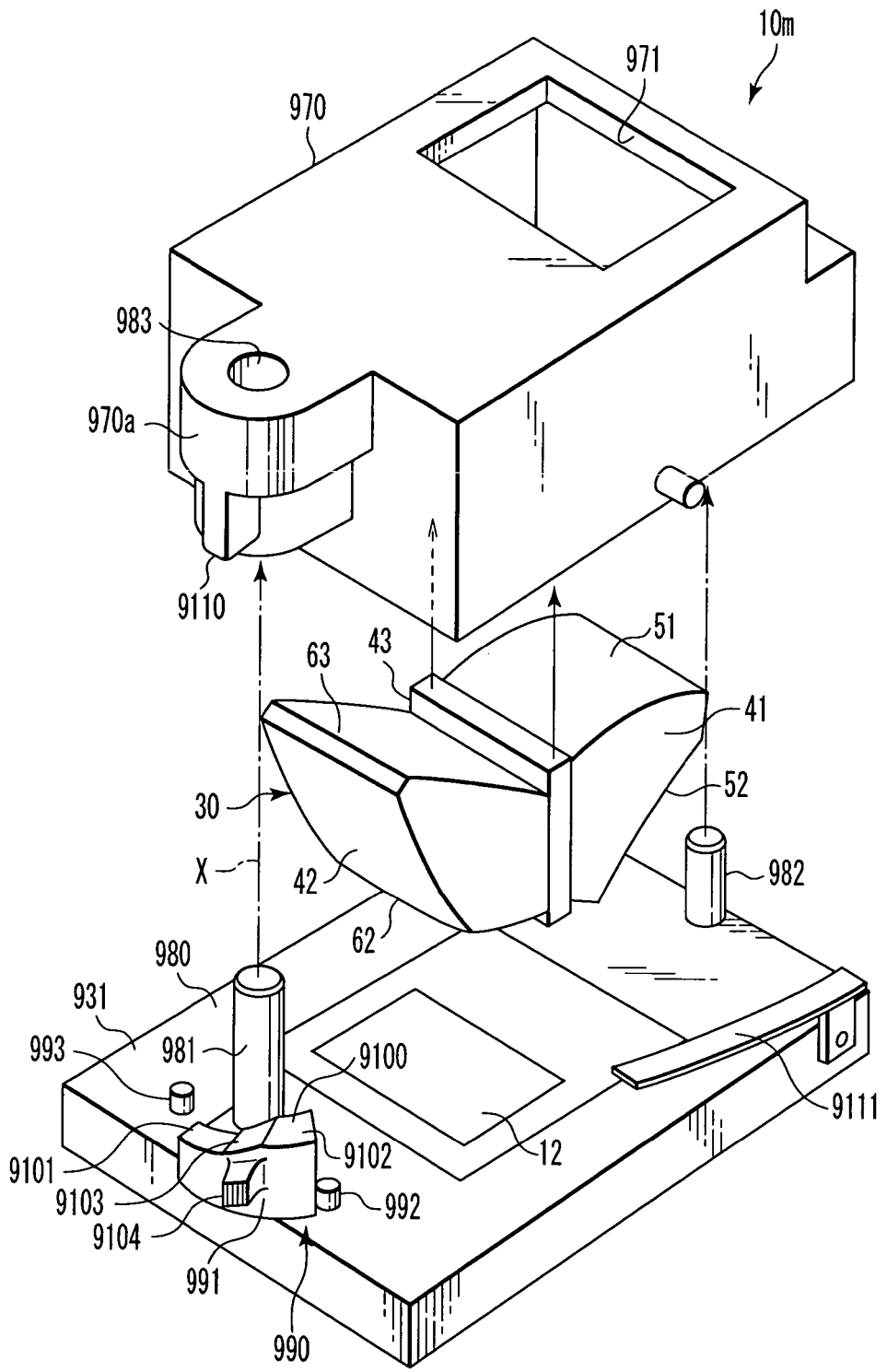
F I G. 68

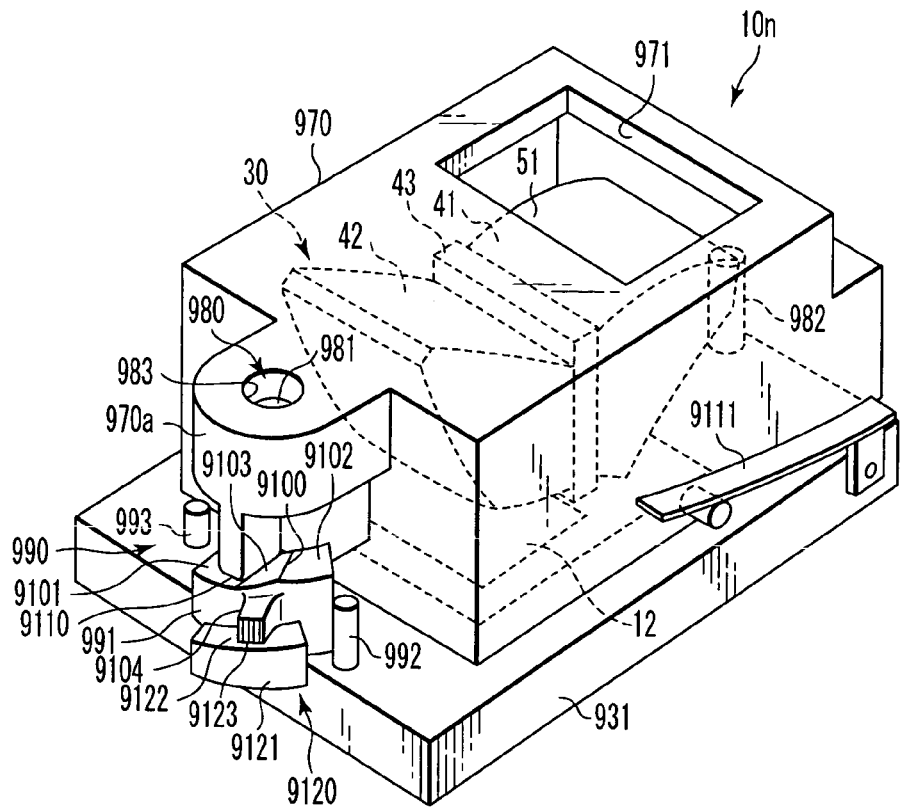
F I G. 71
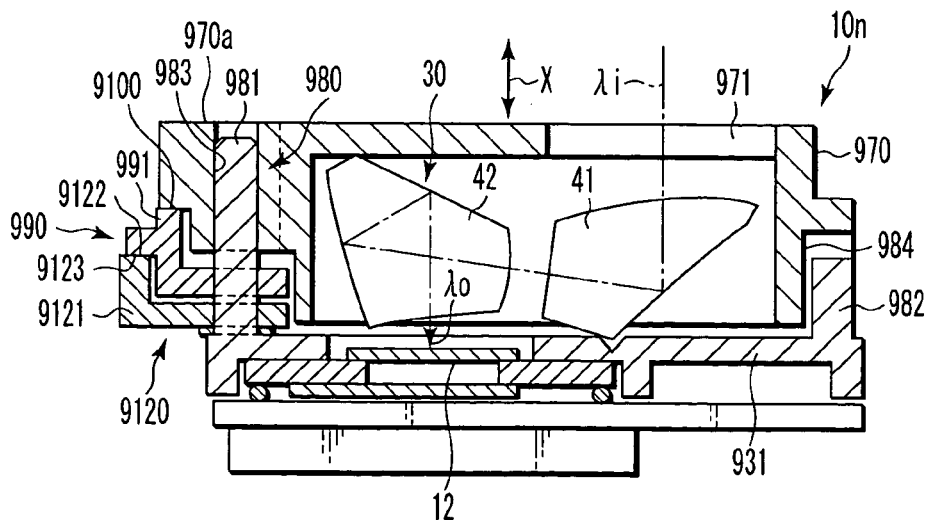
F I G. 72

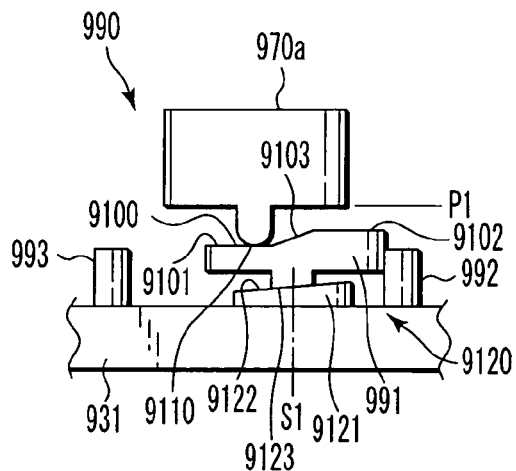
F I G. 73A
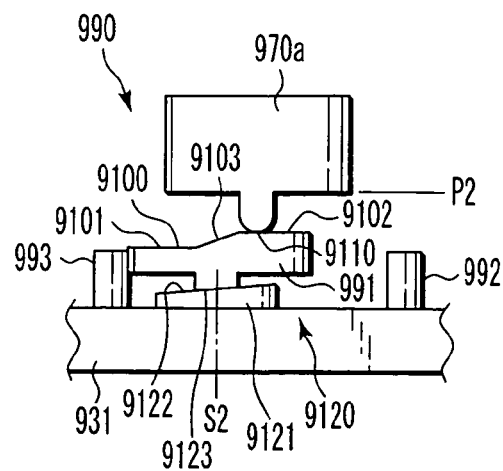
F I G. 73B
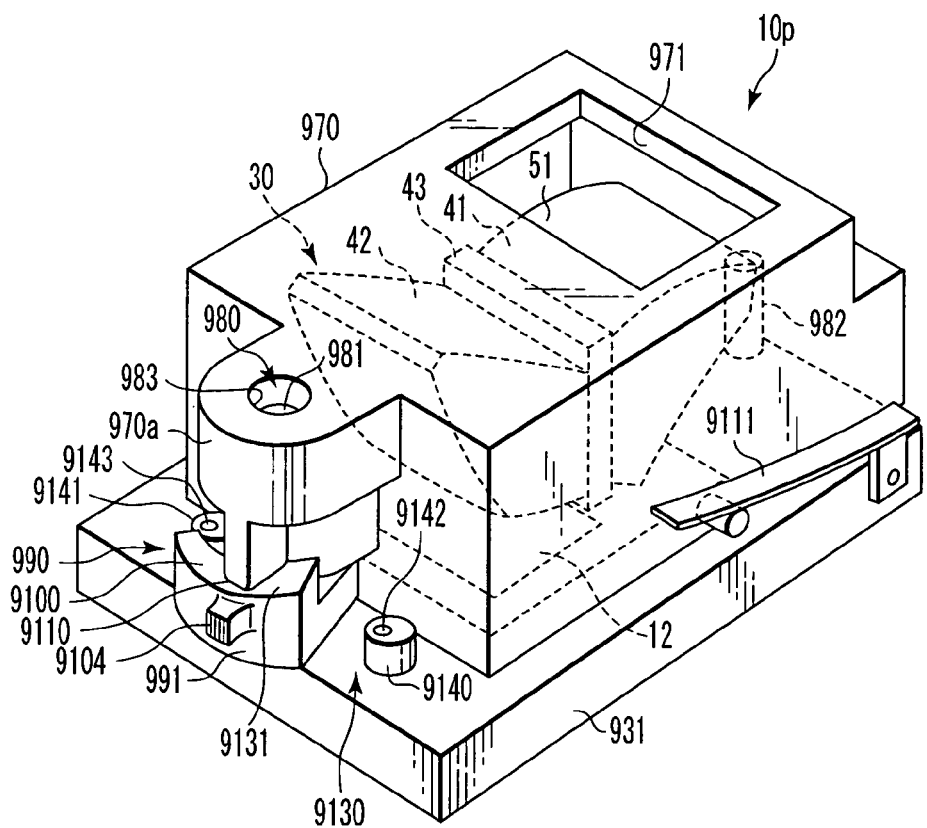
F I G. 74

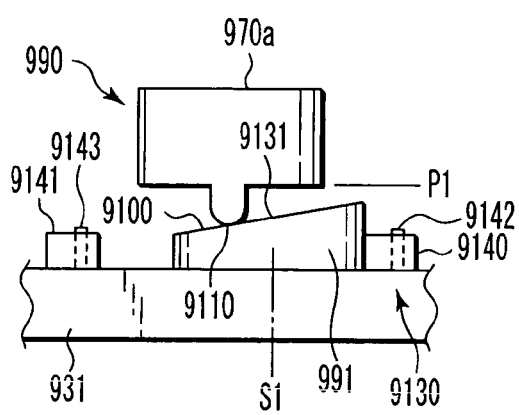
F I G. 75A
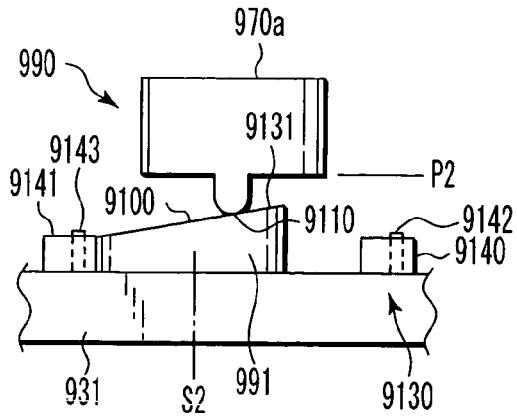
F I G. 75B
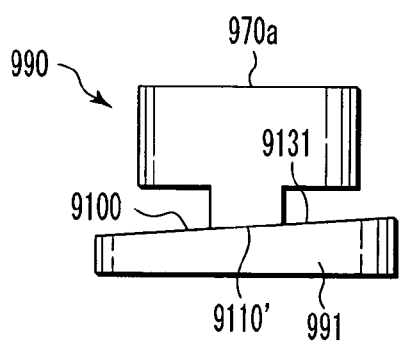
F I G. 76

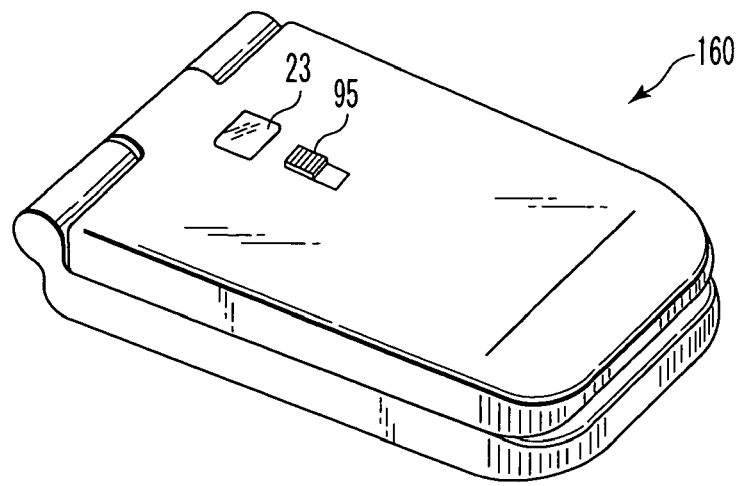
F I G. 77
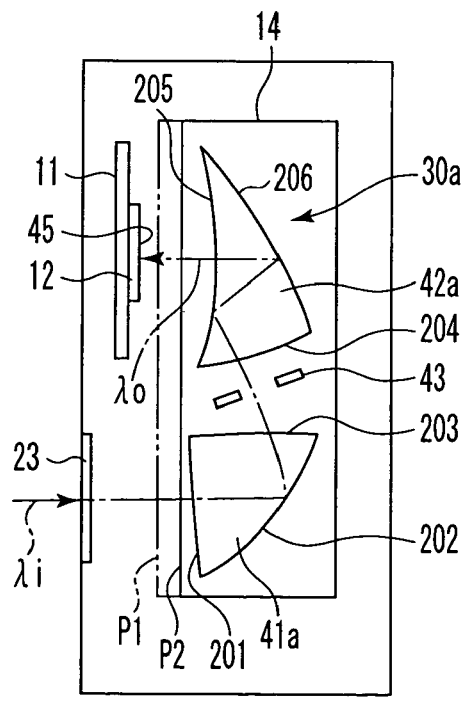
F I G. 78

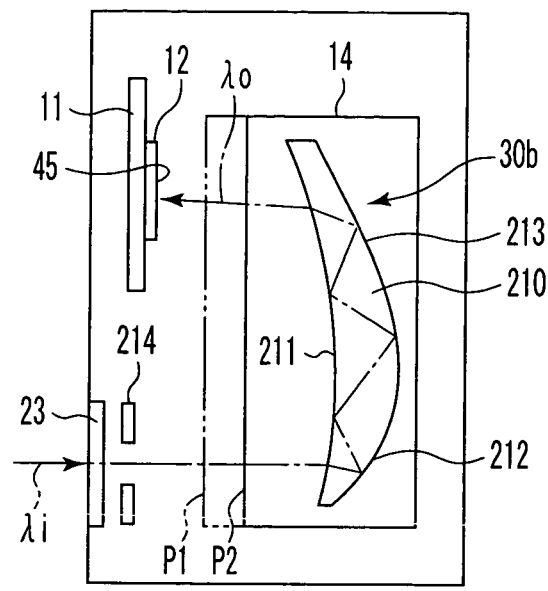
F I G. 79
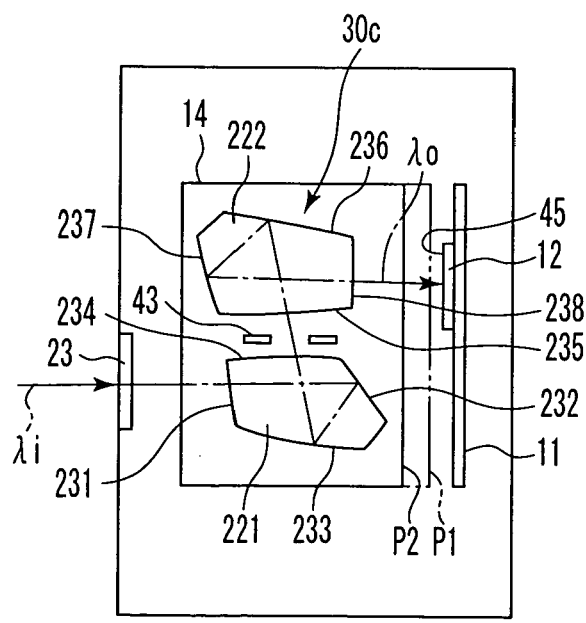
F I G. 80

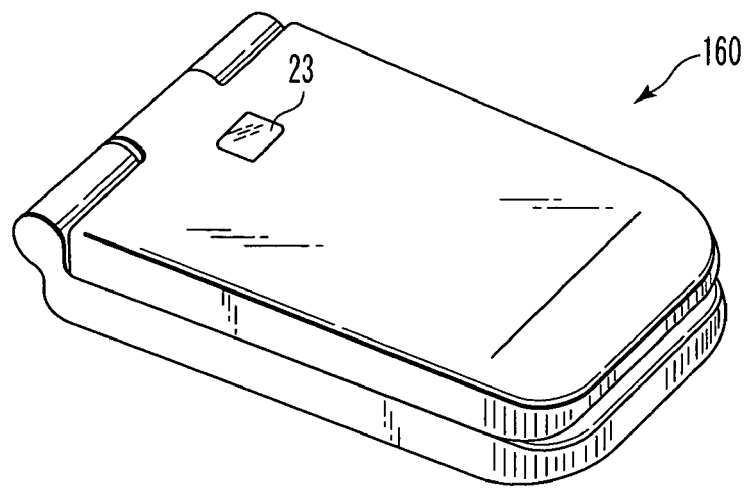
F I G. 83
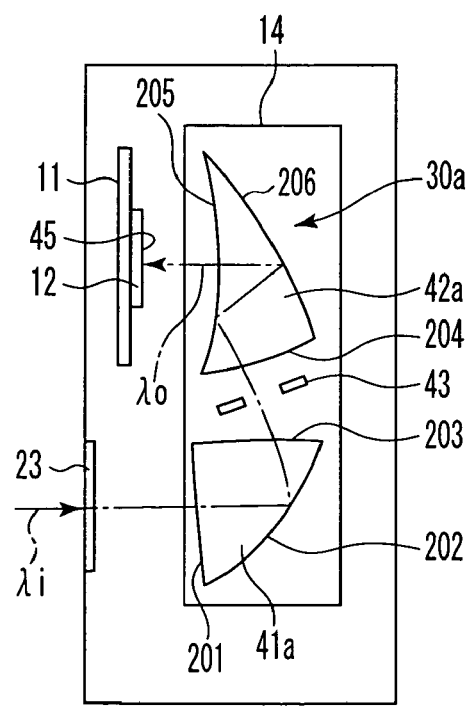
F I G. 84

IMAGE SENSING DEVICE, IMAGE SENSING APPARATUS, AND IMAGE SENSING POSITION SWITCHING METHOD

CROSS-REFERENCE TO RELATED APPLICATIONS

This application is based upon and claims the benefit of priority from prior Japanese Patent Applications No. 2003-373595, filed Oct. 31, 2003, No. 2003-373596, filed Oct. 31, 2003, No. 2003-373597, filed Oct. 31, 2003, No. 2003-373598, filed Oct. 31, 2003, No. 2003-373599, filed Oct. 31, 2003; and No. 2003-373600, filed Oct. 31, 2003 the entire contents of all of which are incorporated herein by reference.

BACKGROUND OF THE INVENTION

1. Field of the Invention

The present invention relates to an image sensing device used in a digital camera or a cellular phone with a camera and, more particularly, to an image sensing device which uses a prism having a free-form surface as a reflecting surface, an image sensing apparatus using the image sensing device, and an image sensing position switching method.

2. Description of the Related Art

In recent years, a number of applications for image sensing apparatuses which use a coaxial optical system have been filed as image sensing apparatuses used in digital cameras or cellular phones with a camera. In a coaxial optical system, optical elements such as a lens are rotationally symmetrical with respect to the optical axis (an axis which connects the center of the aperture of the image sensing system and the center of the image sensing screen) of the optical system. Image sensing apparatuses having a coaxial system are disclosed in, e.g., Jpn. Pat. Appln. KOKAI Publications No. 2001-272587 (reference 1), No. 2002-267928 (reference 2), and No. 2002-320122 (reference 3).

Recent digital cameras and cellular phones with a camera are required to be compact and thin and have high performance. In these devices, if the image sensing device using a coaxial optical system should be compact, the number of lenses must be decreased. However, when the number of lenses is decreased, aberrations generated in the optical system can hardly be suppressed, resulting in poor image quality. To obtain a high image quality, the number of lenses must be increased. As a result, the image sensing device becomes bulky.

As a means for solving these problems, image sensing apparatuses using an eccentric optical system have been proposed. Image sensing apparatuses using an image sensing optical system using a prism with a free-form surface are disclosed in, e.g., Jpn. Pat. Appln. KOKAI Publications No. 11-326766 (reference 4), No. 2002-196243 (reference 5), and No. 2003-84200 (reference 6).

In this specification, a "free-form surface" means a curved surface which is rotationally asymmetrical with respect to the optical axis of the light beam which strikes the surface or the optical axis of the light beam which exits from the surface and has only one mirror image surface along these optical axes.

The techniques described in references 4 to 6 aim at obtaining a compact device and a high-quality image by forming an image sensing optical system by using a prism having a free-form surface as a light incident surface, light exit surface, or reflecting surface. Especially, in references 5 and 6, two prisms are combined. The light incident surface, reflecting surface, and light exit surface of the first prism close to the object and the light incident surface, two reflecting surfaces, and light exit surface of the second prism close to the image sensing surface, i.e., a total of seven surfaces are formed as free-form surfaces.

The characteristic features of such an optical system are as follows.

(1) The three reflecting surfaces are formed from free-form surfaces having a power (refracting power). These reflecting surfaces can obtain a large power and are rarely affected chromatic aberration as compared to a refractive optical system such as a lens.

(2) The seven optical surfaces can be formed in a compact space. Hence, the optical elements are concentratedly set in the limited space.

(3) To obtain high optical performance, the optical path length of the entire optical system is preferably long to some extent. When the optical path is bent by using such a prism optical system, the optical path length of the optical system can be long, and the entire size can be small.

For these reasons, a high image quality can be obtained by a compact device.

The optical system described in Jpn. Pat. Appln. KOKAI Publication No. 7-333505 (reference 7) includes a reflecting mirror, an optical system by a lens, and a reflecting mirror sequentially from the object side. As compared to this system, the optical system described in reference 5 or 6 can reduce the width. For this reason, a more compact image sensing device can be provided.

When an image sensing device is used in a compact and thin digital camera or a cellular phone with a camera, the angle of view of the image sensing optical system may be set to a wide angle to implement pan focus. In pan focus, an in-focus state is obtained almost throughout the object distance range by fixed focusing.

Recently, demands for reading a barcode or letters on books or originals by using a digital camera or a cellular phone with a camera having the image sensing device are growing. To meet these demands, the pan-focus image sensing device must have a mechanism suitable for macrophotography. However, references 1 to 6 described above have no description of this technique.

In mass-producing such image sensing apparatuses, it is difficult to accurately form an object image on the image sensing surface of the image sensing element to read an image due to variations in manufacturing dimensions of the optical system, variations in manufacturing dimensions of individual components of the holding frame of the optical system, variations of characteristics, or variations in assembling them.

To solve this problem, focus surface adjustment (to be referred to as fc adjustment hereinafter) must be done for individual image sensing apparatuses such that the position of the light-receiving surface of the image sensing element and the imaging plane can obtain the most satisfactory relationship. However, no fc adjustment mechanism suitable for such an image sensing device is described in the above prior arts. No means for implementing both the above-described mechanism suitable for macrophotography and the fc adjustment mechanism is disclosed, either.

BRIEF SUMMARY OF THE INVENTION

The present invention provides an image sensing device which can switch the prism unit between the first position and the second position in accordance with the image sensing distance of an object, and more preferably, can also execute fc adjustment. The present invention also provides an image sensing apparatus using the image sensing device.

An image sensing device according to the present invention comprises a prism unit, image sensing element, support member, first abutment portion, second abutment portion, third abutment portion, fourth abutment portion, and switching mechanism. The prism unit receives a light beam from an object and forms an object image on an imaging plane. The prism unit has at least two reflecting surfaces each having a free-form surface shape. An incident optical axis of the light beam input from the object and an exit optical axis of the light beam which exits from the prism unit to the imaging plane are arranged substantially in parallel at a predetermined interval. The image sensing element is arranged on the imaging plane and converts the object image formed by the prism unit into an electrical signal. The support member movably supports the prism unit within a predetermined movable range along a direction crossing a light-receiving surface of the image sensing element. The first abutment portion abuts against part of the prism unit and locates the prism unit at a first position closest to the image sensing element in the movable range of the prism unit. The second abutment portion abuts against part of the prism unit and locates the prism unit at a second position farthest from the image sensing element in the movable range of the prism unit. The third abutment portion is arranged on the prism unit, abuts against the first abutment portion, and locates and holds the prism unit at the first position. The fourth abutment portion is arranged on the prism unit, abuts against the second abutment portion, and locates and holds the prism unit at the second position. The switching mechanism selectively moves the prism unit to one of the first position and the second position in synchronism with the support member.

In this specification, a "free-form surface" means a curved surface which is rotationally asymmetrical with respect to the optical axis of the light beam which incidents the surface or the optical axis of the light beam which exits from the surface and has only one mirror image surface along these optical axes.

The image sensing device may further comprise a fixing member to locate and hold the image sensing element. In this case, the first abutment portion is arranged on the fixing member. The image sensing device may further comprise a case member which is located and held with respect to the fixing member. In this case, the second abutment portion is arranged on the case member.

The first position is, e.g., a standard image sensing position to execute image sensing when the object to be sensed is located between a predetermined position and a substantially infinite position. The second position is, e.g., a macro image sensing position to execute image sensing when the object to be sensed is located in a range including a position closer to the prism unit than the predetermined position. In this specification, the standard image sensing position means a position at which the prism unit is set in a pan-focus image sensing state in which an in-focus state is almost obtained under the same setting from the close range to the infinite point. The macro image sensing position means a position at which the prism unit is set in an image sensing state in which an in-focus state is obtained on an object closer than that in the close range, i.e., so-called "close-up photography" can be executed.

The support member comprises, e.g., a lever member which is rotationally supported by a rotating shaft arranged at a predetermined position with respect to the fixing member. The switching mechanism comprises, e.g., a switching member to switch the prism unit between the first position and the second position by manual operation.

To hold the prism unit at the first position or second position by a simple mechanism, the switching member is rotationally supported by a rotating shaft arranged at a predetermined position with respect to the fixing member. The switching mechanism has a connection spring which connects the switching member to the lever member. The connection spring urges the switching member and the lever member to a first stable posture in which the prism unit is held at the first position and a second stable posture in which the prism unit is held at the second position.

According to a preferred aspect of the present invention, the prism unit comprises two prisms and an aperture member. Each prism has at least one reflecting surface having a free-form surface shape, a light incident surface having a refracting power, and a light exit surface having a refracting power. The aperture member is arranged between the prisms.

At least one of the third abutment portion and the fourth abutment portion is formed on part of the aperture member. Each of the first abutment portion and the third abutment portion forms a plane. In the image sensing device, the prism unit is located and held a posture at the first position by making the planes coincide with each other. Each of the second abutment portion and the fourth abutment portion forms a plane. In the image sensing device, the prism unit is located and held a posture at the second position by making the planes coincide with each other.

To facilitate fine adjustment to make the planes of the first abutment portion and third abutment portion or those of the second abutment portion and fourth abutment portion coincide with each other, one of the planes formed by the first abutment portion and the third abutment portion is formed by distal ends of projecting portions which are arranged at least three places. One of the planes formed by the second abutment portion and the fourth abutment portion is formed by distal ends of projecting portions which are arranged at least three places.

To reduce the number of components of the image sensing device, for example, at least one of the third abutment portion and the fourth abutment portion may be formed on part of a prism included in the prism unit.

To finely adjust the position of the imaging plane with respect to the light-receiving surface of the image sensing element at the first position, a fine adjustment mechanism which changes the first position in a direction perpendicular to the light-receiving surface of the image sensing element is provided between the fixing member and the prism unit. The first abutment portion is arranged on part of the fine adjustment mechanism which abuts against the third abutment portion.

In this case, the fine adjustment mechanism preferably comprises a slant and a guide mechanism. The slant tilts with respect to the light-receiving surface of the image sensing element and has the first abutment portion. The guide mechanism moves the fine adjustment mechanism along the light-receiving surface of the image sensing element in a direction in which the slant tilts. The first position is finely adjusted by moving the fine adjustment mechanism along the guide mechanism. A positioning/holding portion to set and hold the fine adjustment mechanism at a predetermined position is arranged. The fine adjustment mechanism may have at least three slants which tilt in the same direction at the same angle. In this case, the third abutment portion has at least three projecting portions which abut against the slants respectively.

An image sensing apparatus according to the present invention comprises the above-described image sensing device, processing means, and recording means. The processing means executes predetermined electrical processing for the electrical signal obtained by the image sensing element to obtain image data. The recording means records the image data from the processing means on an applied information recording unit. Examples of the image sensing apparatus are electronic devices with image sensing device, including a digital camera and a cellular phone with a camera.

An image sensing position switching method according to the present invention, which is applied to the above-descried image sensing device, comprises abutting the third abutment portion against the first abutment portion to locate and hold the prism unit at the first image sensing position, and abutting the fourth abutment portion against the second abutment portion to locate and hold the prism unit at the second image sensing position.

An image sensing device according to another aspect of the present invention comprises a prism unit, image sensing element, fixing member, link mechanism, and switching member. The prism unit receives a light beam from an object and forms an object image on an imaging plane. The prism unit has at least two reflecting surfaces each having a free-form surface shape. An incident optical axis of the light beam input from the object and an exit optical axis of the light beam which exits from the prism unit to the imaging plane are arranged substantially in parallel at a predetermined interval. The image sensing element is arranged on the imaging plane and converts the object image formed by the prism unit into an electrical signal. The fixing member fixes the image sensing element. The link mechanism operatively connects the fixing member to the prism unit to shift the prism unit along a direction perpendicular to a light-receiving surface of the image sensing element while maintaining a posture of the prism unit. The switching member selectively locates and holds the prism unit at one of a first position and a second position farther from the light-receiving surface than the first position along the direction perpendicular to the light-receiving surface.

The first position is, e.g., a standard image sensing position to execute image sensing when the object to be sensed is located between a predetermined position and a substantially infinite position. The second position is, e.g., a macro image sensing position to execute image sensing when the object to be sensed is located in a range including a position closer to the prism unit than the predetermined position.

In this specification, the standard image sensing position means a position at which the prism unit is set in a pan-focus image sensing state in which an in-focus state is almost obtained under the same setting from the close range to the infinite point. The macro image sensing position means a position at which the prism unit is set in an image sensing state in which an in-focus state is obtained on an object closer than that in the close range, i.e., so-called "close-up photography" can be executed.

In the present invention, the prism unit according to a preferred aspect comprises two prisms and an aperture member which is arranged between the prisms. Each prism has at least one reflecting surface having a free-form surface shape, a light incident surface having a refracting power, and a light exit surface having a refracting power.

The image sensing device according to a preferred aspect of the present invention comprises a manual operation switching member which interlocks with the switching member. The manual operation switching member switches the switching member to one of a first setting position at which the prism unit is located and held at the first position and a second setting position at which the prism unit is located and held at the second position.

In a preferred aspect of the present invention, the fixing member has a first link support portion, the prism unit has a second link support portion, and the link mechanism has a first arm portion and a second arm portion. The two arm portions are rotationally supported by a support pin between one end and other end. One end of the first arm portion is rotationally supported by the first link support portion, and other end of the first arm portion is slidably supported by the second link support portion. One end of the second arm portion is rotationally supported by the second link support portion, and other end of the second arm portion is slidably supported by the first link support portion.

In the present invention, the switching member according to a preferred aspect can move along a direction parallel to the light-receiving surface of the image sensing element between a first setting position and a second setting position. When the switching member is at the first setting position, the prism unit is located and held at the first position. When the switching member is at the second setting position, the prism unit is located and held at the second position. The switching member has an abutment portion which abuts against one of the support pin and part of the prism unit to selectively locate a position of the prism unit at one of the first position and the second position.

In this case, the abutment portion according a preferred aspect has a first abutment portion which locates and holds the prism unit at the first position, and a second abutment portion which locates and holds the prism unit at the second position. In other words, the switching member according to a preferred aspect has a first abutment portion which abuts against the support pin or part of the prism unit at the first setting position, and a second abutment portion which abuts against the support pin or part of the prism unit at the second setting position.

An image sensing device according to still another preferred aspect of the present invention comprises adjustment means for finely adjusting at least one of the first position and the second position along the direction perpendicular to the light-receiving surface of the image sensing element. The device has, as the adjustment means, for example, a fine adjustment mechanism which finely adjusts the position of the first abutment portion so as to finely adjust the first position of the prism unit along the direction perpendicular to the light-receiving surface of the image sensing element. The adjustment means according to a preferred aspect comprises a fine adjustment mechanism to finely adjust the position of the prism unit along the direction perpendicular to the light-receiving surface of the image sensing element while keeping one of the first abutment portion and the second abutment portion abutting against one of the support pin and part of the prism unit.

An image sensing device according to still another aspect of the present invention comprises a prism unit, image sensing element, fixing member, support member, link mechanism, switching member, and adjustment mechanism. The prism unit receives a light beam from an object and forms an object image on an imaging plane. The prism unit has at least two reflecting surfaces each having a free-form surface shape. An incident optical axis of the light beam input from the object and an exit optical axis of the light beam which exits from the prism unit to the imaging plane are arranged substantially in parallel at a predetermined interval. The image sensing element is arranged on the imaging plane to convert the object image formed by the prism unit into an electrical signal. The fixing member fixes the image sensing element. The support member supports the prism unit. The link mechanism operatively connects the fixing member to the support member to shift the prism unit supported by the support member along a direction perpendicular to a light-receiving surface of the image sensing element while maintaining a posture of the prism unit. The switching member selectively locates and holds the prism unit supported by the support member at one of a first position and a second position farther from the light-receiving surface than the first position along the direction perpendicular to the light-receiving surface. The fine adjustment mechanism finely adjusts a relative positional relationship between the support member and the prism unit along the direction perpendicular to the light-receiving surface of the image sensing element.

An image sensing apparatus according to the present invention comprises the above-described image sensing device, processing means, and recording means. The processing means executes predetermined electrical processing for the electrical signal obtained by the image sensing element to obtain image data. The recording means records the image data from the processing means on an applied information recording medium. Examples of the image sensing apparatus are electronic devices with an image sensing device, including a digital camera and a cellular phone with a camera.

An image sensing position switching method according to the present invention, which is applied to the above-descried image sensing device, comprises moving the link mechanism to a first setting position to locate and hold the prism unit at the first position and moving the link mechanism to a second setting position to locate and hold the prism unit at the second position.

An image sensing device according to the present invention comprises a prism unit, image sensing element, guide mechanism, and switching mechanism. The prism unit receives a light beam from an object and forms an object image on an imaging plane. The prism unit has at least two reflecting surfaces each having a free-form surface shape. In the prism unit, an incident optical axis of the light beam input from the object and an exit optical axis of the light beam which exits from the prism unit to the imaging plane are arranged substantially in parallel at a predetermined interval. The image sensing element is arranged on the imaging plane to convert the object image formed by the prism unit into an electrical signal. The guide mechanism moves the prism unit along a direction perpendicular to a light-receiving surface of the image sensing element while maintaining a posture of the prism unit. The switching mechanism selectively locates and holds the prism unit at one of a first position and a second position along the guide mechanism. The second position is farther from the light-receiving surface of the image sensing element than the first position.

An image sensing apparatus according to the present invention comprises the above-described image sensing device, processing means, and recording means. The processing means executes predetermined electrical processing for the electrical signal obtained by the image sensing element to obtain image data. The recording means records the image data from the processing means on an applied information recording medium. Examples of the image sensing apparatus are a digital camera and a cellular phone with a camera.

The first position is, e.g., a standard image sensing position to execute image sensing when the object to be sensed is located between a predetermined position and a substantially infinite position. The second position is, e.g., a macro image sensing position to execute image sensing when the object to be sensed is located in a range including a position closer to the prism unit than the predetermined position. In this specification, the standard image sensing position means a pan-focus image sensing state in which an in-focus state is almost obtained under the same setting from the close range to the infinite point. The macro image sensing position means an image sensing state suitable for photography in a very close range in which the distance from image sensing device to the object is shorter than in the close range.

In a preferred aspect of the present invention, the prism unit comprises two prisms and an aperture member. Each prism has at least one reflecting surface having a free-form surface shape, a light incident surface having a refracting power, and a light exit surface having a refracting power. The aperture member is arranged between the prisms.

In a preferred aspect of the present invention, the switching mechanism can move between a first setting position and a second setting position along a direction parallel to the light-receiving surface of the image sensing element. The switching mechanism has a positioning surface including a first face portion and a second face portion. The first face portion locates the prism unit at the first position. The second face portion locates the prism unit at the second position. The image sensing device further comprises a switching member guide mechanism, abutment portion, and press mechanism. The switching member guide mechanism moves the switching mechanism straight along the direction parallel to the light-receiving surface. The abutment portion is arranged on the prism unit and abuts against the positioning surface of the switching mechanism. The press mechanism presses the abutment portion of the prism unit against the positioning surface of the switching mechanism.

An example of the positioning surface has a first plane portion and a second plane portion in line in the direction parallel to the light-receiving surface. The first plane portion is arranged in parallel to the light-receiving surface. The second plane portion is parallel to the light-receiving surface and is located at a position different from the first plane portion in the direction perpendicular to the light-receiving surface. The first face portion is a predetermined portion in the first plane portion, and the second face portion is a predetermined portion in the second plane portion.

Another example of the positioning surface has a slant whose position in the direction perpendicular to the light-receiving surface changes along the direction parallel to the light-receiving surface. The first face portion is a first portion in the slant, and the second face portion is a second portion in the slant different from the first portion.

The abutment portion of the prism unit is formed on part of a prism included in the prism unit. Alternatively, the abutment portion of the prism unit is formed on part of an aperture member included in the prism unit. According to these examples, the number of components of the prism unit can be decreased.

In a preferred aspect of the present invention, the device further comprises a manual operation switching member which interlocks with the switching mechanism. The manual operation switching member switches the switching mechanism to one of the first setting position and the second setting position. Accordingly, the image sensing conditions (the first position and second position) can be switched in accordance with manual operation outside the image sensing device.

The device may further comprise a fine adjustment mechanism to finely adjust at least one of the first position and the second position of the prism unit in the direction perpendicular to the light-receiving surface of the image sensing element. The device may further comprise a fine adjustment mechanism to finely adjust the switching mechanism in the direction perpendicular to the light-receiving surface of the image sensing element.

The device may further comprise a fine adjustment mechanism to finely adjust at least one of the first setting position and the second setting position of the switching mechanism in the direction parallel to the light-receiving surface to finely adjust at least one of the first position and the second position of the prism unit in the direction perpendicular to the light-receiving surface. The image sensing device having the fine adjustment mechanism has a function of finely adjusting the focus condition in addition to the function of switching the two image sensing states (e.g., the standard image sensing position and macro image sensing position) by the switching mechanism.

As an example of the fine adjustment mechanism, the image sensing device comprises a regulating member to regulate a moving limit position of the switching mechanism along the direction parallel to the light-receiving surface. The position of the regulating member is finely adjusted in the direction parallel to the light-receiving surface.

An image sensing device according to the present invention comprises a prism unit, image sensing element, guide mechanism, and switching mechanism. The prism unit receives a light beam from an object and forms an object image on an imaging plane. The prism unit has at least two reflecting surfaces each having a free-form surface shape. An incident optical axis of the light beam input from the object and an exit optical axis of the light beam which exits from the prism unit to the imaging plane are arranged substantially in parallel at a predetermined interval. The image sensing element is arranged on the imaging plane to convert the object image formed by the prism unit into an electrical signal. The guide mechanism moves the prism unit along a direction perpendicular to a light-receiving surface of the image sensing element while maintaining a posture of the prism unit. The switching mechanism selectively locates and holds the prism unit at one of a first position and a second position along the guide mechanism. The second position is farther from the light-receiving surface of the image sensing element than the first position.

The switching mechanism comprises a shaft and a positioning surface. The shaft extends in the direction perpendicular to the light-receiving surface of the image sensing element. The positioning surface can rotate on the shaft between a first setting position and a second setting position. The positioning surface includes a first face portion and a second face portion. The first face portion locates the prism unit at the first position. The second face portion locates the prism unit at the second position. The prism unit has an abutment portion which abuts against the positioning surface of the switching mechanism.

An example of the positioning surface has a first plane portion and a second plane portion in line. The first plane portion is parallel to the light-receiving surface and includes the first face portion. The second plane portion is parallel to the light-receiving surface and includes the second face portion. The first plane portion and second plane portion are located at different positions in the direction perpendicular to the light-receiving surface.

Another example of the positioning surface has a slant which is arranged in the rotational direction around the shaft and includes the first face portion and the second face portion whose positions in the direction perpendicular to the light-receiving surface are different.

The abutment portion of the prism unit is formed on part of a prism included in the prism unit. Alternatively, the abutment portion of the prism unit is formed on part of a case which accommodates the prism. According to these examples, the number of components of the prism unit can be decreased.

In a preferred aspect of the present invention, the image sensing device further comprises a manual operation switching member which interlocks with the switching mechanism. The switching member switches the switching mechanism to one of the first setting position and the second setting position. Accordingly, the image sensing condition, such as the first position and second position, can be switched in accordance with manual operation outside the image sensing device.

The image sensing device may further comprise a fine adjustment mechanism to finely adjust at least one of the first position and the second position of the prism unit in the direction perpendicular to the light-receiving surface of the image sensing element. The image sensing device having the fine adjustment mechanism has a function of finely adjusting the focus condition in addition to the function of switching the two image sensing conditions (e.g., the standard image sensing position and macro image sensing position) by the switching mechanism.

An example of the fine adjustment mechanism can rotate on the shaft and has a slant. The slant is arranged in the rotational direction. The position of the slant changes in the direction perpendicular to the light-receiving surface. The switching mechanism has a receiving portion, against which the slant of the fine adjustment mechanism abuts, on the reverse side of the positioning surface. The position of the prism unit is finely adjusted by changing a rotational position of the fine adjustment mechanism.

The receiving portion of the switching mechanism, which abuts against the slant of the fine adjustment mechanism, may have an arc shape or a slant shape conforming to the slant.

Another example of the fine adjustment mechanism has a regulating member to regulate a moving limit position of the switching mechanism in the direction in which the slant rotates on the shaft. The position of the regulating member is finely adjusted in the direction in which the slant rotates on the shaft.

An image sensing position switching method according to the present invention, which is applied to the above-descried image sensing device, comprises moving the prism unit to one of the first position and the second position along the direction perpendicular to the light-receiving surface of the image sensing element while maintaining a posture of the prism unit, and positioning and holding the prism unit.

An image sensing device according to the present invention comprises a prism unit, image sensing element, guide means, and switching means. The prism unit receives a light beam from an object and forms an object image on an imaging plane. The prism unit has at least two reflecting surfaces each having a free-form surface shape. In the prism unit, an incident optical axis of the light beam input from the object and an exit optical axis of the light beam which exits from the prism unit to the imaging plane are arranged substantially in parallel at a predetermined interval. The image sensing element is arranged on the imaging plane to convert the object image formed by the prism unit into an electrical signal. The guide means guides the prism unit along a direction perpendicular to a light-receiving surface of the image sensing element while maintaining a posture of the prism unit. The switching means moves the prism unit along the guide means and selectively locates the prism unit at one of a first position and a second position.

Advantages of the invention will be set forth in the description which follows, and in part will be obvious from the description, or may be learned by practice of the invention.

Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a perspective view of the first prism of the prism unit shown in FIG. 3;

FIG. 6 is a perspective view of the second prism of the prism unit shown in FIG. 3;

FIG. 10 is a perspective view of the prism unit shown in FIG. 3;

FIG. 11 is a side view of the first prism and second prism of the prism unit shown in FIG. 3;

FIG. 12 is an exploded perspective view of the image sensing device incorporated in the digital camera shown in FIG. 1;

FIG. 13 is a perspective view of the image sensing device shown in FIG. 12;

FIG. 14 is a perspective view of the image sensing device in FIG. 13, showing a state in which the case member is detached;

FIG. 15 is a partially cutaway plan view of the image sensing device shown in FIG. 13, which is viewed from the side of incidence;

FIG. 16 is a partially cutaway side view of the image sensing device shown in FIG. 13, which is viewed from the side of the second prism;

FIG. 17 is a side view showing the first stable posture of the image sensing device shown in FIG. 13;

FIG. 18 is a side view showing the second stable posture of the image sensing device shown in FIG. 13;

FIG. 19 is a sectional view of the image sensing device shown in FIG. 17;

FIG. 20 is a sectional view of the image sensing device shown in FIG. 18;

FIG. 21 is an exploded perspective view showing an image sensing device of the second embodiment according to the present invention;

FIG. 22 is a partially cutaway plan view of the image sensing device shown in FIG. 21, which is viewed from the side of incidence;

FIG. 23 is a partially cutaway side view of the image sensing device shown in FIG. 21, which is viewed from the side of the second prism;

FIG. 24 is a sectional view of the image sensing device shown in FIG. 21, which is taken along a direction in which the prisms are arranged;

FIG. 25 is a sectional view of the image sensing device in which the fine adjustment mechanism is moved from the state shown in FIG. 24 to the side of the second prism;

FIG. 27 is an exploded perspective view showing an image sensing device of the third embodiment according to the present invention;

FIG. 30 is a sectional view of the image sensing device shown in FIG. 29;

FIG. 31 is a sectional view of the image sensing device shown in FIG. 29;

FIG. 32 is a perspective view showing an image sensing device of the fourth embodiment according to the present invention;

FIG. 34 is a perspective view of the image sensing device shown in FIG. 33;

FIG. 35 is a perspective view of the image sensing device shown in FIG. 34, showing a state in which the case member and prism unit are detached;

FIG. 40 is a side view of the image sensing device shown in FIG. 34 when the switching mechanism is at the second setting position;

FIG. 41 is a sectional view of the image sensing device shown in FIG. 40;

FIG. 43 is a partially cutaway side view of the image sensing device shown in FIG. 42 which is viewed from the side of the second prism;

FIG. 44 is a side view of the image sensing device shown in FIG. 42 when the switching mechanism is at the first setting position;

FIG. 45 is a sectional view of the image sensing device shown in FIG. 44;

FIG. 46 is a side view of the image sensing device shown in FIG. 42 when the switching mechanism is at the second setting position;

FIG. 47 is a sectional view of the image sensing device shown in FIG. 46;

FIG. 48 is a perspective view showing the adjustment mechanism and support pin of an image sensing device of the seventh embodiment according to the present invention;

FIG. 49 is a side view schematically showing the positional relationship between the switching mechanism, fine adjustment mechanism, and support pin shown in FIG. 48;

FIG. 50 is a perspective view of an image sensing device of the eighth embodiment according to the present invention;

FIG. 52 is a perspective view of the image sensing device shown in FIG. 50 and a jig to execute fc adjustment;

FIG. 54 is a side view of the image sensing device shown in FIG. 53 when the switching mechanism is at the first setting position;

FIG. 55 is a side view of the prism unit of the image sensing device shown in FIG. 53;

FIG. 56 is a side view of the image sensing device shown in FIG. 53 when the switching mechanism is at the second setting position;

FIG. 57 is a perspective view of an image sensing device of the 10th embodiment according to the present invention;

FIG. 59 is a partially sectional side view of an image sensing device of the 12th embodiment according to the present invention;

FIG. 60 is a partially sectional plan view of the image sensing device shown in FIG. 59;

FIG. 61 is a perspective view of an image sensing device of the 13th embodiment according to the present invention;

FIG. 62 is a plan view of the image sensing device shown in FIG. 61;

FIG. 63 is a front view of the image sensing device shown in FIG. 61;

FIG. 64 is a sectional view of the image sensing device taken along a line F64-F64 in FIG. 63;

FIG. 65 is a plan view showing another example of the fc adjustment jig together with part of the image sensing device;

FIG. 66 is a perspective view of an image sensing device of the 14th embodiment according to the present invention;

FIG. 67 is a sectional view of the image sensing device shown in FIG. 66;

FIG. 68 is an exploded perspective view of the image sensing device shown in FIG. 66;

FIG. 71 is a perspective view of an image sensing device of the 15th embodiment according to the present invention;

FIG. 72 is a sectional view of the image sensing device shown in FIG. 71;

FIG. 73A is a front view of the image sensing device shown in FIG. 71 when the switching mechanism is at the first setting position;

FIG. 73B is a front view of the image sensing device shown in FIG. 71 when the switching mechanism is at the second setting position;

FIG. 74 is a perspective view of an image sensing device of the 16th embodiment according to the present invention;

FIG. 75A is a front view of the image sensing device shown in FIG. 74 when the switching mechanism is at the first setting position;

FIG. 75B is a front view of the image sensing device shown in FIG. 74 when the switching mechanism is at the second setting position;

FIG. 76 is a front view of the switching mechanism of an image sensing device of the 17th embodiment according to the present invention;

FIG. 77 is a perspective view showing a cellular phone with a camera as another example of the image sensing apparatus according to the present invention;

FIG. 78 is a sectional view schematically showing another example of the prism optical system;

FIG. 79 is a sectional view schematically showing still another example of the prism optical system;

FIG. 80 is a sectional view schematically showing still another example of the prism optical system;

FIG. 83 is a perspective view showing a cellular phone with a camera as still another example of the image sensing apparatus having the image sensing device according to the present invention;

FIG. 84 is a sectional view schematically showing still another example of the prism optical system;

DETAILED DESCRIPTION OF THE INVENTION

Figure 1:
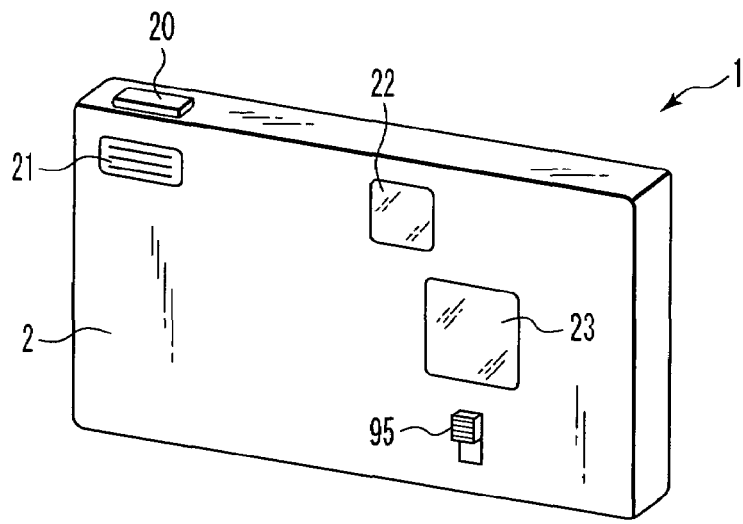
FIG. 1 is a perspective view of a digital camera having an image sensing device of the first embodiment according to the present invention.
Figure 2:
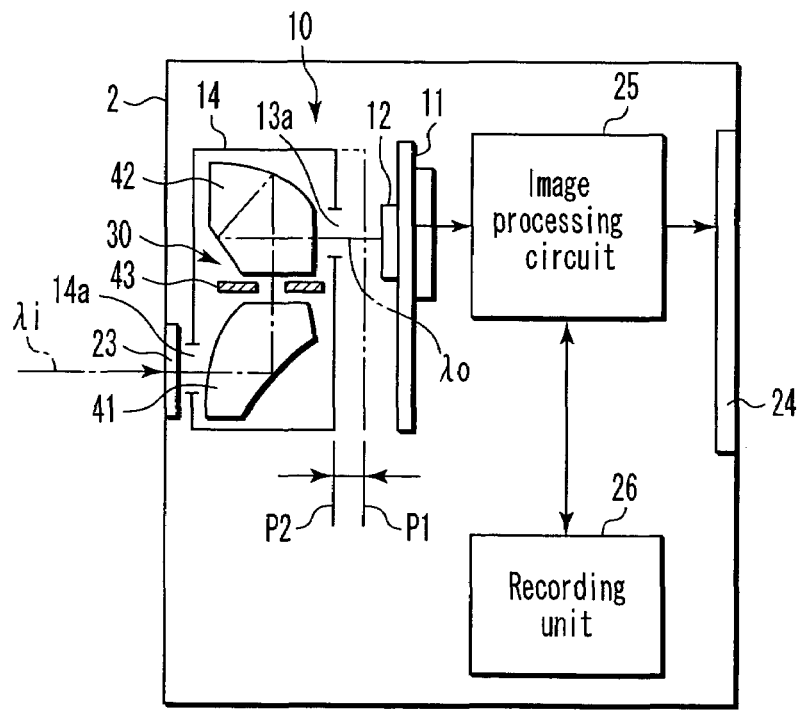
FIG. 2 is a sectional view schematically showing the internal structure of the digital camera shown in FIG. 1.

An image sensing apparatus according to the first embodiment of the present invention will be described with reference to FIGS. 1 to 20 by exemplifying a digital camera. As shown in FIG. 1, a digital camera 1 has a release button 20, electronic flash 21, finder optical system 22, image sensing optical system 23, and image monitor 24 (FIG. 2), which are arranged on the outer surface of a housing 2. As shown in FIG. 2, the housing 2 incorporates an image sensing device 10 which forms the main part of the image sensing optical system 23, an image processing circuit 25 serving as a processing means, and a recording unit 26 serving as a recording means. The image processing circuit 25 has a function of executing predetermined electrical processing for an electrical signal obtained by the image sensing device 10 to obtain image data. The recording unit 26 functions as a recording means for recording image data from the image processing circuit 25 on an applied recording medium. In this case, the "applied recording medium" is a flash memory incorporated in the digital camera 1 or an externally detachable memory card.

The image sensing device 10 includes a prism unit 30 as an example of an eccentric optical system in which an incident optical axis λi and exit optical axis λo are arranged almost in parallel at a predetermined interval, and an image sensing element 12 mounted on a board 11. FIGS. 3 to 11 show an example of the prism unit 30. The prism unit 30 has a first prism 41, second prism 42, and aperture member 43. The image sensing element 12 is an element such as a CCD which converts light into an electrical signal and is arranged on the exit side of the prism unit 30. A cover glass 12a is attached to the light-receiving surface of the image sensing element 12. In place of the cover glass 12a, an optical member such as a polarizing filter may be attached.

Figure 3:
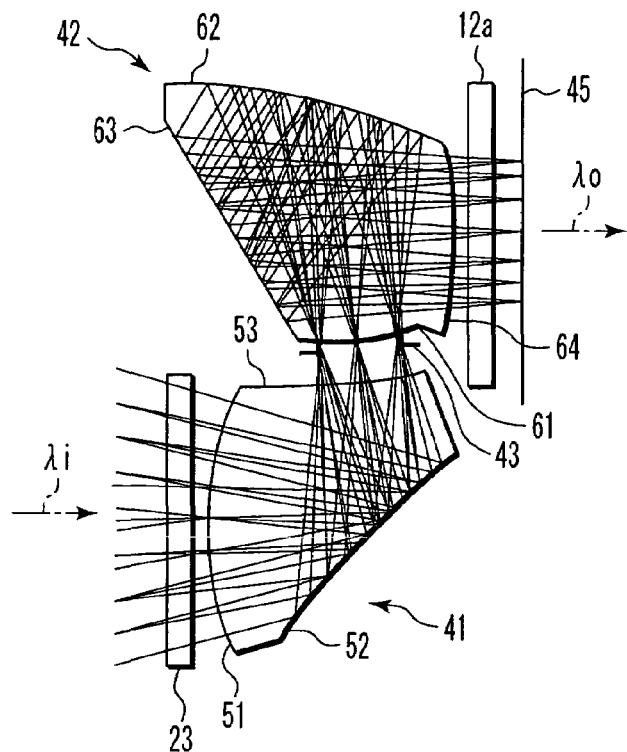
FIG. 3 is a side view of the prism unit of the digital camera shown in FIG. 1.
Figure 4:
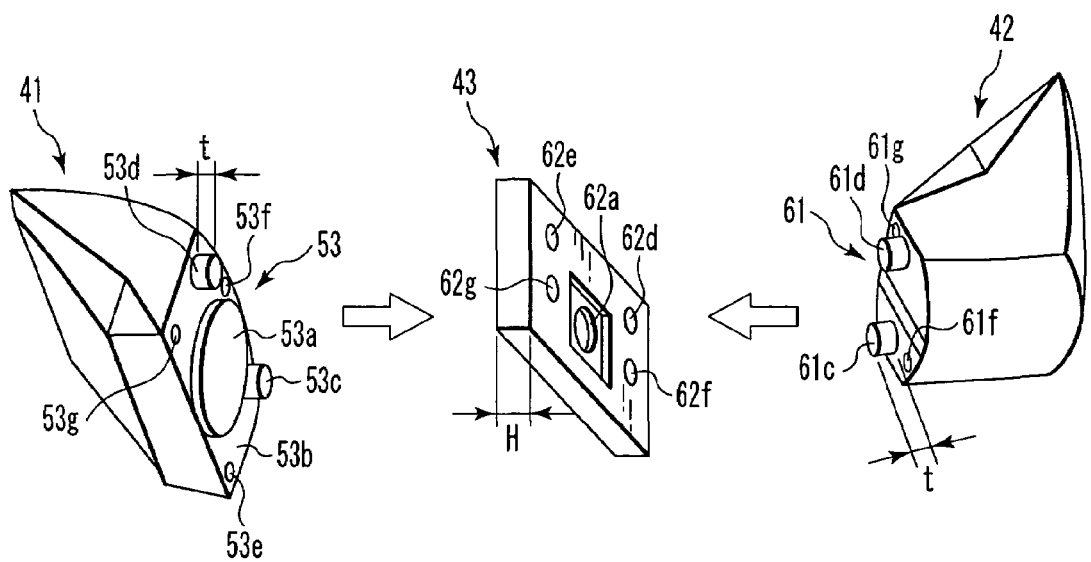
FIG. 4 is an exploded perspective view of the prism unit shown in FIG. 3.

As shown in FIG. 3, the first prism 41 is an eccentric prism including an incident surface 51, rotationally asymmetric reflecting surface 52, and exit surface 53. As shown in FIG. 5, the exit surface 53 of the first prism 41 has a plane portion 53*b* formed flat outside an effective diameter portion 53*a* of the optical path. The plane portion 53*b* has two positioning portions 53*c* and 53*d* formed into a cylindrical shape and three projecting portions 53*e*, 53*f*, and 53*g* formed into a hemispherical shape. The positioning portions 53*c* and 53*d* are arranged outside the effective diameter portion 53*a*. In this embodiment, as shown in FIGS. 4 and 5, the positioning portions 53*c* and 53*d* are arranged symmetrically with respect to a plane A1 which crosses the effective diameter portion 53*a* along the incident optical axis λi.

The projecting portions 53*e* and 53*g* are arranged outside the positioning portions 53*c* and 53*d* which sandwich the effective diameter portion 53*a* with respect to the plane A1. Hence, the distance from the central position of the effective diameter portion 53*a* to the projecting portions 53*e* and 53*g* is longer than the distance to the positioning portions 53*c* and 53*d*. The projecting portion 53*f* is arranged outside the effective diameter portion 53*a* and inside the positioning portions 53*c* and 53*d* with respect to the plane A1. In this embodiment, the plane A1 is arranged at a position that crosses the plane portion 53*b*. As described above, of the three projecting portions, at least two projecting portions are arranged at (farther) positions separated from the central position of the effective diameter portion 53*a* by a distance longer than the distance to the positioning portions.

As shown in FIG. 3, the second prism 42 is an eccentric prism including an incident surface 61, reflecting surface 62, reflecting surface 63, and exit surface 64. At least one of the reflecting surfaces 62 and 63 is rotationally asymmetrical. As shown in FIG. 6, the incident surface 61 of the second prism 42 has a plane portion 61*b* formed flat outside an effective diameter portion 61*a* of the optical path. The plane portion 61*b* has two positioning portions 61*c* and 61*d* formed into a cylindrical shape and three projecting portions 61*e*, 61*f*, and 61*g* formed into a hemispherical shape. The positioning portions 61*c* and 61*d* are arranged outside the effective diameter portion 61*a*. The positioning portions 61*c* and 61*d* are arranged symmetrically with respect to a plane A2 which crosses the effective diameter portion 61*a* along the exit optical axis λo.

The projecting portions 61*e* and 61*g* are arranged outside the positioning portions 61*c* and 61*d* which sandwich the effective diameter portion 61*a* with respect to the plane A2. The projecting portion 61*f* is arranged outside the effective diameter portion 61*a* and inside the positioning portions 61*c* and 61*d* with respect to the plane A2. The projecting portions 61*e*, 61*f*, and 61*g* are arranged on the incident surface 61 to be asymmetrical with respect to the plane A2.

Figure 7:
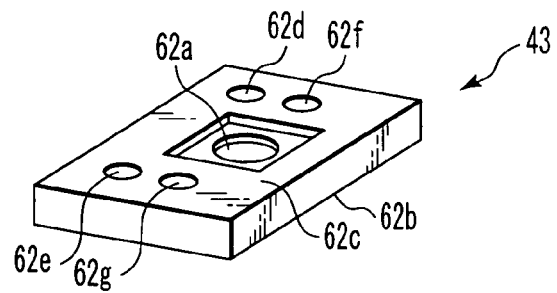
FIG. 7 is a perspective view of the aperture member of the prism unit shown in FIG. 3.
Figure 8:
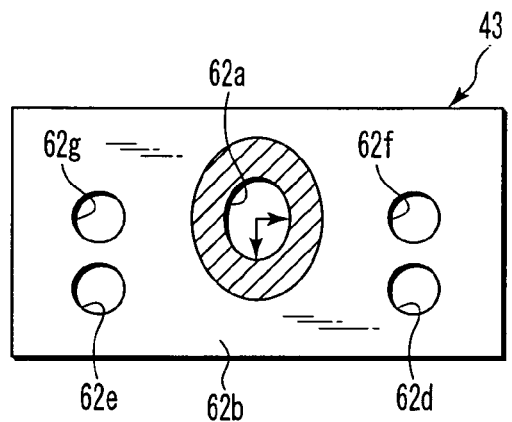
FIG. 8 is a front view of the aperture member of the prism unit shown in FIG. 3.
Figure 9:
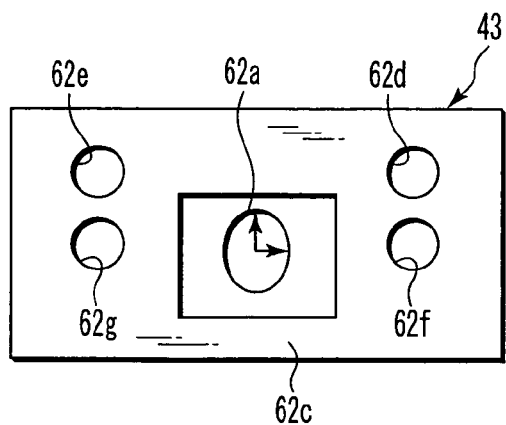
FIG. 9 is a rear view of the aperture member of the prism unit shown in FIG. 3.

As shown in FIGS. 7 to 9, the aperture member 43 has an opening portion 62*a* which is formed in accordance with the effective diameter of the optical planes of action of the two prisms, i.e., the first prism 41 and second prism 42. The aperture member 43 also functions as a holding member which maintains the relative positional relationship between the first prism 41 and the second prism 42. The aperture member 43 has, on both surfaces near the opening portion 62*a*, plane portions 62*b* and 62*c* formed into a planar shape outside the opening portion 62*a*.

Positioning/holding portions 62*d*, 62*e*, 62*f*, and 62*g* are formed in the plane portions 62*b* and 62*c*. The positioning/holding portions 62*d* to 62*g* are formed at positions corresponding to the positioning portions 53*c*, 53*d*, 61*c*, and 61*d* of the first prism 41 and second prism 42 as through holes which can fit on the positioning portions 53*c*, 53*d*, 61*c*, and 61*d*, respectively. A thickness H of the aperture member 43 is designed to, e.g., H=1.12 mm. A length t of each positioning portion of the first prism 41 and second prism 42 is designed to, e.g., t=0.55 mm. In this case, t/H=0.49.

In the prism unit 30 having the above-described structure, the positioning portion 53*c* of the first prism 41 is fitted in the positioning/holding portion 62*d* from the side of the plane portion 62*b* of the aperture member 43, and the positioning portion 53*d* is fitted in the positioning/holding portion 62*e*. Accordingly, the position of the first prism 41 with respect to the aperture member 43 is determined. At this time, the projecting portions 53*e*, 53*f*, and 53*g* of the first prism 41 abut against the plane portion 62*b* of the aperture member 43 so that the tilt of the first prism 41 with respect to the aperture member 43 is determined.

Similarly, the positioning portion 61*c* of the second prism 42 is fitted in the positioning/holding portion 62*f* from the side of the plane portion 62*c* of the aperture member 43, and the positioning portion 61*d* is fitted in the positioning/holding portion 62*g*. Accordingly, the position of the second prism with respect to the aperture member 43 is determined. At this time, the projecting portions 61*e*, 61*f*, and 61*g* of the second prism 42 abut against the plane portion 62*c* of the aperture member 43 so that the tilt of the second prism 42 with respect to the aperture member 43 is determined.

In this way, the first prism 41 and second prism 42 are held on both sides of the aperture member 43, as shown in FIG. 10. As shown in FIG. 11, one set of holding portions 62*d* and 62*e* and the other set of positioning/holding portions 62*f* and 62*g* are arranged at different positions so that the line which passes through the center of gravity of the first prism 41 and the line which passes the center of gravity of the second prism 42 are not arranged on a straight line on the aperture member 43.

In the state shown in FIG. 10, if the tilts of the first prism 41 and second prism 42 with respect to the aperture member 43 need to be adjusted, the projecting portions 53*e*, 53*f*, and 53*g* of the first prism 41 and the projecting portions 61*e*, 61*f*, and 61*g* of the second prism 42 are ground by a predetermined amount in accordance with the directions and degrees of tilts. Accordingly, the tilts of the first prism 41 and second prism 42 can easily be adjusted.

As described above, the prism unit 30 of this embodiment receives a light beam from an object and forms an object image on an imaging plane 45. The prism unit 30 has at least two reflecting surfaces, in this embodiment three reflecting surfaces 52, 62, and 63 having free-form surface shapes. The incident optical axis λi of the light beam which enters from the object surface and the exit optical axis λo of the light beam which exits from the prism unit 30 to the imaging plane 45 are formed by the prism optical systems which are arranged almost in parallel while being separated by a predetermined distance. With this structure, the prism unit 30 of this embodiment receives a light beam from an object and forms an object image on the imaging plane 45.

A mechanism of the image sensing device 10, which moves the above-described prism unit 30 in a direction crossing the light-receiving surface of the image sensing element 12 and, more preferably, in a direction perpendicular to the light-receiving surface of the image sensing element 12, will be described next with reference to FIGS. 12 to 20. For the descriptive convenience, the direction perpendicular to the light-receiving surface of the image sensing element 12 will be defined as an X direction, the direction in which the first prism 41 and second prism 42 are arranged will be defined as a Y direction, and the direction perpendicular to the Y and X directions will be defined as a Z direction in the drawings. As shown in FIG. 12, the image sensing device 10 comprises a fixing member 13, case member 14, lever members 15, switching member 16, and connection spring 17 in addition to the above-described prism unit 30 and image sensing element 12.

The fixing member 13 is arranged between the prism unit 30 and the image sensing element 12. The fixing member 13 has a window 13a at the central portion. The fixing member 13 locates and holds the light-receiving surface of the image sensing element 12 on the exit optical axis λo such that the light beam which exits from the second prism 42 of the prism unit 30 passes through the window 13a and forms an image on the light-receiving surface of the image sensing element 12. First abutment portions 13b which abut against part of the prism unit 30 are formed on the fixing member 13 on the side facing the prism unit 30.

As shown in FIG. 13, the case member 14 covers the prism unit 30 and is fixed to the fixing member 13. The case member 14 has an incident window 14a at a portion through which the light beam that should enter the first prism 41 of the prism unit 30 passes. A protective glass 14b is fitted in the incident window 14a. As the protective glass 14b, IR-blocking glass is preferably used. Second abutment portions 14c which abut against part of the prism unit 30 are formed inside the case member 14 on the side facing the prism unit 30.

As shown in FIG. 14, the aperture member 43 of the prism unit 30 has guide plates 31. The guide plates 31 are arranged in parallel to the planes A1 and A2 along which the incident optical axis λi and exit optical axis λo pass so that the first prism 41 and second prism 42 are sandwiched from both sides. The guide plates 31 may be either integrated with the aperture member 43 or attached as separate components. As shown in FIG. 15, the guide plates 31 are in slidable contact with the inner surfaces of the case member 14. The guide plates 31 thus prevent the prism unit 30 from shifting in the widthwise direction (Z direction) with respect to the Y direction in which the first prism 41 and second prism 42 are arranged and the X direction perpendicular to the light-receiving surface of the image sensing element 12.

The guide plates 31 have bosses 31a which are formed into a cylindrical shape extending in the direction along the plane portions 62b and 62c of the aperture member 43. Support pins 32 which rotationally connect the prism unit 30 to the lever members 15 are attached to the bosses 31a. Hence, slits 14d which receive the bosses 31a and support pins 32 are formed in the case member 14.

Projecting portions bulging toward the fixing member 13 are formed at four corners of the guide plates 31 facing the fixing member 13. The distal ends of the projecting portions form third abutment portions 31b which abut against the first abutment portions 13b to locate the prism unit 30 at a first position P1 closest to the image sensing element 12. The first abutment portions 13b and third abutment portions 31b form planes which coincide with each other so that the prism unit 30 is located at the first position P1.

Convex portions bulging toward the second abutment portions 14c are formed at four corners of the guide plates 31 facing the case member 14. The distal ends of the projecting portions form fourth abutment portions 31c which abut against the second abutment portions 14c to locate the prism unit 30 at a second position P2 farthest from the image sensing element 12. The second abutment portions 14c and fourth abutment portions 31c form planes which coincide with each other so that the prism unit 30 is located at the second position P2.

In this embodiment, the third abutment portions 31b and fourth abutment portions 31c are described as planes formed by the distal ends of the projecting portions. However, the third abutment portions 31b and fourth abutment portions 31c may have shapes that match the first abutment portions 13b and second abutment portions 14c, respectively. Alternatively, the third abutment portions 31b and fourth abutment portions 31c may be formed on planes, and the first abutment portions 13b and second abutment portions 14c may be formed as projecting portions whose distal ends are arranged on planes which coincide with the third abutment portions 31b and fourth abutment portions 31c.

The lever members 15 are arranged on both sides of the case member 14 along the Y direction in which the first prism 41 and second prism 42 are arranged. Proximal portions 15a of the lever members 15 are rotationally supported by rotating shafts R1 which are attached at corners of the case member 14 on the second prism unit side. The rotating shafts R1 are arranged in parallel to the direction in which the bosses 31a and support pins 32 extend. The lever members 15 rotate on the rotating shafts R1 to move the prism unit 30 connected through the support pins 32 in the direction crossing the light-receiving surface of the image sensing element 12 and, mole preferably, in the direction perpendicular to the light-receiving surface of the image sensing element 12. That is, the lever members 15 function as support members which movably support the prism unit 30 within a predetermined movable range along the direction crossing the light-receiving surface of the image sensing element 12.

Proximal portions 16a of the switching member 16 are rotationally supported by the rotating shafts R1 to be coaxial with the proximal portions 15a of the lever members 15. Distal ends 15b of the lever members 15 and distal ends 16b of the switching member 16, which are separated from the rotating shafts R1 in the radial direction, are connected by connection springs 17. The distal ends 16b of the switching member 16 are located closer to the rotating shafts R1 than the distal ends 15b of the lever members 15. With this structure, the distal ends 15b of the lever members 15 and the distal ends 16b of the switching member 16 can pass each other without interfering with the connection springs 17 and spring brackets 18a and 18b which rotationally support the connection springs 17 at the distal ends 15b and 16b.

The connection springs 17 urge the distal ends 15b of the lever members 15 and the distal ends 16b of the switching member 16 in directions in which they separate. Hence, as shown in FIG. 17, when the distal ends 16b of the switching member 16 pivot to positions farther from the image sensing element 12 and fixing member 13 than the distal ends 15b of the lever members 15, a first stable posture T1 is obtained so that the lever members 15 maintain a state in which they are kept urged to be closer to the fixing member 13. As shown in FIG. 18, when the distal ends 16b of the switching member 16 pivot to positions closer to the image sensing element 12 and fixing member 13 than the distal ends 15b of the lever members 15, a second stable posture T2 is obtained so that the lever members 15 maintain a state in which they are kept urged to be separated from the image sensing element 12 and fixing member 13.

The prism unit 30 is connected to the lever members 15 through the support pins 32. For this reason, as the lever members 15 pivot, the prism unit 30 is also moved in the X direction. In the first stable posture T1, the prism unit 30 is urged toward the fixing member 13, as shown in FIG. 19. Accordingly, the third abutment portions 31b abut against the first abutment portions 13b so that the prism unit 30 is located at the first position P1 closest to the image sensing element 12 within the movable range. In the second stable posture T2, the prism unit 30 is urged toward the case member 14, as shown in FIG. 20. Accordingly, the fourth abutment portions 31c abut against the second abutment portions 14c so that the prism unit 30 is located at the second position P2 farthest from the image sensing element 12 within the movable range.

As described above, the switching member 16 and connection springs 17 function as a switching mechanism which takes the first stable posture T1 or second stable posture T2 in synchronism with the lever members 15 serving as support members to move the prism unit 30 to the first position P1 or second position P2 and selectively locate it.

In the image sensing device 10, to switch the focal point between the first position P1 and the second position P2, the third abutment portions 31b are caused to abut against the first abutment portions 13b to locate the prism unit 30 at the first position P1, and the fourth abutment portions 31c are caused to abut against the second abutment portions 14c to locate the prism unit 30 at the second position P2. No special mechanism that translates the prism unit 30 without any shift of the optical axis is necessary. Hence, the structure of the image sensing device 10 can be simplified.

The connection springs 17 urge the prism unit 30 toward the fixing member 13 at the first position P1 and toward the case member 14 at the second position P2. Hence, the prism unit 30 is reliably maintained at the first position Pi or second position P2 without any play.

The third abutment portions and fourth abutment portions are formed by the distal ends of the projecting portions. Hence, the positioning error of the prism unit 30 within the manufacturing tolerances, which occurs in mass production of the image sensing device 10, can easily be corrected by adjusting the heights of the distal ends of the projecting portions.

As shown in FIG. 2, in this embodiment, the first position P1 is, e.g., the standard image sensing position, and the second position P2 is, e.g., the macro image sensing position. The switching member 16 interlocks with a manual operation switching member 95 which is exposed from the housing 2 of the digital camera 1 shown in FIG. 1. When the manual operation switching member 95 is operated, the switching member 16 is switched between the first stable posture T1 and the second stable posture T2. Hence, when the manual operation switching member 95 is operated, the prism unit 30 is selectively switched between the first position P1 and the second position P2 so that two focus positions can be set. Instead of manually operating the switching member 16, it may be motor-driven by using an actuator such as an electric motor.

In this embodiment, the third abutment portions 31b and fourth abutment portions 31c are formed on the guide plates 31 arranged on the aperture member 43. These abutment portions may be formed on the aperture member 43, on part of the first prism 41 and second prism 42, or separately on the aperture member 43, first prism 41, and second prism 42. Instead of arranging the case member 14, a bracket having second abutment portions which abut against the fourth abutment portions 31c of the prism unit 30 at the second position P2 may be extended from the fixing member 13.

An image sensing device 10a according to the second embodiment of the present invention will be described next with reference to FIGS. 21 to 26. The image sensing device 10a of this embodiment is different from the image sensing device 10 of the first embodiment in that the device further comprises a fine adjustment mechanism 70. Components other than the fine adjustment mechanism 70 are the same as in the first embodiment. The same reference numerals as in the first embodiment denote constituent elements having the same functions in the second embodiment, and a description thereof will be omitted.

Figure 26:
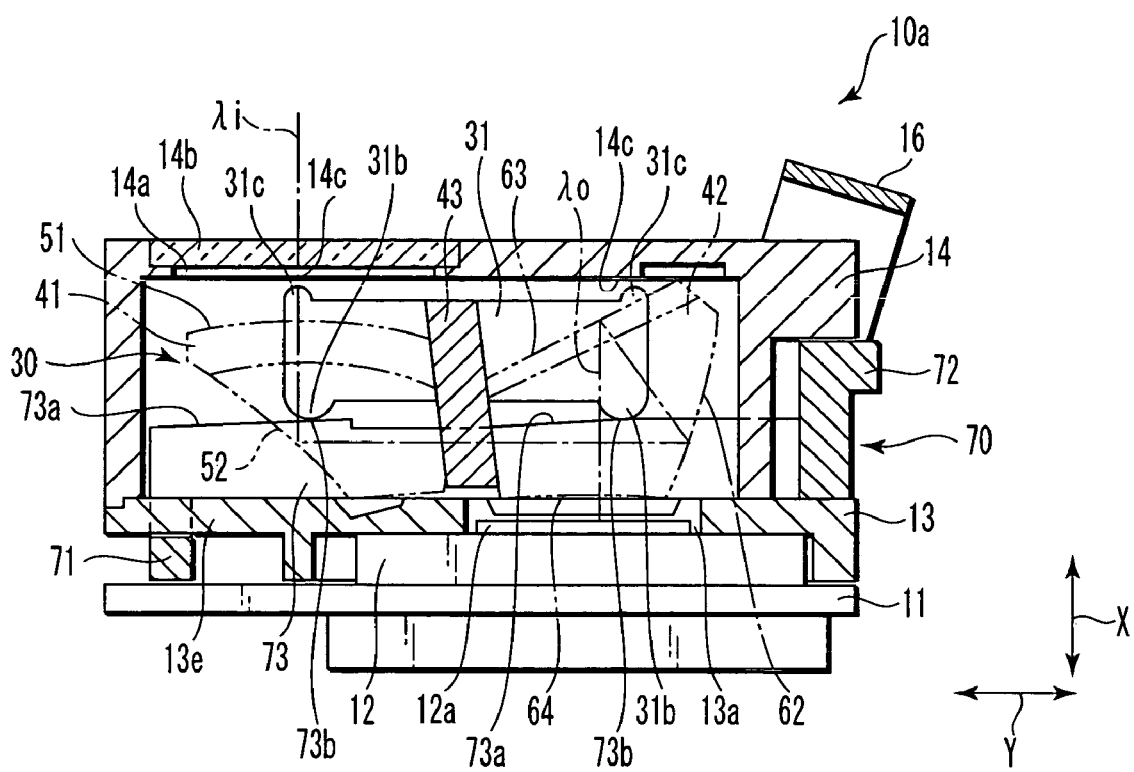
FIG. 26 is a sectional view of the image sensing device in which the fine adjustment mechanism is moved from the state shown in FIG. 24 to the side of the first prism.

As shown in FIG. 21, the fine adjustment mechanism 70 is mounted between a fixing member 13 and a prism unit 30. As shown in FIGS. 24 to 26, the fine adjustment mechanism 70 is movable in the Y direction in which a first prism 41 and a second prism 42 are arranged. A guide portion 13e which overhangs on the side of the first prism 41 along the Y direction is formed on the fixing member 13. A distal end portion 71 of the fine adjustment mechanism 70 on the side of the first prism 41 is inserted between the guide portion 13e and a board 11. A proximal portion 72 of the fine adjustment mechanism 70 on the side of the second prism 42 is exposed outside from a case member 14, as shown in FIGS. 22 to 26.

The fine adjustment mechanism 70 has adjustment portions 73 extending along the Y direction. As shown in FIGS. 22 and 23, the adjustment portions 73 are arranged on both sides of a window 13a. The adjustment portions 73 sandwich the prism unit 30 at portions close to the fixing member 13 and extend inside the case member 14. As shown in FIG. 21, the adjustment portions 73 have slants 73a at positions corresponding to third abutment portions arranged at four corners of guide plates 31 on the side of the fixing member 13. First abutment portions 73b are formed on the slants 73a. The slants 73a have the same gradient in the moving direction of the fine adjustment mechanism 70.

The image sensing device 10a having the fine adjustment mechanism 70 with the above-described structure causes third abutment portions 31b arranged on the prism unit 30 to abut against the first abutment portions 73b arranged on the fine adjustment mechanism 70 in a first stable posture T1 in which the prism unit 30 is located at a first position P1, as shown in FIGS. 24 to 26. In this state, when the adjustment mechanism is moved from the state shown in FIG. 24 to the state shown in FIG. 25 or from the state shown in FIG. 24 to the state shown in FIG. 26, displacement along the X direction perpendicular to the light-receiving surface of an image sensing element 12 occurs by an amount (distance) corresponding to the gradient of the slants 73a.

In this embodiment, the slants 73a tilt to the side of the first prism 41. When the adjustment mechanism is moved from the state shown in FIG. 24 to the state shown in FIG. 25, the prism unit 30 is displaced in a direction to approach the image sensing element 12. When the fine adjustment mechanism 70 is moved from the state shown in FIG. 24 to the state shown in FIG. 26, the prism unit 30 is displaced in a direction to be separated from the image sensing element 12.

As described above, in the image sensing device 10a having the fine adjustment mechanism 70, adjustment of the position of the prism unit 30, i.e., fine adjustment (fc adjustment) of the focal plane can be done at the first position P1 at which the third abutment portions 31b of the prism unit 30 abut against the first abutment portions 73b of the fine adjustment mechanism 70. After the fc adjustment, the fine adjustment mechanism 70 is fixed by an adhesive or laser melting between the distal end portion 71 and the guide portion 13e and between the proximal portion 72 and the fixing member 13 or case member 14.

In the first and second embodiments, four third abutment portions 31b and four fourth abutment portions 31c are formed. However, when at least three abutment portions are formed, the posture of the prism unit 30 can be set to a desired angle with respect to the light-receiving surface of the image sensing element. In the second embodiment, the number of slants 73a of the fine adjustment mechanism 70 corresponding to the third abutment portions 31b can also be at least three.

An image sensing device 10b according to the third embodiment of the present invention will be described next with reference to FIGS. 27 to 31. The image sensing device 10b has a mechanism which displaces a prism unit 30 in a direction crossing the light-receiving surface of an image sensing element 12 and, more preferably, in a direction perpendicular to the light-receiving surface of the image sensing element 12. For the descriptive convenience, the direction perpendicular to the light-receiving surface of the image sensing element 12 will be defined as an X direction, the direction in which a first prism 41 and a second prism 42 are arranged will be defined as a Y direction, and the widthwise direction of the prism unit 30, which is perpendicular to the Y and X directions, will be defined as a Z direction in the drawings. As shown in FIG. 27, the image sensing device 10b comprises a fixing member 513, case member 514, pivot support portion 515, and adjustment mechanism 516 in addition to the above-described prism unit 30 and image sensing element 12.

The fixing member 513 is arranged between the prism unit 30 and a board 11. The fixing member 513 has a window 513a at the central portion. The fixing member 513 locates the light-receiving surface of the image sensing element 12 on an exit optical axis λo such that a light beam which exits from the second prism of the prism unit 30 passes through the window 513a and forms an image on the light-receiving surface of the image sensing element 12.

The case member 514 has a box shape which covers the prism unit 30 except its surface on the side of the fixing member 513. The prism unit 30 is fixed in the case member 514. The case member 514 has an incident window 514a at a portion through which the light beam that should enter the first prism 41 of the prism unit 30 passes. A protective glass 514b is fitted in the incident window 514a. As the protective glass 514b, IR-blocking glass is preferably used.

As shown in FIG. 27, the prism unit 30 comprises holding plates 531. The holding plates 531 are arranged in parallel to an X-Y plane along which an incident optical axis λi and the exit optical axis λo pass so that the first prism 41 and second prism 42 are sandwiched from both sides in the widthwise direction (Z direction). The holding plates 531 may be either integrated with an aperture member 43 or attached as separate components. When the prism unit 30 has the holding plates 531, the contact area to the case member 514 increases. Hence, the prism unit 30 can more reliably be fixed to the case member 514.

The pivot support portion 515 comprises unit-side plates 515a, element-side plates 515b, shaft 515c, and helical torsion spring 517. The unit-side plates 515a are fixed to end portions 514c of the case member 514 on the side of the first prism 41. The unit-side plates 515a have through holes 515d in a direction perpendicular to the X-Y plane along which the incident optical axis λi and exit optical axis λo pass. The element-side plates 515b are fixed to end portions 513b of the fixing member 513 on the side of the first prism 41. The element-side plates 515b are arranged to sandwich the unit-side plates 515a in the widthwise direction (Z direction) of the prism unit 30. The element-side plates 515b have through holes 515e at positions overlapping the through holes 515d in the unit-side plates 515a.

The shaft 515c is inserted to the helical torsion spring 517 and the through holes 515d and 515e in the direction perpendicular to the X-Y plane along which the incident optical axis λi and exit optical axis λo pass. Accordingly, as shown in FIG. 27, the case member 514 which incorporates the prism unit 30 is supported to rotate on the shaft 515c whose pivot center line B is arranged in the direction perpendicular to the X-Y plane along which the incident optical axis λi and exit optical axis λo pass. In other words, the prism unit 30 rotates in a direction in which the prism unit 30 approaches or separates from the light-receiving surface of the image sensing element 12 about the pivot center line B arranged in the direction parallel to the light-receiving surface of the image sensing element 12 and perpendicular to the direction in which the incident optical axis λi and exit optical axis λo are arranged, i.e., in the direction perpendicular to the X-Y plane along which the incident optical axis λi and exit optical axis λo pass.

Figure 28:
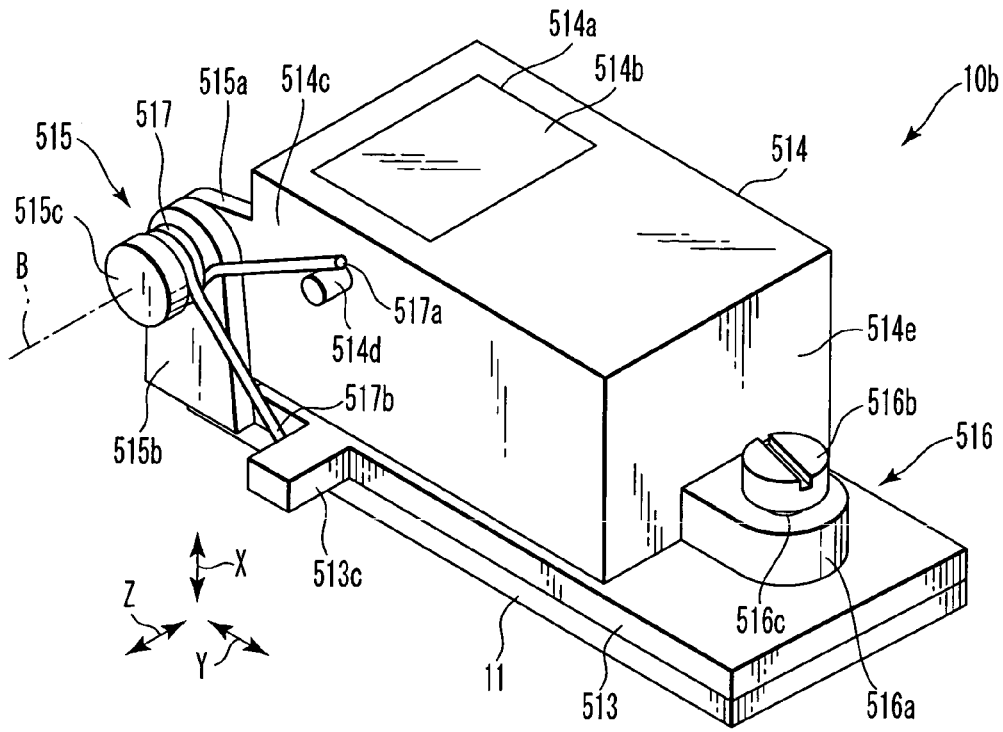
FIG. 28 is a perspective view of the image sensing device shown in FIG. 27.

One winding end 517a of the helical torsion spring 517 is locked to a unit-side spring bracket portion 514d which projects from the case member 514 in the widthwise direction (Z direction) of the prism unit 30. The other winding end 517b of the helical torsion spring 517 pivots in a direction to compress the helical torsion spring 517 against the elasticity and is locked to an element-side spring bracket portion 513c which projects from the fixing member 513 in the widthwise direction (Z direction) of the prism unit 30, as shown in FIG. 28. Hence, the prism unit 30 and image sensing element 12 are urged in a direction in which they approach each other. In this embodiment, the prism unit 30 and image sensing element 12 are urged by using the helical torsion spring 517 in the direction in which they approach each other. Any other urging member than the helical torsion spring 517 may be used.

The adjustment mechanism 516 comprises an adjustment piece 516a and an adjustment screw 516b. The adjustment piece 516a is arranged at an end portion 514e of the case member 514 on the side of the second prism 42. The adjustment screw 516b is threadably inserted to a female screw 516c extending through the adjustment piece 516a toward the fixing member 513.

Figure 29:
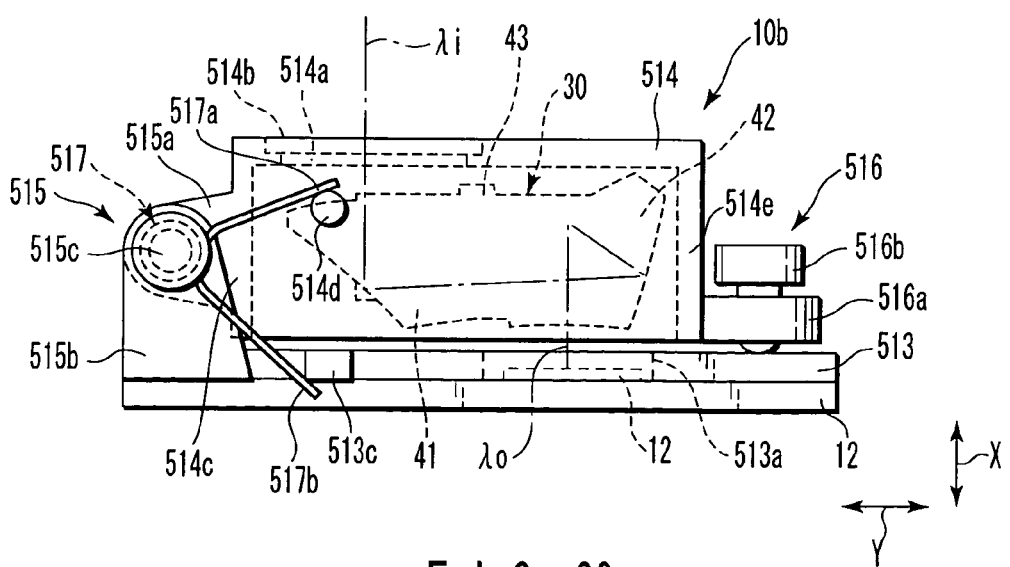
FIG. 29 is a side view of the image sensing device shown in FIG. 28.

As shown in FIG. 29, in the image sensing device 10b having the above-described arrangement, along the light-receiving surface of the image sensing element 12, the pivot support portion 515 is arranged at a position farther from the aperture member 43 of the prism unit 30 than the first prism 41. In addition, the adjustment mechanism 516 is arranged at a position farther from the aperture member 43 than the second prism 42. The length of the light-receiving surface of the image sensing element 12 from the pivot center line B of the pivot support portion 515 in the radial direction of rotation is smaller than the distance from the pivot center line B to the exit optical axis λo, as shown in FIG. 30.

Hence, as shown in FIG. 31, the angular displacement between the exit optical axis λo and the light-receiving surface of the image sensing element 12 generated by causing the prism unit 30 to rotate on the pivot support portion 515 by using the adjustment mechanism 516 is much smaller than the displacement in distance between the second prism 42 and the light-receiving surface of the image sensing element 12. That is, when the prism unit 30 is caused to rotate on the pivot center line B of the pivot support portion 515 together with the case member 514 by using the adjustment mechanism 516 to adjust the shift between the light-receiving surface of the image sensing element 12 and the imaging plane (focal plane) on which the prism unit 30 forms an object image, the angular displacement generated on the imaging plane with respect to the light-receiving surface of the image sensing element 12 falls within the allowable range.

When the light-receiving surface of the image sensing element 12 has a rectangular shape, the long sides of the light-receiving surface are arranged in parallel to the pivot center line B of the pivot support portion. When the image sensing element 12 is thus arranged, the angular displacement of the imaging plane with respect to the light-receiving surface, which is generated when the prism unit 30 rotates on the pivot center line B, can be decreased. Hence, the influence of so-called local defocus in which an in-focus state is obtained at the central portion of the screen while an out-of-focus state is generated at the peripheral portion can be reduced.

An image sensing device 10c according to the fourth embodiment of the present invention will be described with reference to FIG. 32. The same reference numerals as in the image sensing device 10b of the third embodiment denote components having the same functions in the fourth embodiment, and a description thereof will be omitted.

The image sensing device 10c shown in FIG. 32 is different from the image sensing device 10b of the third embodiment shown in FIG. 28 in the structure of a pivot support portion 515. The pivot support portion 515 of this embodiment comprises a unit-side plate 515f and an element-side plate 515g. The unit-side plate 515f is arranged at an end portion 514c of a case member 514 on the side of a first prism 41 near a fixing member 513. The unit-side plate 515f extends in a direction separating from a prism unit 30 along the light-receiving surface of an image sensing element 12. The element-side plate 515g is arranged at an end portion 513b of the fixing member 513 on the side of the first prism 41 along the fixing member 513. The element-side plate 515g is bonded and fixed while overlapping the unit-side plate 515f.

In this case, a step 518 is formed at the boundary between the element-side plate 515g and the fixing member 513 such that a small gap C is formed between the fixing member 513 and the case member 514. The step 518 may be formed on the side of the case member 514. With this structure, any shift of an overlap portion 515h between the unit-side plate 515f and the element-side plate 515g in each product can be prevented. The step 518 is formed along a direction perpendicular to the X-Y plane along which an incident optical axis λi and exit optical axis λo of the prism unit 30 pass.

When the prism unit 30 is moved in the direction perpendicular to the light-receiving surface of the image sensing element 12 together with the case member 514 by using an adjustment mechanism 516, a pivot center line B on which the prism unit 30 rotates is arranged near the step 518 along the direction perpendicular to the X-Y plane along which the incident optical axis λi and exit optical axis λo of the prism unit 30 pass. That is, the prism unit 30 rotates on the pivot center line B of the pivot support portion 515.

In the fourth embodiment, in the pivot support portion 515, the unit-side plate 515f and element-side plate 515g are bonded and fixed while overlapping each other. In this case, the pivot support portion 515 need only be formed such that the pivot center line B is arranged along the direction perpendicular to the X-Y plane along which the incident optical axis λi and exit optical axis λo of the prism unit 30 pass. Hence, the structure from the end portion 513b of the fixing member 513 to the end portion 514c of the case member 514, including the pivot support portion 515, may continuously be formed.

The image sensing device 10c having the above-described arrangement has the same function and effect as those of the image sensing device 10b of the third embodiment. The image sensing device 10c includes a smaller number of components and has a simpler structure than the image sensing device 10b of the third embodiment.

In this embodiment, the case member 514 is arranged as a component separated from the prism unit 30. The prism unit 30 is fixed in the case member 514 and rotates on the pivot support portion 515 together with the case member 514. Hence, the prism unit may include the case member 514.

In this embodiment, the distance between an exit surface 64 of the prism unit 30 and the light-receiving surface of the image sensing element 12 is adjusted by jacking up the prism unit 30 by using an adjustment screw 516b. This adjustment may be done by another method. For example, a through hole is formed in an adjustment piece 516a. The adjustment screw 516b is inserted to the through hole of the adjustment piece 516a and threadably engaged with the threaded hole of the fixing member 513 to move the prism unit in the direction in which the prism unit approaches the image sensing element. In this case, the urging direction of the helical torsion spring 517 in the third embodiment is set in a reverse direction. The step 518 in the fourth embodiment is set to be slightly larger.

Figure 33:
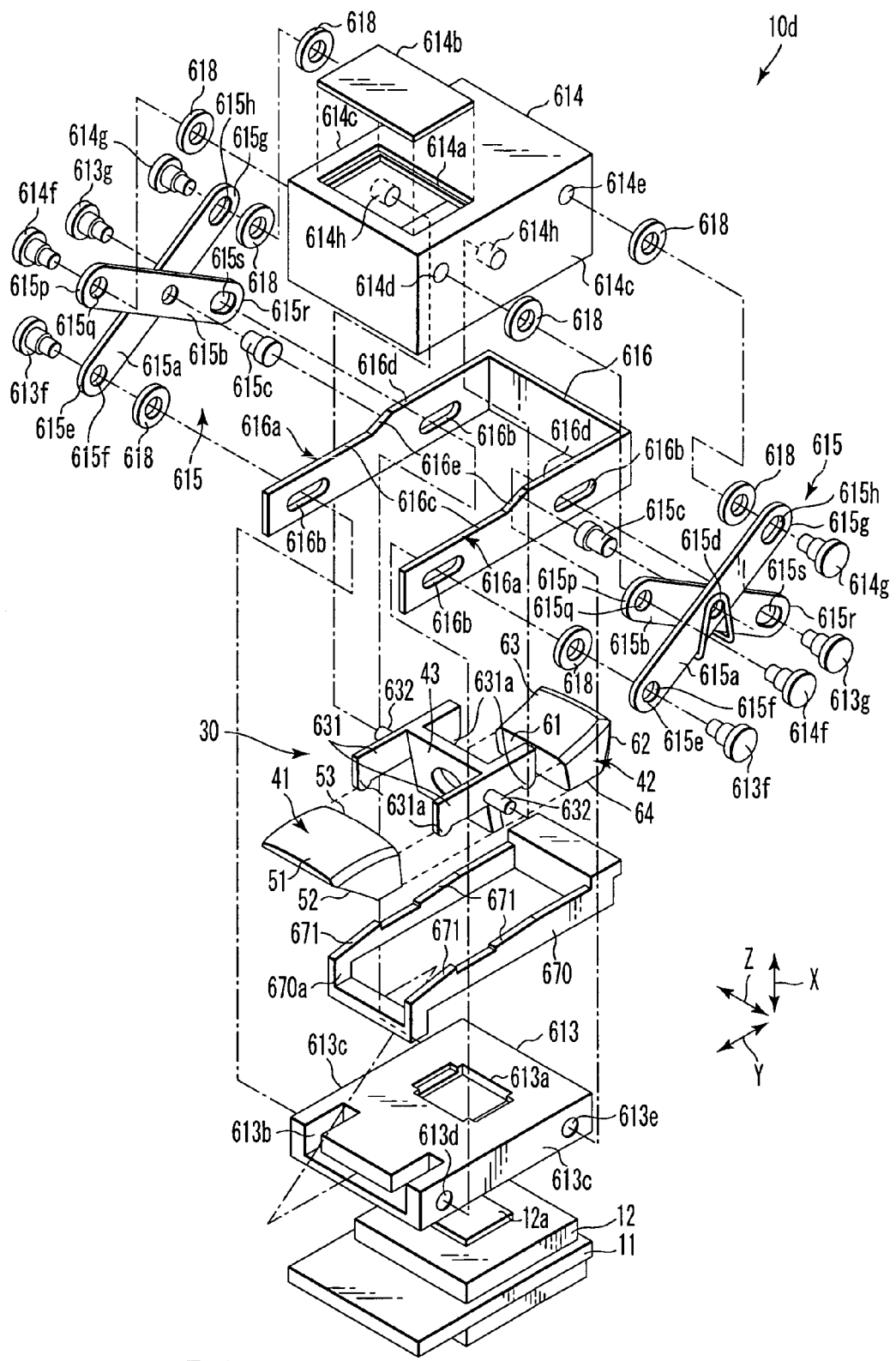
FIG. 33 is an exploded perspective view of an image sensing device of the fifth embodiment according to the present invention.

An image sensing device 10d according to the fifth embodiment of the present invention will be described with reference to FIGS. 33 to 41. The image sensing device 10d has a mechanism which moves a prism unit 30 in a direction crossing the light-receiving surface of an image sensing element 12 and, more preferably, in a direction perpendicular to the light-receiving surface of the image sensing element 12. For the descriptive convenience, the direction perpendicular to the light-receiving surface of the image sensing element 12 will be defined as an X direction, the direction in which a first prism 41 and a second prism 42 are arranged will be defined as a Y direction, and the direction perpendicular to the Y and X directions will be defined as a Z direction in the drawings. As shown in FIG. 33, the image sensing device 10d comprises a fixing member 613, case member 614, link mechanism 615, switching member 616, and fine adjustment mechanism 670 in addition to the above-described prism unit 30 and image sensing element 12.

The fixing member 613 is arranged between the prism unit 30 and the image sensing element 12. The fixing member 613 has a window 613a at the central portion. The fixing member 613 locates and fixes the light-receiving surface of the image sensing element 12 on an exit optical axis λo such that a light beam which exits from the second prism 42 of the prism unit 30 passes through the window 613a and forms an image on the light-receiving surface of the image sensing element 12. The fixing member 613 on the side of the first prism 41 has guide portions 613b along the Y direction in which the first prism 41 and second prism 42 are arranged. Mounting holes 613d and 613e are formed, at a total of four portions near the first prism 41 and second prism 42, in two side portions 613c of the fixing member 613 in the widthwise direction (Z direction) of the prism unit 30, which is perpendicular to an X-Y plane along which an incident optical axis λi and the exit optical axis λo pass. First support shafts 613f and 613g serving as first link support portions that support the link mechanism 615 are inserted to the mounting holes 613d and 613e.

The case member 614 has a box shape which covers the prism unit 30 except its surface on the side of the fixing member 613. The prism unit 30 is mounted in the case member 614. The case member 614 has an incident window 614a at a portion through which the light beam that should enter the first prism 41 of the prism unit 30 passes. A protective glass 614b is fitted in the incident window 614a. As the protective glass 614b, IR-blocking glass is preferably used. Mounting holes 614d and 614e are formed, at a total of four portions near the first prism 41 and second prism 42, in two side portions 614c of the case member 614 in the Z direction. Second support shafts 614f and 614g serving as second link support portions of the link mechanism 615 are inserted to the mounting holes 614d and 614e.

Figure 36:
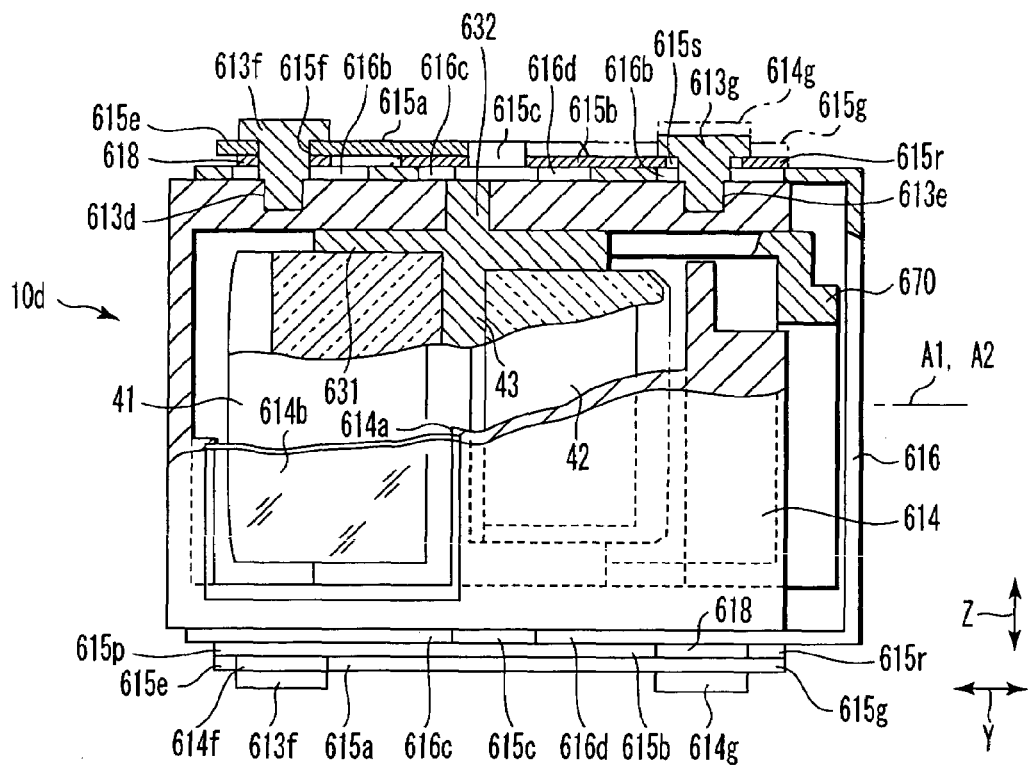
FIG. 36 is a partially cutaway plan view of the image sensing device shown in FIG. 34, which is viewed from the side of incidence.
Figure 37:
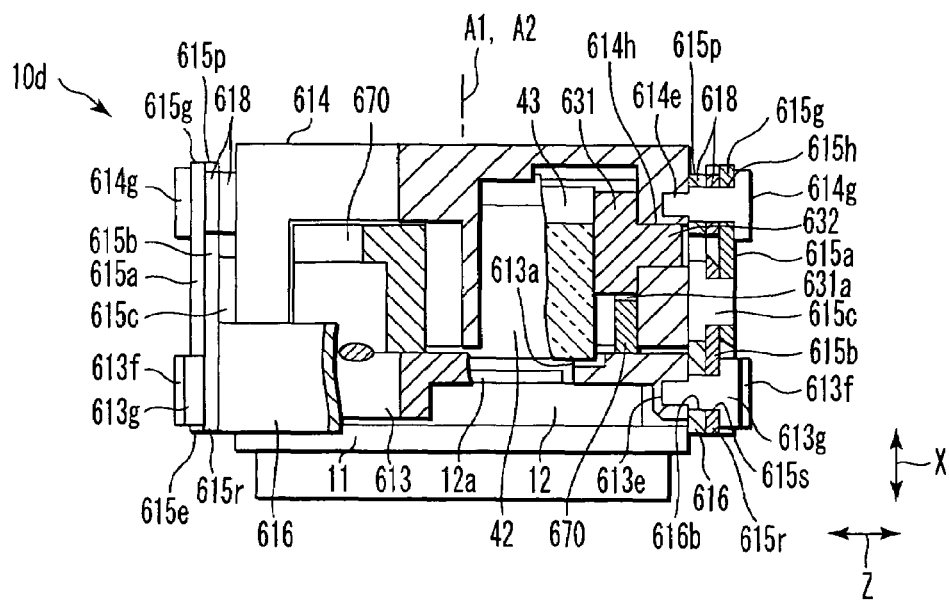
FIG. 37 is a partially cutaway side view of the image sensing device shown in FIG. 34, which is viewed from the side of the second prism.

As shown in FIGS. 36 and 37, the prism unit 30 comprises holding plates 631. The holding plates 631 are arranged in parallel to planes A1 and A2 (X-Y plane) along which the incident optical axis λi and exit optical axis λo pass so that the first prism 41 and second prism 42 are sandwiched from both sides in the widthwise direction (Z direction). The holding plates 631 may be either integrated with an aperture member 43 or attached as separate components. Engaging pins 632 which extend in the Z direction are arranged on both sides of the holding plate 631. The engaging pins 632 are inserted to engaging holes 614h formed in the case member 614 to connect the case member 614 and the prism unit 30. First fine adjustment abutment portions 631a formed into a convex shape projecting toward the fixing member 613 are formed at four corners of the holding plates 631 facing the fixing member 613.

In stead of fitting the engaging pins 632 in the engaging holes 614h to mount the prism unit 30 in the case member 614, the holding plates 631 may be bonded and fixed directly on the inner surfaces of the case member 614. Any other method can be used to fix the prism unit 30 directly inside the case member 614.

The link mechanism 615 operatively connects the fixing member 613 and prism unit 30 to shift the prism unit 30 along the direction perpendicular to the light-receiving surface of the image sensing element 12 while maintaining the posture of the prism unit 30. To implement this arrangement, in this embodiment, the link mechanism 615 comprises first arm portions 615a, second arm portions 615b, support pins 615c, and urging members 615d.

Each first arm portion 615a has a pivot hole 615f at one end 615e. A long hole 615h having a major axis in a direction along the first arm portion 615a is formed at the other end 615g. Each second arm portion 615b has a pivot hole 615q at one end 615p. A long hole 615s having a major axis in a direction along the second arm portion 615b is formed at the other end 615r. The first arm portion 615a and second arm portion 615b are rotationally supported by the support pin 615c between the ends 615e and 615p and the other ends 615g and 615r.

One end 615e of each first arm portion 615a is rotationally supported by the first support shaft 613f on the side of the first prism 41. The other end 615g is slidably supported by the second support shaft 614g on the side of the second prism 42. One end 615p of each second arm portion 615b is rotationally supported by the second support shaft 614f on the side of the first prism 41. The other end 615r is slidably supported by the first support shaft 613g on the side of the second prism 42. The urging member 615d urges the first arm portion 615a and second arm portion 615b in a direction in which they rotate on the support pin 615c and overlap each other.

In this embodiment, the first arm portion 615a and second arm portion 615b are rotationally supported by the first support shaft 613f and second support shaft 614f, respectively, on the side of the first prism 41. However, the first arm portion 615a and second arm portion 615b may be rotationally supported by the first support shaft 613g and second support shaft 614g, respectively, on the side of the second prism 42. The link mechanism 615 need only operatively connect the fixing member 613 and prism unit 30 to shift the prism unit 30 in the direction perpendicular to the light-receiving surface of the image sensing element 12 while maintaining its posture. Hence, in place of the case member 614, a support member designed to connect the prism unit 30 to the link mechanism 615 may be applied.

The switching member 616 has a function of selectively positioning and holding the prism unit 30 at a first position P1 or second position P2 along the direction perpendicular to the light-receiving surface of the image sensing element 12. The first position P1 is, e.g., the standard image sensing position shown in FIG. 2. The second position P2 is farther from the light-receiving surface than the first position P1 and is, e.g., the macro image sensing position shown in FIG. 2. To make the switching operation possible, in this embodiment, the switching member 616 is arranged between the link mechanism 615 and the fixing member 613, as shown in FIGS. 34 to 37. The switching member 616 can move in the Y direction in which the first prism 41 and second prism 42 are arranged. The switching member 616 has abutment portions 616a and slide holes 616b.

The abutment portions 616a abut against the support pins 615c which rotationally insert the first arm portions 615a and second arm portions 615b and project to the side of the prism unit 30. Each abutment portion 616a has a first abutment portion 616c, second abutment portion 616d, and slant 616e. The first abutment portions 616c locate the prism unit 30 at the first position P1. The second abutment portions 616d locate the prism unit 30 at the second position P2. The slants 616e make the prism unit movable between the first position P1 and the second position P2 while keeping the support pins 615c in a slidable contact with the slants 616e. Since the link mechanism 615 has the urging members 615d, the support pins 615c are always pressed against the abutment portions 616a.

Each slide hole 616b is a long hole whose major axis is arranged in the direction in which the switching member 616 moves. The switching member 616 has the slide holes 616b at positions corresponding to the first support shafts 613f and 613g. As shown in FIG. 36, the first support shafts 613f and 613g are inserted to the slide holes 616b of the switching member 616. The first arm portions 615a, second arm portions 615b, and switching member 616 are arranged such that they overlap in the Z direction. Hence, to prevent the first arm portions 615a, second arm portions 615b, and switching member 616 from twisting, an appropriate number of spacer washers 618 are attached to necessary portions of the first support shafts 613f and 613g and second support shafts 614f and 614g in accordance with their thicknesses.

The switching member 616 is arranged along the direction parallel to the light-receiving surface of the image sensing element 12 to be movable between a first setting position S1 and a second setting position S2 in the Y direction in which the first prism 41 and second prism 42 are arranged. The switching member 616 interlocks with, e.g., a manual operation switching member 95 which is arranged on a housing 2 of a digital camera 1 shown in FIG. 1.

As shown in FIG. 33, the fine adjustment mechanism 670 is arranged between the fixing member 613 and the prism unit 30. The fine adjustment mechanism 670 finely adjusts the first position P1 of the prism unit 30 along the direction perpendicular to the light-receiving surface of the image sensing element 12. The fine adjustment mechanism 670 has second fine adjustment abutment portions 671 in correspondence with the first fine adjustment abutment portions 631a formed at the corners of the holding plate 631.

The second fine adjustment abutment portions 671 abut against the first fine adjustment abutment portions 631a while the prism unit 30 is located and held at the first position P1. The second fine adjustment abutment portions 671 slightly tilt to the side of the first prism 41 with respect to the X direction perpendicular to the light-receiving surface of the image sensing element 12. Hence, when the fine adjustment mechanism 670 is moved in the Y direction, the prism unit 30 is displaced in the X direction while being supported by the link mechanism 615 together with the case member 614. An end portion 670a of the fine adjustment mechanism 670 is fitted on the guide portion 613b of the fixing member 613 on the side of the first prism 41. After the first position P1 of the prism unit 30 is adjusted to an appropriate position, the fine adjustment mechanism 670 is fixed to the fixing member 613 by an adhesive or the like.

Figure 38:
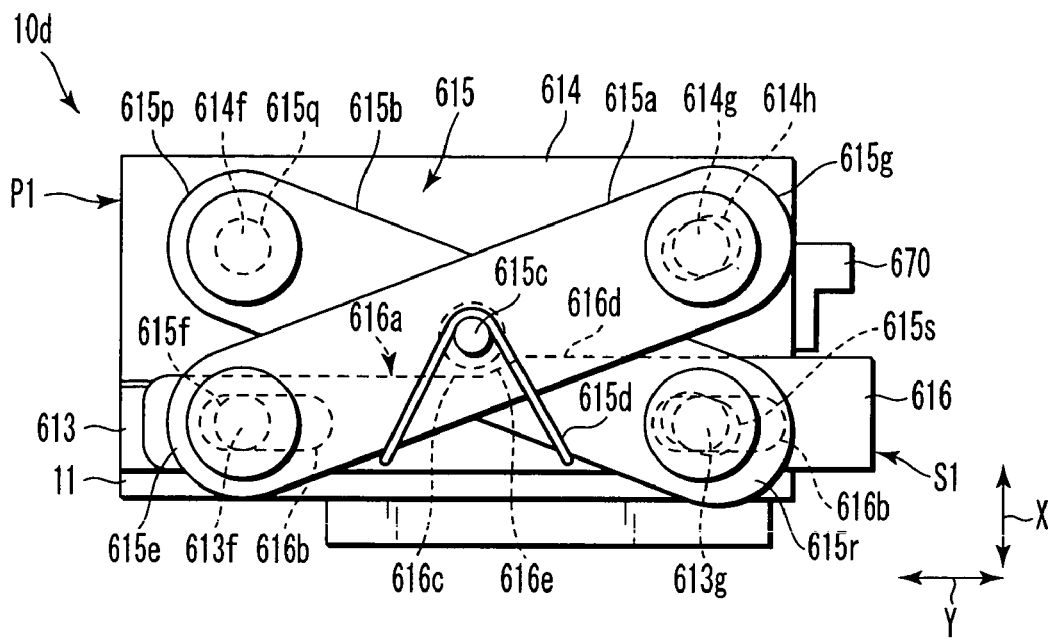
FIG. 38 is a side view of the image sensing device shown in FIG. 34 when the switching mechanism is at the first setting position.
Figure 39:
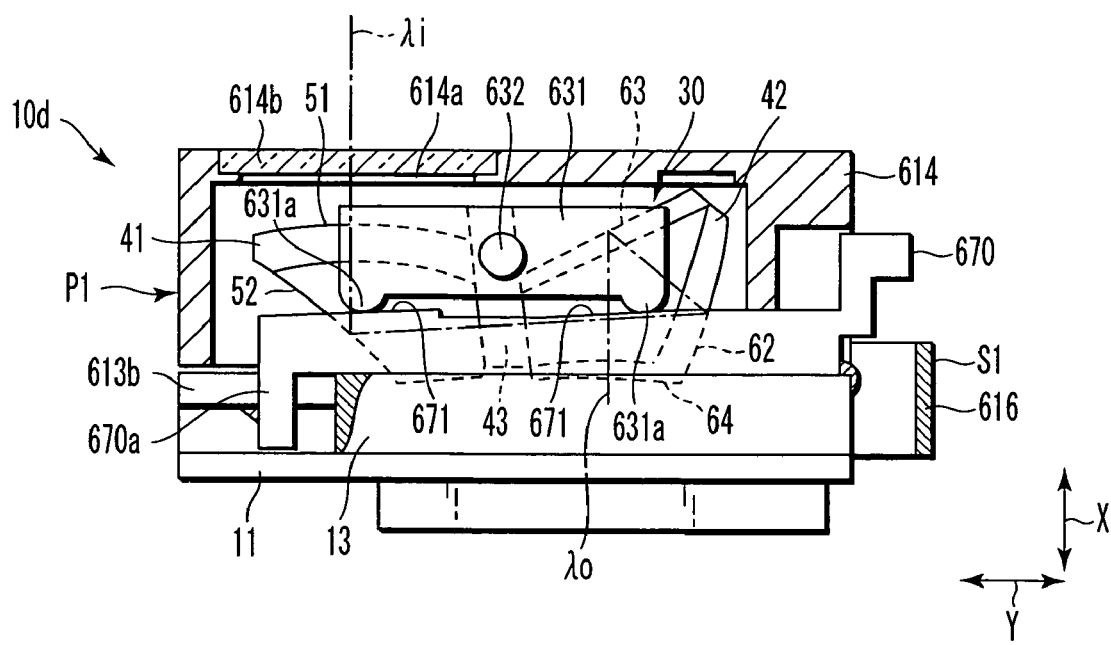
FIG. 39 is a sectional view of the image sensing device shown in FIG. 38.

The operation of the image sensing device 10d in switching the prism unit 30 between the first position P1 and the second position P2 will be described next. FIGS. 38 and 39 show a state in which the first position P1 of the prism unit 30 is finely adjusted by the fine adjustment mechanism 670. When the first position P1 is finely adjusted by the fine adjustment mechanism 670, the first fine adjustment abutment portions 631a abut against the second fine adjustment abutment portions 671, as shown in FIG. 39. Accordingly, the support pins 615c are separated from the first abutment portions 616c, as shown in FIG. 38.

When the switching member 616 is moved in the Y direction to switch the prism unit 30 to the second position P2, the support pins 615c of the link mechanism 615 come into contact with the slants 616e of the abutment portions 616a during movement of the switching member 616 and are displaced up to the second abutment portions 616d in a direction in which the prism unit separates from the light-receiving surface of the image sensing element 12 along the X direction perpendicular to the light-receiving surface. When the support pins 615c move in the X direction, the angle between the first arm portion 615a and the second arm portion 615b changes. As a result, the prism unit 30 moves in the direction in which it separates from the light-receiving surface of the image sensing element 12 together with the case member 614 and is located at the second position P2, as shown in FIGS. 40 and 41.

As described above, when, e.g., the manual operation switching member 95 is operated, the first setting position S1 shown in FIGS. 38 and 39 and the second setting position S2 shown in FIGS. 40 and 41 are switched. At the first setting position S1, the switching member 616 locates and holds the prism unit 30 at the finely adjusted first position P1, as shown in FIG. 39. At the second setting position S2, the switching member 616 locates and holds the prism unit at the second position P2, as shown in FIG. 41.

In this embodiment, the switching member 616 is arranged between the fixing member 613 and the link mechanism 615. Instead, the switching member 616 may be arranged outside the link mechanism 615. The support pins 615c which extend through the first arm portions 615a and second arm portions 615b and project to separate from the prism unit 30 may be supported by the abutment portions 616a.

An image sensing device 10e according to the sixth embodiment of the present invention will be described with reference to FIGS. 42 to 47. The same reference numerals as in the image sensing device 10d of the fifth embodiment denote components having the same functions in the sixth embodiment, and a description thereof will be omitted.

Figure 42:
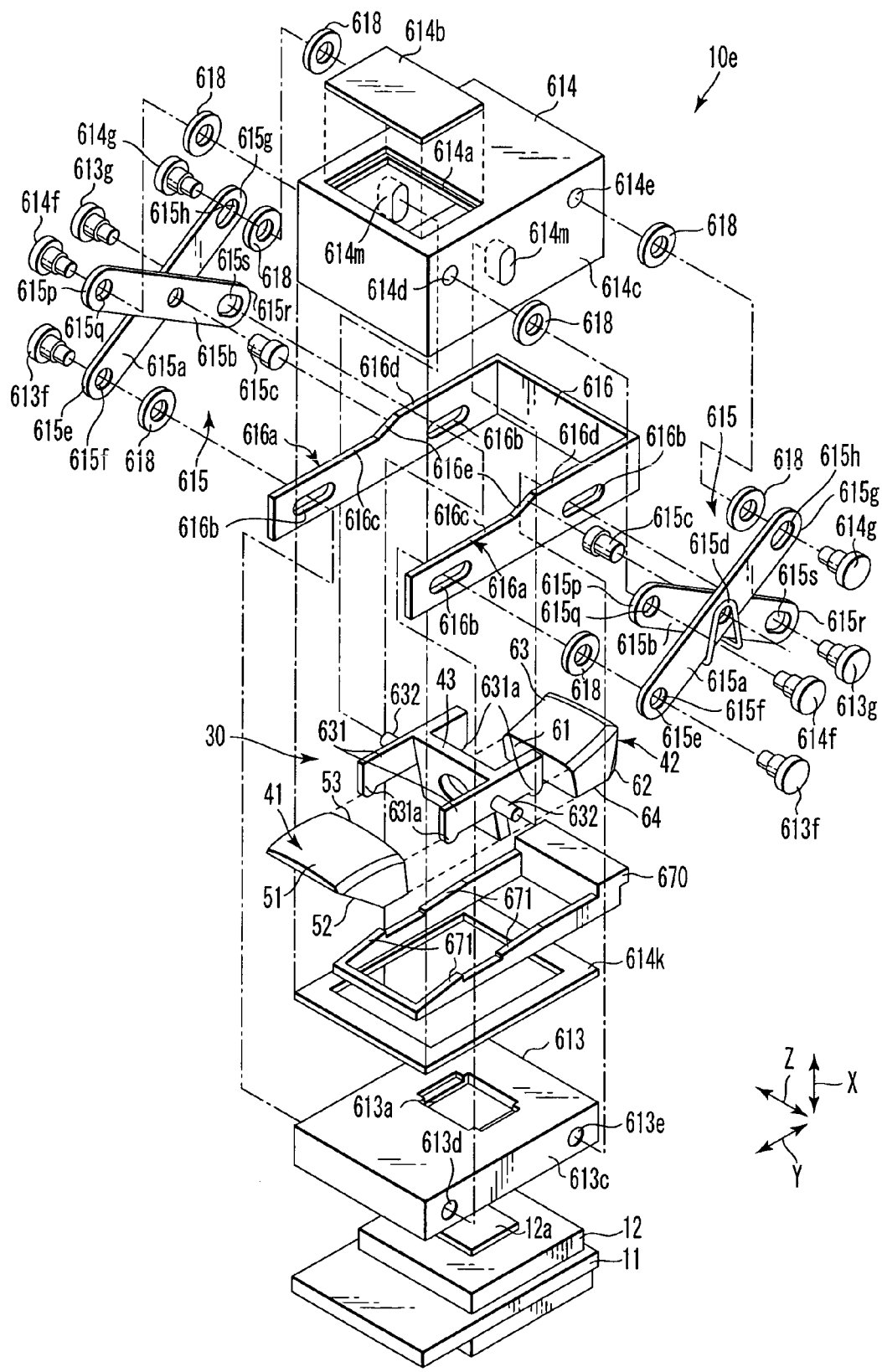
FIG. 42 is an exploded perspective view showing an image sensing device of the sixth embodiment according to the present invention.

The image sensing device 10e shown in FIG. 42 is different from the image sensing device 10d of the fifth embodiment in that the device comprises a support frame 614k of a case member 614 between a fixing member 613 and a fine adjustment mechanism 670, and the fine adjustment mechanism 670 is fixed to the support frame 614k. Hence, the fine adjustment mechanism 670 is moved integrally with a prism unit 30 by a link mechanism 615 along the direction perpendicular to the light-receiving surface of an image sensing element 12 while keeping second fine adjustment abutment portions 671 abutting against first fine adjustment abutment portions 631a arranged on a holding plate 631 of the prism unit 30.

The prism unit 30 is moved in the case member 614 by the fine adjustment mechanism 670 in the X direction perpendicular to the light-receiving surface of the image sensing element 12. The case member 614 therefore has long engaging holes 614m having a major axis in the X direction at positions corresponding to engaging pins 632 arranged on the holding plate 631 of the prism unit 30.

In the image sensing device 10e having the above-described structure, the case member 614 and fine adjustment mechanism 670 integrally move together with the prism unit 30. At a first position P1, support pins 615c are in contact with first abutment portions 616c of a switching member 616 at a first setting position S1, as shown in FIG. 44. In addition, the first fine adjustment abutment portions 631a of the holding plate 631 are in contact with the second fine adjustment abutment portions 671 of the fine adjustment mechanism 670, as shown in FIG. 45. At a second position P2, the support pins 615c are in contact with second abutment portions 616d of the switching member 616 at a second setting position S2, as shown in FIG. 46. In addition, the first fine adjustment abutment portions 631a of the holding plate 631 are in contact with the second fine adjustment abutment portions 671 of the fine adjustment mechanism 670, as shown in FIG. 47.

That is, the image sensing device 10e can finely adjust at least one of the first position P1 and second position P2 by using the fine adjustment mechanism 670. In this case, the conditions of the first position P1 and second position P2 may be compared. One of the positions may be adjusted with a particular emphasis on it, or setting may be done while balancing the conditions well.

An adjustment mechanism 686 serving as an adjustment means applied to an image sensing device according to the seventh embodiment of the present invention will be described with reference to FIGS. 48 and 49. The adjustment mechanism 686 shown in FIG. 48 has both functions of the switching member 616 and fine adjustment mechanism 670 of the above-described embodiments. The adjustment mechanism 686 comprises an adjustment member 686a, first fine adjustment cam 686b, and second fine adjustment cams 686c.

The adjustment member 686a has adjustment slants 686d which tilt to the side of a first prism 41. The adjustment slants 686d may tilt to the side of a second prism 42. Each adjustment slant 686d has at its part a first abutment portion 616c and second abutment portion 616d. The first abutment portions 616c locate a prism unit 30 at a first position P1 shown in FIG. 2. The second abutment portions 616d locate the prism unit 30 at a second position P2 shown in FIG. 2. The adjustment member 686a can move along the Y direction in FIG. 48 in which the first prism 41 and second prism 42 are arranged.

When the adjustment member 686a is at a first setting position S1, the first fine adjustment cam 686b abuts against an end portion 686e of the adjustment member 686a on the side of the second abutment portions 616d and is eccentric in the Y direction about a first cam shaft M1 arranged along the X direction. The first setting position S1 of the adjustment member 686a which positions the prism unit 30 at the first position P1 is finely adjusted in the Y direction. Accordingly, the first position P1 of the prism unit 30 is set to an appropriate position.

When the adjustment member 686a is at a second setting position S2, the second fine adjustment cams 686c abut against end portions 686f of the adjustment member 686a on the side of the first abutment portions 616c and are decentered in the Y direction about a second cam shaft M2 arranged along the X direction. The second setting position S2 of the adjustment member 686a which positions the prism unit 30 at the second position P2 is finely adjusted in the Y direction. Accordingly, the second position P2 of the prism unit 30 is set to an appropriate position.

As described above, the adjustment member 686a can locate the prism unit 30 at the first position P1 and second position P2 by using the adjustment slants 686*d* and also finely adjust the first position P1 and second position P2.

Figure 51:
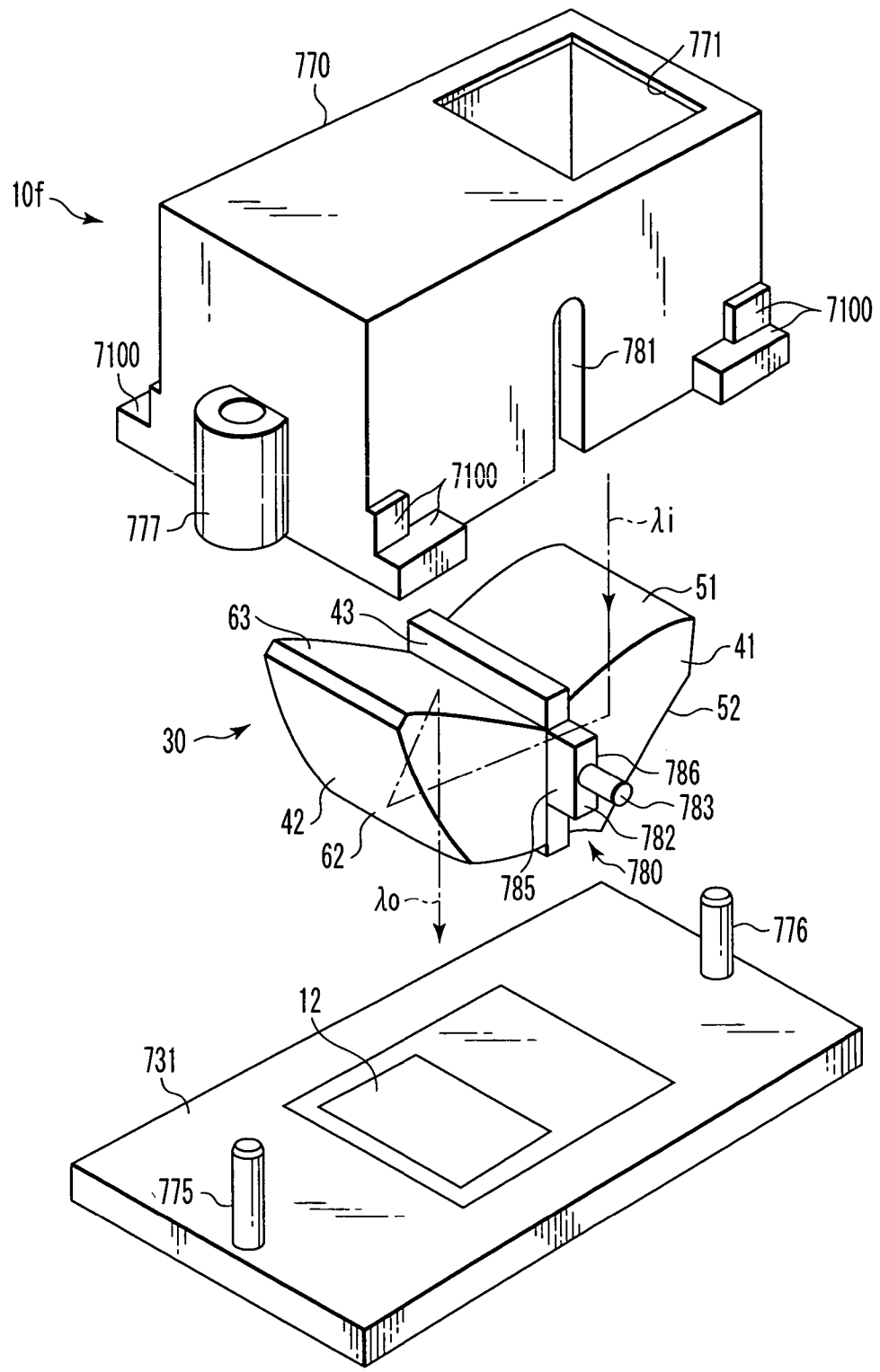
FIG. 51 is an exploded perspective view of the image sensing device shown in FIG. 50.

An image sensing device 10*f* according to the eighth embodiment of the present invention will be described with reference to FIGS. 50 to 52. As shown in FIG. 50, a prism unit 30 of the image sensing device 10*f* is accommodated in a case 770. The case 770 has an incident window 771 at a position opposing an incident surface 51 of a first prism 41. As shown in FIG. 51, a pair of guide members 775 and 776 are formed on a fixing frame 731. The guide members 775 and 776 are fitted in engaging portions 777 (only one of them is illustrated) formed on the case 770.

The image sensing device 10*f* comprises a guide mechanism 780 to guide the prism unit 30 movably in a direction perpendicular to the light-receiving surface of an image sensing element 12. The guide mechanism 780 guides the prism unit 30 movably in the X direction along the direction (the direction indicated by an arrow X in FIG. 50) perpendicular to the light-receiving surface of the image sensing element 12 while maintaining the posture of the prism unit 30.

The guide mechanism 780 includes guide grooves 781 as an example of guide portions formed in the case 770, convex guided portions 782 which fit in the guide grooves 781 and freely move in the X direction, and abutment portions 783 which abut against a switching member 791 to be described later. The guided portions 782 and abutment portions 783 are formed on both side surfaces of an aperture member 43. The guided portions 782 and abutment portions 783 may be formed on the first prism 41 or a second prism 42.

Each guided portion 782 is formed from a convex portion having two parallel surfaces 785 and 786. When the two parallel surfaces 785 and 786 come into contact with the inner surfaces of the guide groove 781, the prism unit 30 can move straight in the X direction. The abutment portions 783 can have any shape and, for example, a cylindrical pin-like shape and come into contact with positioning surfaces 792 of the switching member 791 which forms a switching mechanism 790.

The switching member 791 has a function of selectively positioning and holding the prism unit 30 at a first position (e.g., the standard image sensing position shown in FIG. 2) P1 or a second position P2 (e.g., the macro image sensing position) farther from the light-receiving surface of the image sensing element 12 than the first position P1 along the guide mechanism 780. The switching member 791 can move reciprocally in a direction (a direction parallel to the light-receiving surface of the image sensing element 12) indicated by an arrow Y in FIG. 50 with respect to the fixing frame 731 and case 770.

The switching member 791 can be switched between a first setting position S1 and a second setting position S2 by, e.g., a manual operation switching member 95 arranged on a housing 2 of a digital camera 1 shown in FIG. 1. The manual operation switching member 95 interlocks with the switching member 791 of the switching mechanism 790 and is used to selectively locate the switching mechanism 790 at the first setting position S1 or second setting position S2.

The switching member 791 can move between the first setting position S1 and the second setting position S2 along the direction (the direction indicated by the arrow Y in FIG. 50) parallel to the light-receiving surface of the image sensing element 12. Each positioning surface 792 formed on the switching member 791 has a first plane portion 792*a*, second plane portion 792*b*, and slant portion 792*c* along the direction (Y direction) parallel to the light-receiving surface of the image sensing element 12. The first plane portion 792*a* is parallel to the light-receiving surface of the image sensing element 12. The second plane portion 792*b* is parallel to the light-receiving surface and is located at a position different from the first plane portion 792*a* in the direction perpendicular to the light-receiving surface. The slant portion 792*c* is located between the first plane portion 792*a* and the second plane portion 792*b*.

A predetermined portion midway in the longitudinal direction of the first plane portion 792*a* functions as a first face portion to locate the prism unit 30 at the first position P1. A predetermined portion midway in the longitudinal direction of the second plane portion 792*b* functions as a second face portion to locate the prism unit 30 at the second position P2.

The case 770 has guide portions 7100 serving as a switching member guide mechanism. The guide portions 7100 function to move the switching member 791 of the switching mechanism 790 straight along the direction (Y direction) parallel to the light-receiving surface of the image sensing element 12.

The positioning surfaces 792 formed on the switching member 791 abut against the abutment portions 783 of the prism unit 30. Since the slant portion 792*c* is formed between the first plane portion 792*a* and the second plane portion 792*b* of the positioning surface 792, the abutment portion 783 can smoothly move between the first plane portion 792*a* and the second plane portion 792*b*.

A spring 7101 is arranged as an example of a press mechanism to make the abutment portion 783 abut against the positioning surface 792. The abutment portion 783 is urged toward the positioning surface 792 by the elastic force of the spring 7101. The spring 7101 is attached to, e.g., the case 770.

The image sensing device 10*f* has a fine adjustment mechanism 7110 to finely adjust at least one (e.g., the first position P1) of the first position P1 and second position P2 in the direction perpendicular to the light-receiving surface of the image sensing element 12. An example of the fine adjustment mechanism 7110 includes the guide members 775 and 776 formed on the fixing frame 731 and the engaging portions 777 (only one of them is illustrated in FIG. 50) formed on the case 770.

The guide members 775 and 776 and engaging portions 777 can relatively move in the direction (X direction) perpendicular to the light-receiving surface of the image sensing element 12. That is, the prism unit 30 can move in the X direction integrally with the case 770 and switching mechanism 790. Accordingly, the prism unit 30 can finely adjust at least one of the first position P1 and the second position P2. That is, the position of the prism unit 30 can finely be adjusted in the direction perpendicular to the light-receiving surface of the image sensing element 12.

In fc adjustment of the image sensing device 10*f*, for example, as shown in FIG. 52, the case 770 is held by a jig 7121 having a grip mechanism 7120, and the relative position between the grip mechanism 7120 and a base member 7123 is finely adjusted by an adjustment member 7122 such as a screw, thereby adjusting a distance G between the fixing frame 731 and the case 770.

When the distance G between the fixing frame 731 and the case 770 is adjusted, fc adjustment can be done at, e.g., the standard image sensing position. In this case, to prevent the fixing frame 731 from moving during the fc adjustment, the fixing frame 731 is held at a predetermined position by a fixing jig 7125. In the fc adjustment, an adjustment test chart is placed at an object position suitable for standard image sensing. The contrast value of image data is evaluated on the basis of an electrical signal from the image sensing element.

Fine adjustment is executed such that the contrast value is maximized. A detailed description of this operation will be omitted.

After the fc adjustment, the guide members 775 and 776 and engaging portion 777 are bonded by, e.g., an adhesive. Accordingly, the distance from the prism unit 30 to the image sensing element 12 is fixed at a position where the focal plane to the image sensing element 12 is adjusted.

In this embodiment, adjustment is done such that the best imaging state is obtained at the standard image sensing position. Instead, fc adjustment may be done such that the best imaging state is obtained at the macro image sensing position without any particular adjustment for the imaging state at the standard image sensing position.

The operation of the image sensing device 10f having the switching mechanism 790 and fine adjustment mechanism 7110 will be described next. The switching member 791 is moved to the first setting position S1 by the manual operation switching member 95 shown in FIG. 1 or the like. In this case, the abutment portions 783 abut against the first face portions in the first plane portions 792a so that the prism unit 30 is set at the standard image sensing position.

When the switching member 791 is moved to the second setting position S2, the abutment portions 783 abut against the second face portions in the second plane portions 792b so that the prism unit 30 is set at the macro image sensing position. The manual operation switching member 95 is operatively connected to the switching member 791, although no detailed mechanism is illustrated.

In the image sensing device 10f, the position of the focal plane can finely be adjusted by fc adjustment. For this reason, the positional shift between an imaging plane 45 of the prism unit 30 and the light-receiving surface of the image sensing element 12, which is caused by an inevitable variation between components or accuracy of form of each component at the time of assembling the image sensing device 10f, can be minimized. Hence, the image sensing device 10f can form a satisfactory image.

FIGS. 53 to 56 show an image sensing device 10g according to the ninth embodiment which further embodies the present invention. The basic arrangement and function of the image sensing device 10g are the same as those of the image sensing device 10f of the eighth embodiment. The same reference numerals as in the image sensing device 10f of the eighth embodiment denote the same parts in the ninth embodiment.

The image sensing device 10g of the eighth embodiment comprises a fixing frame 731 having an image sensing element 12, a case 770, a prism unit 30 accommodated in the case 770, a guide mechanism 780, guide portions 7100 which function as a switching member guide mechanism, and guide members 775 and 776 and engaging portions 777 and 777' which form a fine adjustment mechanism 7110, as in the eighth embodiment.

Figure 53:
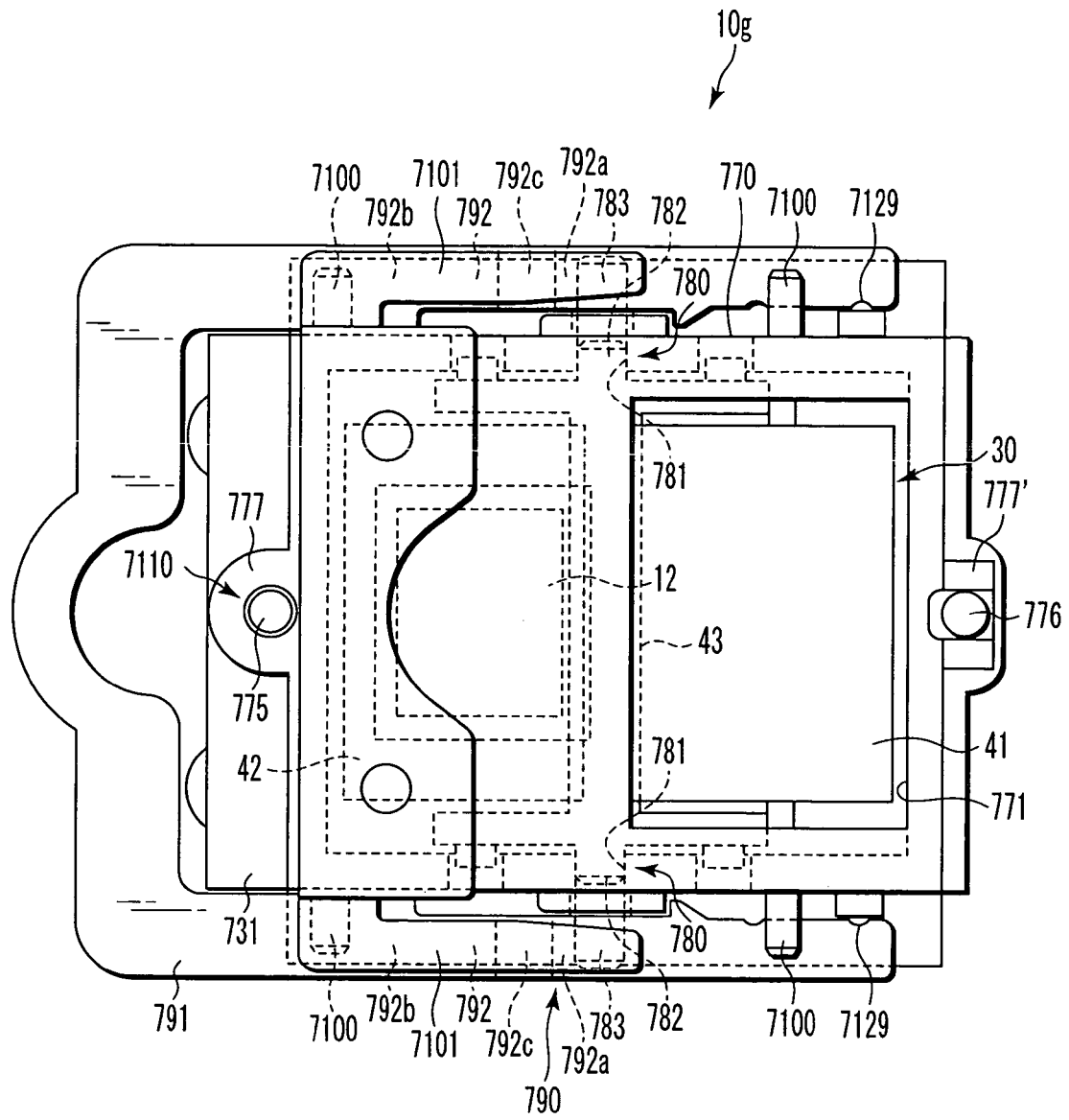
FIG. 53 is a plan view of an image sensing device of the ninth embodiment according to the present invention.

As shown in FIG. 53, a switching mechanism 790 has a switching member 791 which can move to a first setting position S1 shown in FIG. 54 or a second setting position S2 shown in FIG. 56. When the switching member 791 is moved to the first setting position S1, the prism unit 30 moves to a first position P1 (e.g., the standard image sensing position), as shown in FIG. 55. When the switching member 791 is moved to the second setting position S2, the prism unit 30 moves to a second position P2 (e.g., the macro image sensing position). The image sensing device 10g comprises a regulating member 7129 (FIGS. 53 and 54) to stop the switching member 791 at the first setting position S1 or second setting position S2.

FIG. 57 shows an image sensing device 10h according to the 10th embodiment of the present invention. The basic arrangement and function of the image sensing device 10h are the same as those of the image sensing device 10f of the eighth embodiment. The image sensing device 10h comprises a screw member 7130 as a fine adjustment mechanism 7110 for fc adjustment. When the screwing amount of the screw member 7130 to a fixing frame 731 is adjusted, a distance G between the fixing frame 731 and a case 770 is finely adjusted. Accordingly, adjustment (fc adjustment) of the focal plane of a prism unit 30 can be done.

Figure 58:
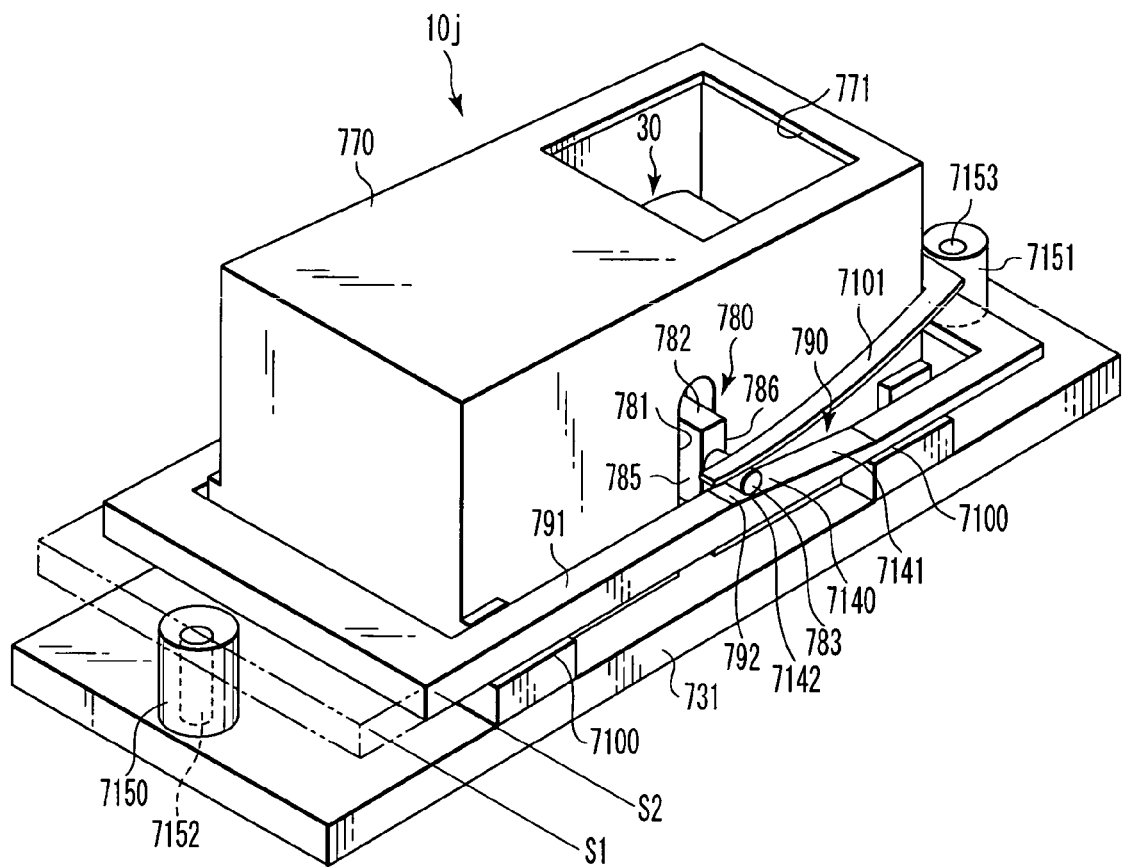
FIG. 58 is a perspective view of an image sensing device of the 11th embodiment according to the present invention.

FIG. 58 shows an image sensing device 10i according to the 11th embodiment of the present invention. Each positioning surface 792 of a switching mechanism 790 of the image sensing device 10i includes a cam slant 7140 formed from slants whose coordinates in the direction perpendicular to the light-receiving surface of the image sensing element are different. Abutment portions 783 abut against the cam slants 7140.

Each cam slant 7140 has a first face portion 7141 which functions as a first face portion to locate a prism unit 30 at a first position P1 and a second face portion 7142 to locate the prism unit 30 at a second position P2. The first face portion 7141 and second face portion 7142 are formed in line along the direction parallel to the image sensing element. The first face portion 7141 is a first part in the cam slant 7140. The second face portion 7142 is a second part in the cam slant 7140 different from the first part.

As in the image sensing device 10i of this embodiment, when the abutment portions 783 are made to abut against the first face portions 7141 or second face portions 7142 midway in the cam slants 7140, the first position (e.g., the standard image sensing position) and the second position (e.g., the macro image sensing position) can be switched. The image sensing device 10i comprises regulating members 7150 and 7151. The regulating members 7150 and 7151 function as stoppers to regulate the moving range of the switching member 791 in the direction parallel to the light-receiving surface of the image sensing element.

Examples of the regulating members 7150 and 7151 are eccentric pins which rotate about shafts 7152 and 7153. The regulating members 7150 and 7151 are rotated, thereby regulating the position (a first setting position S1 or second setting position S2) of the switching member 791. Accordingly, the position of the first face portion 7141 or second face portion 7142 which is in contact with the abutment portion 783 can finely be adjusted. With the above-described arrangement, the prism unit 30 can be switched between the first position (e.g., the standard image sensing position) and the second position (e.g., the macro image sensing position). In addition, fine adjustment (fc adjustment) of the focal plane of the prism unit 30 can be done.

FIGS. 59 and 60 show an image sensing device 10j according to the 12th embodiment of the present invention. The basic arrangement and function of the image sensing device 10j are the same as those of the image sensing device 10i of the 11th embodiment. The same reference numerals as in the image sensing device 10i of the 11th embodiment denote the same parts in the 12th embodiment. The shape of a switching member 791 and the modes of a case 770, fixing frame 731, and spring 7101 are further embodied as compared in the 11th embodiment.

Each positioning surface 792 of a switching mechanism 790 of the image sensing device 10j also includes a cam slant 7140 formed from slants whose coordinates in the direction perpendicular to the light-receiving surface of an image sensing element 12 are different, as in the image sensing device 10i of the 11th embodiment. Abutment portions 783 abut against the cam slants 7140.

A first face portion 7141 and a second face portion 7142 are formed on the cam slant 7140 in line along the direction parallel to the image sensing element 12. The first face portion 7141 locates a prism unit 30 at a first position P1. The second face portion 7142 locates the prism unit 30 at a second position P2.

Even in the image sensing device 10j having the above-described arrangement, when the abutment portions 783 selectively abut against the first face portions 7141 or second face portions 7142 on the cam slants 7140, the standard image sensing position and the macro image sensing position can be switched. In addition, the position of a switching member 791 is finely adjusted by regulating members 7150 and 7151, the position of the first face portion 7141 or second face portion 7142 which is in contact with the abutment portion 783 can finely be adjusted. Hence, fine adjustment (fc adjustment) of the focal plane of the prism unit 30 can be done.

An image sensing device 10k according to the 13th embodiment of the present invention will be described with reference to FIGS. 61 to 64. A prism unit 30 of the image sensing device 10k comprises a case 870 which accommodates a first prism 41, second prism 42, and aperture member 43, as shown in FIGS. 61 to 64. The case 870 has an incident window 871 at a position opposing an incident surface 51 of the first prism 41.

The image sensing device 10k of this embodiment comprises an adjustment mechanism 880. The adjustment mechanism 880 has an adjustment member 881 which can move in a direction (a first direction indicted by an arrow Z in FIGS. 61 to 63) parallel to the light-receiving surface of an image sensing element 12 in fc adjustment. The prism unit 30 is finely adjusted by the adjustment member 881 in a direction (a second direction indicated by an arrow X in FIGS. 61, 63, and 64) perpendicular to the light-receiving surface of the image sensing element 12. The adjustment mechanism 880 will be described below.

The adjustment mechanism 880 has the adjustment member 881 which can move in the Z direction as the first direction parallel to the light-receiving surface of the image sensing element 12, and a receiving portion 882 arranged on the prism unit 30. The receiving portion 882 is formed on, e.g., a frame member 870a which forms part of the case 870 to finely adjust the position of the prism unit 30 in the X direction as the second direction. The receiving portion 882 abuts against the adjustment member 881.

The portion of the adjustment member 881 which abuts against the receiving portion 882 is a slant 883 whose X-direction position changes along the Z direction. The receiving portion 882 has a slant 884 conforming to the slant 883 at the portion which abuts against the slant 883 of the adjustment member 881. As shown in FIG. 63, tilt angles θ of the slants 883 and 884 coincide with each other.

The slant 883 formed on the adjustment member 881 abuts against the slant 884 of the receiving portion 882. For this reason, when the adjustment member 881 is moved in the Z direction in fc adjustment, the prism unit 30 moves by a small amount in the X direction in accordance with the tilt angle θ of the slants 883 and 884 while maintaining its posture.

As shown in FIG. 62, an example of the adjustment member 881 has a pair of first portions 890 and 891 which are arranged at both ends of the prism unit 30 and abut against the receiving portion 882, and second portions 892 and 893 which connect the first portions 890 and 891. An fc adjustment jig 8100 (FIG. 61) to move the adjustment member 881 in the Z direction comes into contact with at least one of the first portions 890 and 891. An example of the fc adjustment jig 8100 is an eccentric pin 8102 which rotates about a shaft 8101.

After the fc adjustment, in a state in which the first portions 890 and 891 are fixed at predetermined positions with respect to the prism unit 30, the second portions 892 and 893 of the adjustment member 881 are separated from the first portions 890 and 891. For example, the second portions 892 and 893 are separated from the first portions 890 and 891 at cutting presumptive portions 8110 indicated by alternate long and two-dashed lines in FIGS. 61 and 62.

At the two ends of a fixing frame 831 having the image sensing element 12, first guide portions 8111 to guide the adjustment member 881 in the Z direction are formed at positions corresponding to the first portions 890 and 891 of the adjustment member 881. Hence, the adjustment member 881 can smoothly move straight in the Z direction.

As shown in FIG. 64, second guide portions 8112 to guide, e.g., the frame member 870a of the case 870 in the X direction at the time of fc adjustment such that the prism unit 30 can move in the second direction Y are formed on the fixing frame 831.

With the above-described arrangement, the prism unit 30 including the case 870 can move in the X direction perpendicular to the light-receiving surface of the image sensing element 12 relative to the fixing frame 831 in fc adjustment. That is, the position of the prism unit 30 in the X direction perpendicular to the light-receiving surface of the image sensing element 12 can finely be adjusted.

The image sensing device 10k has fixing portions 8115 (FIG. 63) to fix the adjustment member 881 to the prism unit 30 by bonding or the like after the fc adjustment. Examples of the fixing portions 8115 are the first portions 890 and 891 of the adjustment member 881. The fixing portions 8115 only need to fix the prism unit 30 to the fixing frame 831 in the X direction after the fc adjustment. Hence, the positions of the fixing portions 8115 are not limited to that shown in FIG. 63. The prism unit 30 may be fixed to the fixing frame 831 by any other fixing means than an adhesive.

The function of the image sensing device 10k of this embodiment will be described below. As shown in FIG. 61, the fixing frame 831 is held by a fixing jig 8120. In a state in which the adjustment member 881 is arranged at an initial position Q1, the eccentric pin 8102 is rotated to move the adjustment member 881 in a direction indicated by an arrow F. At this time, when the position of the prism unit 30 in the X direction is finely adjusted in accordance with the position of the adjustment member 881 in the Z direction, a distance G between the prism unit 30 and the fixing frame 831 is adjusted. Hence, fine adjustment (fc adjustment) of the focal plane of the prism unit 30 can be done.

In the fc adjustment, an adjustment test chart is placed at an object position suitable for standard image sensing. The contrast value of image data is evaluated on the basis of an electrical signal from the image sensing element. Fine adjustment is executed such that the contrast value is maximized. A detailed description of this operation will be omitted.

After the fc adjustment, for example, the case 870 and fixing frame 831 are fixed at the fixing portions 8115 of the first portions 890 and 891 which abut against the receiving portion 882 of the adjustment member 881 by using, e.g., an adhesive 8121 (schematically shown in FIG. 63). Accordingly, the distance from the prism unit 30 to the image sensing element 12 is fixed at a position where the focal plane to the image sensing element 12 is adjusted. After the fixing portions 8115 are fixed, the second portions 892 and 893 of the adjustment member 881 are separated from the first portions 890 and 891 at the cutting presumptive portions 8110.

As described above, in the manufacturing method according to this embodiment, the step of assembling the prism unit 30, image sensing element 12, and adjustment mechanism 880, the step of fixing the prism unit 30 to the fixing frame 831 at the first portions 890 and 891 of the adjustment member 881, and the step of separating the second portions 892 and 893 of the adjustment member 881 are executed in this order.

In this embodiment, the second portions 892 and 893 of the adjustment member 881 are separated after the fc adjustment. In some products, the image sensing element 12 may be used without separating the second portions 892 and 893.

In the image sensing device 10k having the above-described arrangement, the position of the focal plane can finely be adjusted by fc adjustment. For this reason, the positional shift between an imaging plane 45 of the prism unit 30 and the light-receiving surface of the image sensing element 12, which is caused by an inevitable variation between components or accuracy of form of each component at the time of assembling the image sensing device 10k, can be minimized. Hence, the image sensing device 10k can form a satisfactory image.

FIG. 65 shows another example of the adjustment jig 8100. The arrangement of the image sensing device 10k is the same as in the 13th embodiment except a screw member 8130 is used as the fc adjustment jig 8100. The screw member 8130 can finely adjust the position of the adjustment member 881 in the Z direction by adjusting the screwing amount to a fixing-side member 8131.

An image sensing device 10m according to the 14th embodiment of the present invention will be described with reference to FIGS. 66 to 70A and 70B. As shown in FIGS. 66 to 68, a prism unit 30 of the image sensing device 10m comprises a case 970 which accommodates a first prism 41, second prism 42, and aperture member 43. The case 970 has an incident window 971 at a position opposing an incident surface 51 of the first prism 41.

The image sensing device 10m comprises a guide mechanism 980 to guide the prism unit 30 to be movable in a direction (a direction indicated by an arrow X in FIG. 67) perpendicular to the light-receiving surface of an image sensing element 12. An example of the guide mechanism 980 has a cylindrical pin-shaped shaft 981 formed at the left end of a fixing frame 931 in FIG. 67 and a guide member 982 which is formed at the right end of the fixing frame 931.

As shown in FIG. 68, the shaft 981 fits in a fitting hole 983 formed at a part 970a of the case 970 to be movable in the X direction. The guide member 982 engages with an engaging portion 984 (FIG. 67) formed on the case 970 to be movable in the X direction. The prism unit 30 is guided by the guide mechanism 980 and moved in the X direction while maintaining its posture in the direction perpendicular to the light-receiving surface of the image sensing element 12.

The image sensing device 10m has a switching mechanism 990. The switching mechanism 990 includes the shaft 981 extending in the direction perpendicular to the light-receiving surface of the image sensing element 12, and a switching member 991 which can rotate on the shaft 981. The switching mechanism 990 has a function of selectively moving the prism unit 30 along the guide mechanism 980 to a first position P1 or second position P2 and holding its position. The first position P1 is, e.g., the standard image sensing position shown in FIG. 2. The second position P2 is farther from the light-receiving surface of the image sensing element 12 than the first position P1 and is, e.g., the macro image sensing position.

The switching member 991 can rotate on the shaft 981 in directions indicated by an arrow U in FIG. 66, i.e., in a plane parallel to the light-receiving surface of the image sensing element 12. Regulating members 992 and 993 are arranged on the side of the fixing frame 931 to regulate the moving limit positions in the directions in which the switching member 991 rotates in the plane parallel to the light-receiving surface of the image sensing element 12.

Figure 70A:
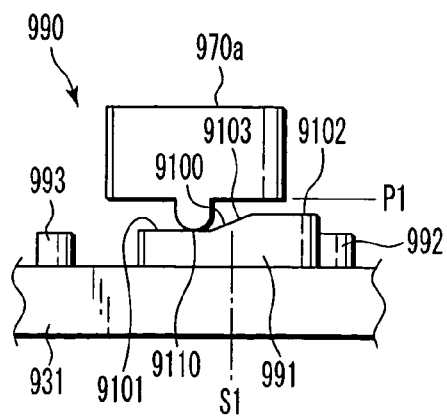
FIG. 70A is a front view of the image sensing device shown in FIG. 66 when the switching mechanism is at the first setting position.
Figure 70B:
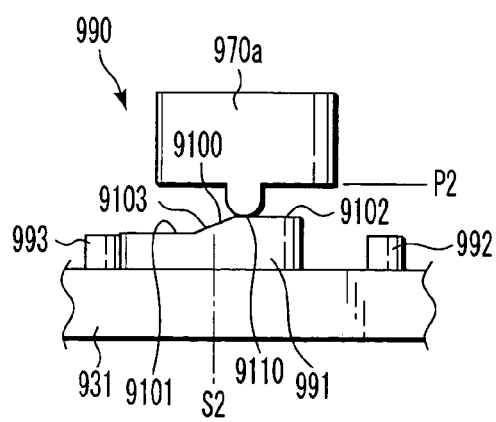
FIG. 70B is a front view of the image sensing device shown in FIG. 66 when the switching mechanism is at the second setting position.

The switching member 991 can be switched between a first setting position S1 shown in FIG. 70A and a second setting position S2 shown in FIG. 70B by, e.g., a manual operation switching member 95 arranged on a housing 2 of a digital camera 1 shown in FIG. 1. The manual operation switching member 95 interlocks with the switching member 991 of the switching mechanism 990 and is used to selectively locate the switching mechanism 990 at the first setting position S1 or second setting position S2.

The switching member 991 can rotate between the first setting position S1 and the second setting position S2 in the directions indicated by the arrow U. A positioning surface 9100 is formed on the switching member 991. The positioning surface 9100 has a first plane portion 9101, second plane portion 9102, and slant portion 9103. The first plane portion 9101 is parallel to the light-receiving surface of the image sensing element 12. The second plane portion 9102 is parallel to the light-receiving surface and is located at a position (coordinates) different from the first plane portion 9101 in the direction perpendicular to the light-receiving surface. The slant portion 9103 is located between the first plane portion 9101 and the second plane portion 9102. An operation portion 9104 is arranged as needed.

The operation portion 9104 is arranged in place of the above-described manual operation switching member 95. When the operation portion 9104 is exposed to the outer surface of the housing 2, the manual operation switching member 95 is unnecessary. Although not illustrated in detail, if the operation portion 9104 projects from the upper surface of the camera, the switching mechanism 990 can be operated by manually operating the operation portion 9104. The operation portion 9104 may be switched by using an actuator such as an electric motor. In this case as well, the manual operation switching member 95 is unnecessary.

A predetermined portion midway in the rotational direction of the first plane portion 9101 functions as a first face portion to locate the prism unit 30 at the first position P1. A predetermined portion midway in the rotational direction of the second plane portion 9102 functions as a second face portion to locate the prism unit 30 at the second position P2.

An abutment portion 9110 which abuts against the positioning surface 9100 is formed on the side of the case 970. The abutment portion 9110 is formed at a position opposing the positioning surface 9100 and abuts against the plane portion 9101 or 9102 or the slant portion 9103 of the positioning surface 9100 in accordance with the rotational position of the switching member 991.

Since the slant portion 9103 is formed between the first plane portion 9101 and the second plane portion 9102, the abutment portion 9110 can smoothly move between the first plane portion 9101 and the second plane portion 9102. The abutment portion 9110 is formed at part of the case 970. However, it may be formed on the first prism 41 or second prism 42. The abutment portion 9110 may be formed on the aperture member 43. In this case, the number of components can be reduced.

A spring 9111 is arranged as an example of a press mechanism to make the abutment portion 9110 abut against the positioning surface 9100. The abutment portion 9110 is urged toward the positioning surface 9100 by the elastic force of the spring 9111. The spring 9111 is attached to, e.g., the fixing frame 931.

Figure 69:
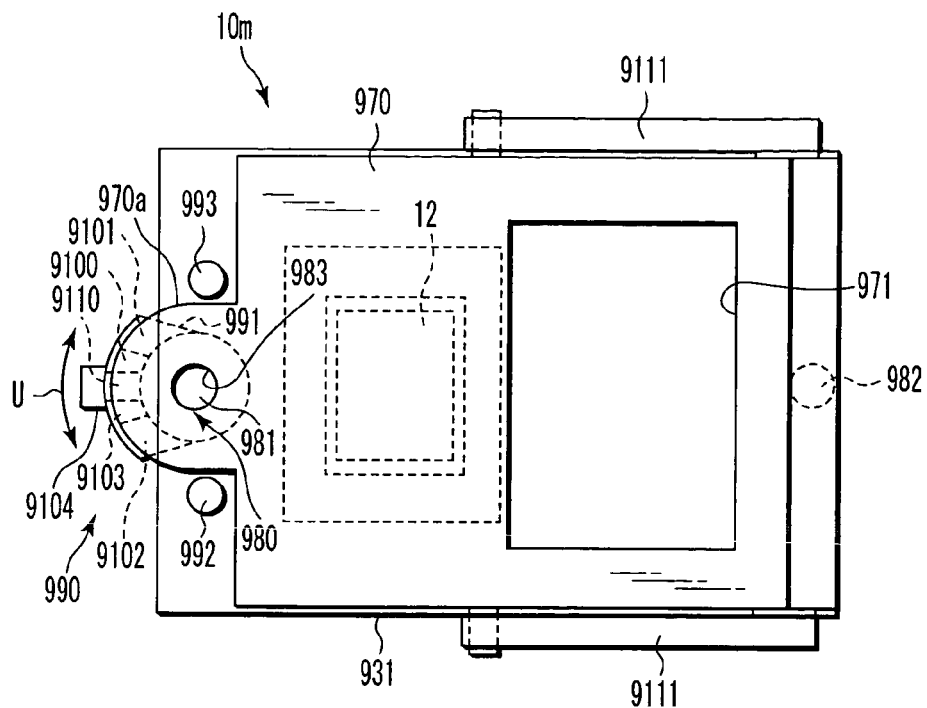
FIG. 69 is a plan view of the image sensing device shown in FIG. 66.

The function of the image sensing device 10 of the first embodiment will be described below. FIG. 69 shows a state in which the switching member 991 of the switching mechanism 990 is at the neutral position. The switching member 991 is located at one of the first plane portion 9101 and second plane portion 9102 from this neutral position.

The switching member 991 is caused to rotate to the first setting position S1 by, e.g., the manual operation switching member 95 shown in FIG. 1, as shown in FIG. 70A. Since the abutment portion 9110 abuts against the first face portion in the first plane portion 9101, the prism unit 30 is set at the standard image sensing position. At this time, further pivot of the switching member 991 is inhibited by one regulating member 992. The manual operation switching member 95 is operatively connected to the switching member 991, although no detailed mechanism is illustrated.

The switching member 991 is caused to rotate to the second setting position S2, as shown in FIG. 70B. The abutment portion 9110 abuts against the second face portion in the second plane portion 9102. Accordingly, the prism unit 30 is set at the macro image sensing position. At this time, further rotation of the switching member 991 is inhibited by the other regulating member 993.

An image sensing device 10n according to the 15th embodiment of the present invention will be described with reference to FIGS. 71 to 73A and 73B. The basic arrangement of the image sensing device 10n is the same as that of the image sensing device 10m of the 14th embodiment. The image sensing device 10n of the 15th embodiment is different from the image sensing device 10m of the 14th embodiment in that the device has a fine adjustment mechanism 9120. The same reference numerals as in the image sensing device 10m of the 14th embodiment denote the same parts in the image sensing device 10n.

The fine adjustment mechanism 9120 finely adjusts at least one (e.g., the first position P1) of a first position P1 and second position P2 of a prism unit 30 in a direction perpendicular to the light-receiving surface of an image sensing element 12.

As shown in FIGS. 71 to 73A and 73B, an example of the fine adjustment mechanism 9120 has a cam member 9121 which can rotate on a shaft 981. The cam member 9121 has a slant 9122 whose position in the direction perpendicular to the light-receiving surface of the image sensing element 12 changes in the rotational direction. A receiving portion 9123 formed on a switching member 991 of a switching mechanism 990 abuts against the slant 9122. The receiving portion 9123 is formed on a surface of the switching member 991 on the opposite side of a positioning surface 9100. The receiving portion 9123 may have an arc shape or a slant conforming to the slant 9122 of the cam member 9121 of the fine adjustment mechanism 9120.

In fc adjustment of the image sensing device 10n, the cam member 9121 is caused to rotate on the shaft 981 relative to the switching member 991. At this time, since the receiving portion 9123 slides on the slant 9122, the prism unit 30 can finely adjust at least one of the first position P1 and the second position P2. That is, the position of the prism unit 30 can finely be adjusted in the direction (a direction indicated by an arrow X in FIG. 72) perpendicular to the light-receiving surface of the image sensing element 12.

As described above, when the cam member 9121 is caused to rotate with respect to the switching member 991 to adjust the distance from the prism unit 30 to the image sensing element 12 at the time of fc adjustment, fc adjustment can be done at, e.g., the standard image sensing position.

In the fc adjustment, an adjustment test chart is placed at an object position suitable for standard image sensing. The contrast value of image data is evaluated on the basis of an electrical signal from the image sensing element. The fine adjustment mechanism 9120 is finely adjusted such that the contrast value is maximized. A detailed description of this operation will be omitted.

After the fc adjustment, the receiving portion 9123 is fixed to the cam member 9121. When the cam member 9121 is bonded to the switching member 991 by, e.g., an adhesive, the distance from the prism unit 30 to the image sensing element 12 is fixed at a position where the focal plane to the image sensing element 12 is adjusted.

In this embodiment, adjustment is done such that the best imaging state is obtained at the standard image sensing position. Instead, fc adjustment may be done such that the best imaging state is obtained at the macro image sensing position without any particular adjustment for the imaging state at the standard image sensing position.

The function of the image sensing device 10n having the switching mechanism 990 and fine adjustment mechanism 9120 will be described next. When the switching member 991 rotates to the first setting position S1, as shown in FIG. 73A, the abutment portion 9110 abuts against the first face portion in the first plane portion 9101. The prism unit 30 is located at the standard image sensing position. At this time, the cam member 9121 moves to a first setting position Si integrally with the switching member 991. The switching member 991 is stopped at the first setting position S1 by one regulating member 992.

When the switching member 991 rotates to a second setting position S2, as shown in FIG. 73B, the abutment portion 9110 abuts against the second face portion in the second plane portion 9102. The prism unit 30 is located at the macro image sensing position. At this time, the cam member 9121 moves to the second setting position S2 integrally with the switching member 991. The switching member 991 is stopped at the second setting position S2 by the other regulating member 993.

In the image sensing device 10n, the position of the focal plane is finely adjusted by fc adjustment using the cam member 9121. For this reason, the positional shift between the imaging plane of the prism unit 30 and the light-receiving surface of the image sensing element 12, which is caused by an inevitable variation between components or accuracy of form of each component at the time of assembling the image sensing device 10n, can be minimized. Hence, the image sensing device 10n can form a satisfactory image.

An image sensing device 10p according to the 16th embodiment of the present invention will be described with reference to FIGS. 74, 75A, and 75B. The basic arrangement of the image sensing device 10p is the same as that of the image sensing device 10m of the 14th embodiment. The image sensing device 10p of the 16th embodiment is different from the image sensing device 10m of the 14th embodiment in that the device has a fine adjustment mechanism 9130 and a positioning surface 9100 of a switching member 991 is mainly formed from a cam slant 9131. The same reference numerals as in the image sensing device 10m of the 14th embodiment denote components having the same functions in the image sensing device 10p.

The positioning surface 9100 of the switching member 991 of the image sensing device 10p has the cam slant 9131 including the first face portion and second face portion in a direction in which the switching member 991 rotates about a shaft 981. The first face portion and second face portion are located at different positions in a direction perpendicular to the light-receiving surface of an image sensing element 12. A predetermined portion midway in the rotational direction of the cam slant 9131 functions as the first face portion to locate a prism unit 30 at a first position P1. Another predetermined portion midway in the rotational direction of the cam slant 9131 functions as the second face portion to locate the prism unit 30 at a second position P2.

That is, the positioning surface 9100 of the image sensing device 10p includes the cam slant 9131 whose coordinates in the direction perpendicular to the light-receiving surface of the image sensing element 12 change. An abutment portion 9110 abuts against the cam slant 9131. The first face portion is a first part in the cam slant 9131. The second face portion is a second part in the cam slant 9131 different from the first part.

As in the image sensing device 10p, when the abutment portion 9110 is caused to abut against the first face portion or second face portion midway in the cam slant 9131, the first position (e.g., the standard image sensing position) and the second position (e.g., the macro image sensing position) can be switched.

The fine adjustment mechanism 9130 of the image sensing device 10p comprises eccentric pins which rotate about shafts 9142 and 9143 as examples of regulating members 9140 and 9141 to regulate the moving range of the switching member 991 in the direction parallel to the perpendicular to the light-receiving surface of the image sensing element 12.

As shown in FIG. 75A, one regulating member 9140 functions as a stopper to stop the switching member 991 at a first setting position S1. As shown in FIG. 75B, the other regulating member 9141 functions as a stopper to stop the switching member 991 at a second setting position 52. The regulating members 9140 and 9141 are rotated about the shafts 9142 and 9143 to finely adjust the first setting position S1 or second setting position S2. Accordingly, the position of the first face portion or second face portion in the cam slant 9131 in contact with the abutment portion 9110 can finely be adjusted.

According to the image sensing device 10p having the above-described arrangement, the prism unit 30 can be switched between the first position P1 (e.g., the standard image sensing position) and the second position P2 (e.g., the macro image sensing position). In addition, fine adjustment (fc adjustment) of at least one of the first position P1 and second position P2 of the prism unit 30, i.e., the focal plane can be done. If no fc adjustment function is necessary, the regulating members 992 and 993 serving as simple stoppers as shown in FIG. 66 can be used in place of the regulating members 9140 and 9141.

An image sensing device 10q according to the 17th embodiment of the present invention will be described with reference to FIG. 76. In the image sensing device 10q of this embodiment, the shape of an abutment portion 9110' which abuts against a positioning surface 9100 of a switching member 991 conforms to a cam slant 9131 of the positioning surface 9100. The 17th embodiment is the same as the 16th embodiment (FIGS. 74, 75A, and 75B) except that point.

FIG. 77 shows an example of an image sensing apparatus according to the present invention, in which a cellular phone 160 with a camera incorporates an image sensing device. When the cellular phone 160 with a camera incorporates one (e.g., the image sensing device 10) of the image sensing apparatuses described in the above embodiments, the cellular phone 160 with a camera can be compact and thin and increase the image quality.

In the cellular phone 160 with a camera, the switching member of the switching mechanism is switched between a first stable posture T1 (or a first setting position S1) and a second stable posture T2 (or a second setting position S2) by a manual operation switching member 95. Instead of using the manual operation switching member 95, the switching member may be motor-driven by using an actuator such as an electric motor or solenoid.

FIGS. 78 to 80 show different examples of prism units 30a, 30b, and 30c applied to the image sensing device of the present invention. All the prism units 30a, 30b, and 30c can be switched between a first position P1 and a second position P2 by the same switching mechanism as in the image sensing apparatuses of the above-described embodiments.

In the prism unit 30a shown in FIG. 78, all surfaces 201 to 206 of a first prism 41a and second prism 42a are formed from free-form surfaces. Light input from the first surface 201 is refracted by the first surface 201, totally reflected by the second surface 202, refracted by the third surface 203, and then refracted by the fourth surface 204. The light is further totally reflected by the fifth surface 205, totally reflected by the sixth surface 206, refracted by the fifth surface 205, and forms an image on an imaging plane 45.

An eccentric prism 210 of the prism unit 30b shown in FIG. 79 has a first surface 211, second surface 212, and third surface 213 all of which are formed from free-form surfaces. Light input through an aperture member 214 is refracted by the first surface 211 and enters the eccentric prism 210. The light is internally reflected by the second surface 212, strikes the first surface 211 again and is totally reflected by it. The light is then internally reflected by the third surface 213, totally reflected by the first surface 211 again, internally reflected by the third surface 213 again, refracted by the first surface 211 again, and forms an image on an imaging plane 45.

In the prism unit 30c shown in FIG. 80, all surfaces 231 to 238 of a first prism 221 and second prism 222 are formed from free-form surfaces. Light input from the first surface 231 is refracted by it and totally reflected by the second surface 232. The light is then totally reflected by the third surface 233 and refracted by the fourth surface 234 and fifth surface 235. The light is further totally reflected by the sixth surface 236 and seventh surface 237, refracted by the eighth surface 238, and forms an image on an imaging plane 45.

Figure 81:
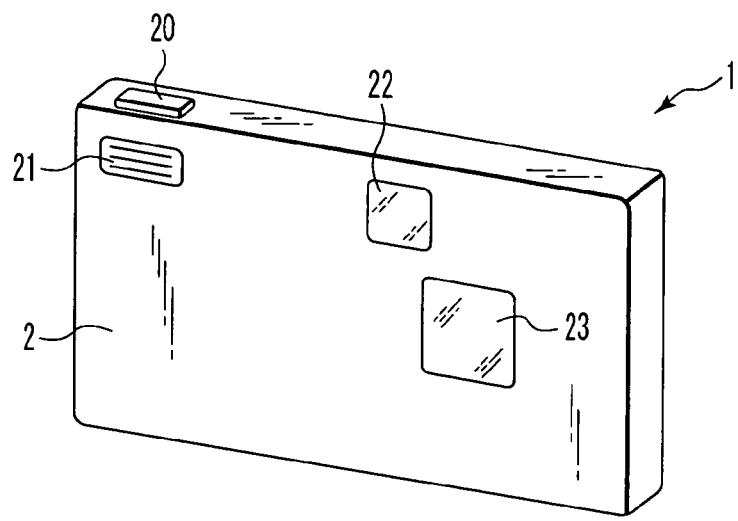
FIG. 81 is a perspective view showing a digital camera as still another example of the image sensing apparatus according to the present invention.
Figure 82:
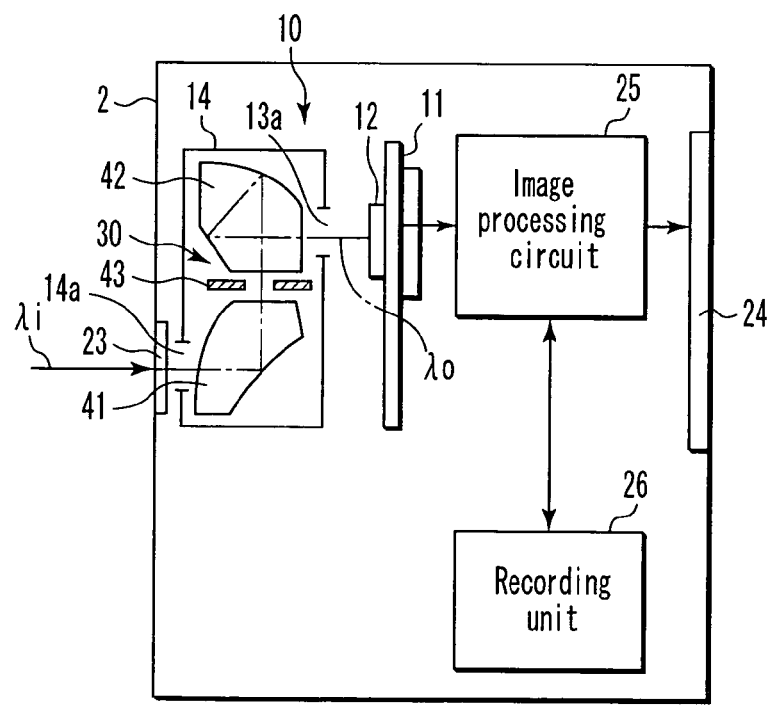
FIG. 82 is a sectional view schematically showing the internal structure of the digital camera shown in FIG. 81.

FIG. 81 shows the outer appearance of a digital camera 1a which comprises only a fine adjustment mechanism or adjustment mechanism and no manual operation switching member. FIG. 82 is a sectional view schematically showing the internal structure of the digital camera 1a. A cellular phone 160a with a camera shown in FIG. 83 incorporates an image sensing device (e.g., the image sensing device 10b, 10c, or 10k) having only a fine adjustment mechanism or adjustment mechanism or an image sensing device whose switching mechanism is operated by an actuator.

Figure 85:
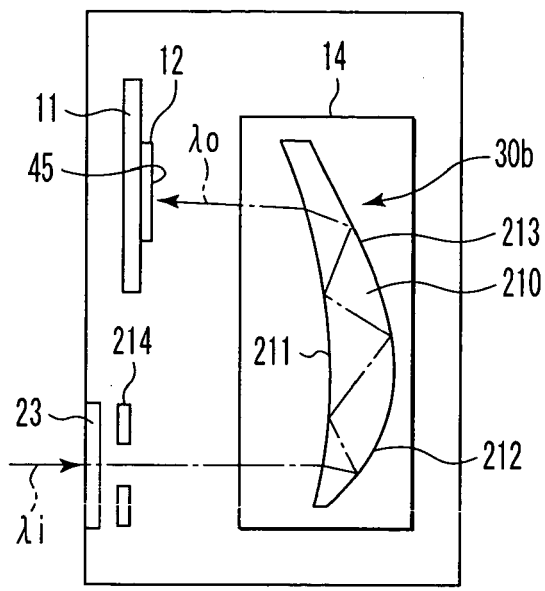
FIG. 85 is a sectional view schematically showing still another example of the prism optical system.
Figure 86:
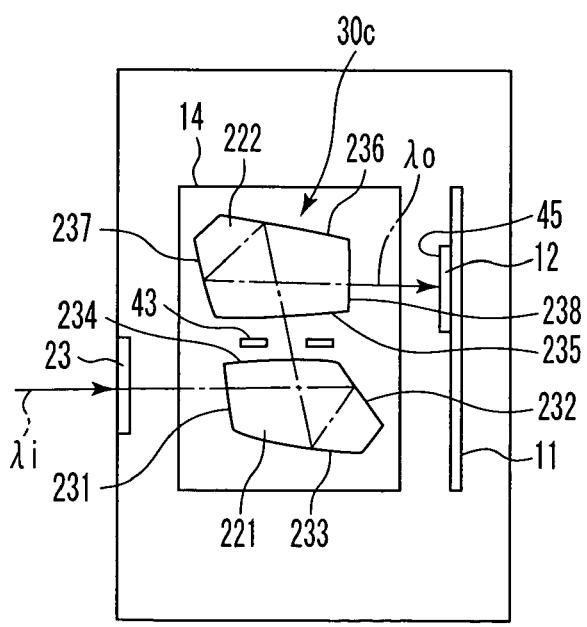
FIG. 86 is a sectional view schematically showing still another example of the prism optical system.

FIGS. 84 to 86 schematically show examples in which the prism optical systems shown in FIGS. 79 to 81 are applied to an image sensing device which comprises a fine adjustment mechanism or adjustment mechanism and can execute fc adjustment.

In practicing the present invention, various changes and modifications can be made for the constituent elements such as the prism optical system, guide mechanism, image sensing element, and switching mechanism without departing from the spirit and scope of the present invention.

The image sensing device having a switching mechanism can selectively switch the position of the prism unit between the first image sensing position and the second image sensing position in the direction perpendicular to the light-receiving surface of the image sensing element. Hence, two focal points can be set in the distance from the light-receiving surface of the image sensing element to an object.

According to the image sensing device having a link mechanism, the prism unit can be switched between the first position near the image sensing element and the second position separated from the image sensing element. At this time, the prism unit moves along the direction perpendicular to the light-receiving surface of the image sensing element while keeping its posture parallel. In the image sensing device, two different focal points can be set in accordance with the image sensing distance of an object. Hence, image sensing can be executed by selecting these two image sensing settings.

The prism unit can be switched between the first position and the second position in the direction perpendicular to the light-receiving surface of the image sensing element. For this reason, image sensing can be executed in accordance with two image sensing states, i.e., a case in which the position of an object to be sensed falls within the first distance range and a case in which the object position falls within the second distance range. In addition, since the switching mechanism can be implemented in a small space, the image sensing device and an image sensing apparatus incorporating it can be made compact.

According to the image sensing device of the present invention, which comprises a fine adjustment mechanism or adjustment mechanism, variations between products caused by manufacturing dimensional tolerances or assembly dimensional tolerances in mass production can individually be corrected. Even when the distance from the prism unit to the light-receiving surface of the image sensing element changes due to variations in dimensions of each component of the image sensing device or a variation in assembly, the focal plane can be adjusted. For this reason, the image sensing device of the present invention can maintain a satisfactory focus state even in, e.g., mass production.

In the image sensing device in which a rotational support portion pivotally supporting the prism unit is arranged in parallel to the light-receiving surface of the image sensing element, the distance between the prism unit and the light-receiving surface of the image sensing element is changed in the direction along the exit optical axis of the prism unit within the rotational range of the pivot support portion. Since the prism unit pivots by using the pivot support portion as a fulcrum, the adjustment mechanism can be formed by a small number of components.

In practicing the present invention, various changes and modifications can be made for the constituent elements such as the prism optical system, image sensing element, adjustment member, and receiving portion without departing from the spirit and scope of the present invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image sensing device comprising:
   a prism unit which receives a light beam from an object and forms an object image on an imaging plane, the prism unit having at least two reflecting surfaces each having a free-form surface shape, and an incident optical axis of the light beam input from the object and an exit optical axis of the light beam which exits from the prism unit to the imaging plane being arranged substantially in parallel at a predetermined interval;
   an image sensing element which is arranged on the imaging plane to convert the object image formed by the prism unit into an electrical signal;
   a guide mechanism which moves the prism unit along a direction perpendicular to a light-receiving surface of the image sensing element while maintaining a posture of the prism unit;
   a switching mechanism which selectively locates and holds the prism unit at one of a first position and a second position farther from the light-receiving surface of the image sensing element than the first position along the guide mechanism, the switching mechanism which moves between a first setting position and a second setting position along a direction parallel to the light-receiving surface of the image sensing element and has a positioning surface including a first face portion to locate the prism unit at the first position and a second face portion to locate the prism unit at the second position;
   a switching member guide mechanism to move the switching mechanism straight along the direction parallel to the light-receiving surface;
   an abutment portion which is arranged on the prism unit and abuts against the positioning surface of the switching mechanism, the abutment portion of the prism unit is formed on part of a prism included in the prism unit; and
   a press mechanism which presses the abutment portion of the prism unit against the positioning surface of the switching mechanism.

2. A device according to claim 1, wherein:
   the positioning surface has, along the direction parallel to the light-receiving surface, a first plane portion which is parallel to the light-receiving surface and a second plane portion which is parallel to the light-receiving surface and is located at a position different from the first plane portion in the direction perpendicular to the light-receiving surface;
   the first face portion is a predetermined portion in the first plane portion; and
   the second face portion is a predetermined portion in the second plane portion.

3. A device according to claim 1, wherein:
   the positioning surface has a slant whose position in the direction perpendicular to the light-receiving surface changes along, the direction parallel to the light-receiving surface;
   the first face portion is a first portion in the slant; and
   the second face portion is a second portion in the slant different from the first portion.

4. A device according to claim 3, further comprising a fine adjustment mechanism to finely adjust at least one of the first setting position and the second setting position of the switching mechanism in the direction parallel to the light-receiving surface to finely adjust at least one of the first position and the second position of the prism unit in the direction perpendicular to the light-receiving surface.

5. A device according to claim 4, wherein the fine adjustment mechanism has a regulating member to regulate a moving limit position of the switching mechanism along the direction parallel to the light-receiving surface and finely adjusts a position of the regulating member in the direction parallel to the light-receiving surface.

6. A device according to claim 1, further comprising a manual operation switching member which interlocks with the switching mechanism and switches the switching mechanism to one of the first setting position and the second setting position.

7. A device according to claim 1, further comprising a fine adjustment mechanism to finely adjust the switching mechanism in the direction perpendicular to the light-receiving surface of the image sensing element.

8. An image sensing device comprising:
a prism unit which receives a light beam from an object and forms an object image on an imaging plane, the prism unit having at least two reflecting surfaces each having a free-form surface shape, and an incident optical axis of the light beam input from the object and an exit optical axis of the light beam which exits from the prism unit to the imaging plane being arranged substantially in parallel at a predetermined interval;
an image sensing element which is arranged on the imaging plane to convert the object image formed by the prism unit into an electrical signal;
a guide mechanism which moves the prism unit along a direction perpendicular to a light-receiving surface of the image sensing element while maintaining a posture of the prism unit;
a switching mechanism which selectively locates and holds the prism unit at one of a first position and a second position farther from the light-receiving surface of the image sensing element than the first position along the guide mechanism, the switching mechanism which moves between a first setting position and a second setting position along a direction parallel to the light-receiving surface of the image sensing element and has a positioning surface including a first face portion to locate the prism unit at the first position and a second face portion to locate the prism unit at the second position;
a switching member guide mechanism to move the switching mechanism straight along the direction parallel to the light-receiving surface;
an abutment portion which is arranged on the prism unit and abuts against the positioning surface of the switching mechanism, the abutment portion which is formed on part of an aperture member included in the prism unit; and
a press mechanism which presses the abutment portion of the prism unit against the positioning surface of the switching mechanism.

9. A device according to claim 8, wherein:
the positioning surface has, along the direction parallel to the light-receiving surface, a first plane portion which is parallel to the light-receiving surface and a second plane portion which is parallel to the light-receiving surface and is located at a position different from the first plane portion in the direction perpendicular to the light-receiving surface;
the first face portion is a predetermined portion in the first plane portion; and
the second face portion is a predetermined portion in the second plane portion.

10. A device according to claim 8, wherein:
the positioning surface has a slant whose position in the direction perpendicular to the light-receiving surface changes along the direction parallel to the light-receiving surface;
the first face portion is a first portion in the slant; and
the second face portion is a second portion in the slant different from the first portion.

11. A device according to claim 10, further comprising:
a fine adjustment mechanism to finely adjust at least one of the first setting position and the second setting position of the switching mechanism in the direction parallel to the light-receiving surface to finely adjust at least one of the first position and the second position of the prism unit in the direction perpendicular to the light-receiving surface.

12. A device according to claim 11, wherein:
the fine adjustment mechanism has a regulating member to regulate a moving limit position of the switching mechanism along the direction parallel to the light-receiving surface and finely adjusts a position of the regulating member in the direction parallel to the light-receiving surface.

13. A device according to claim 8, further comprising:
a manual operation switching member which interlocks with the switching mechanism and switches the switching mechanism to one of the first setting position and the second setting position.

14. A device according to claim 8, further comprising:
a fine adjustment mechanism to finely adjust the switching mechanism in the direction perpendicular to the light-receiving surface of the image sensing element.

* * * * *